(12) United States Patent
Yamada et al.

(10) Patent No.: US 12,404,950 B2
(45) Date of Patent: Sep. 2, 2025

(54) ELECTRIC VALVE CONTROL DEVICE, ELECTRIC VALVE DEVICE, AND METHOD FOR CONTROLLING ELECTRIC VALVE

(71) Applicant: FUJIKOKI CORPORATION, Tokyo (JP)

(72) Inventors: Kento Yamada, Tokyo (JP); Takayuki Watanabe, Tokyo (JP); Hiroshi Hagimoto, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 18/570,375

(22) PCT Filed: Sep. 14, 2022

(86) PCT No.: PCT/JP2022/034456
§ 371 (c)(1),
(2) Date: Dec. 14, 2023

(87) PCT Pub. No.: WO2023/053973
PCT Pub. Date: Apr. 6, 2023

(65) Prior Publication Data
US 2024/0280186 A1    Aug. 22, 2024

(30) Foreign Application Priority Data
Sep. 30, 2021    (JP) ................................. 2021-162138

(51) Int. Cl.
F16K 31/04    (2006.01)
F16K 27/02    (2006.01)
F16K 31/50    (2006.01)

(52) U.S. Cl.
CPC .......... *F16K 31/504* (2013.01); *F16K 27/029* (2013.01); *F16K 31/04* (2013.01)

(58) Field of Classification Search
USPC ........................................ 251/129.11, 129.12
See application file for complete search history.

(56) References Cited

U.S. PATENT DOCUMENTS

| | | | | |
|---|---|---|---|---|
| 4,153,021 A | * | 5/1979 | Hattori | .................... F02D 43/00 123/682 |
| 5,006,772 A | * | 4/1991 | Danby | ...................... H02P 8/34 318/696 |

(Continued)

FOREIGN PATENT DOCUMENTS

| | | |
|---|---|---|
| EP | 1760875 A1 | 3/2007 |
| EP | 3828452 A1 | 6/2021 |

(Continued)

OTHER PUBLICATIONS

Japan Patent Office, Determination of an Objection for the corresponding Japanese Patent No. 7254400, Patent Determination Gazette, Jan. 10, 2024, with English translation.

(Continued)

*Primary Examiner* — Matthew W Jellett
(74) *Attorney, Agent, or Firm* — LUCAS & MERCANTI, LLP

(57) ABSTRACT

An electric valve control device inputs a pulse to a stepping motor to rotate a rotor in a first direction. The electric valve control device obtains a voltage generated in a stator by rotation of the rotor. The electric valve control device determines whether an electric valve is in a first-rotation restricted state where the rotation of the rotor in the first direction is restricted, based on a degree of difference between a waveform of the voltage and a reference waveform of the voltage.

19 Claims, 33 Drawing Sheets

(56) References Cited

U.S. PATENT DOCUMENTS

| | | | | |
|---|---|---|---|---|
| 5,099,867 | A | * | 3/1992 | Emery ................ F16K 37/0041 |
| | | | | 251/129.05 |
| 5,316,263 | A | * | 5/1994 | Mino ...................... F25B 41/35 |
| | | | | 251/129.05 |
| 5,783,939 | A | * | 7/1998 | Lippmann ................ G01R 7/06 |
| | | | | 324/154 R |
| 7,284,570 | B1 | * | 10/2007 | Gracik .................. F16K 31/046 |
| | | | | 137/554 |
| 7,938,382 | B2 | * | 5/2011 | Huerta-Ochoa .... F16K 37/0041 |
| | | | | 318/696 |
| 2016/0313037 | A1 | * | 10/2016 | Takahashi ................. H02P 8/30 |
| 2018/0260656 | A1 | | 9/2018 | Ohkubo et al. |

FOREIGN PATENT DOCUMENTS

| | | |
|---|---|---|
| JP | S58-116096 A | 7/1983 |
| JP | 1986070473 A | 4/1986 |
| JP | H08-004931 A | 1/1996 |
| JP | 1997317570 A | 12/1997 |
| JP | 2002317880 A | 10/2002 |
| JP | 2003042325 A | 2/2003 |
| JP | 2016205584 A | 12/2016 |
| JP | 2018147390 A | 9/2018 |
| JP | 2020-016247 A | 1/2020 |
| JP | 2022115618 A | 8/2022 |
| WO | 2019/130928 A1 | 7/2019 |

OTHER PUBLICATIONS

Japan Patent Office, Patent Opposition Petition for the corresponding Japanese Patent No. 7254400, Oct. 2, 2023, with English translation.

The International Bureau of WIPO, "The International Preliminary Report on Patentability" for the corresponding International Application No. PCT/JP2022/034456, mailed Nov. 8, 2022, with English translation, 7 pages.

International Search Report for the corresponding international application No. PCT/JP2022/034456, dated Nov. 8, 2022, with English translation.

Office Action, dated May 20, 2025, which was issued for the corresponding Japanese Patent Application No. 2024-086777, 9 pages, with English Translation.

Notice of Reasons for Refusal, dated Jul. 29, 2025, which was issued for the corresponding Japanese Patent Application No. 2024-086777, 7 pages, with English translation.

* cited by examiner

FIG.3
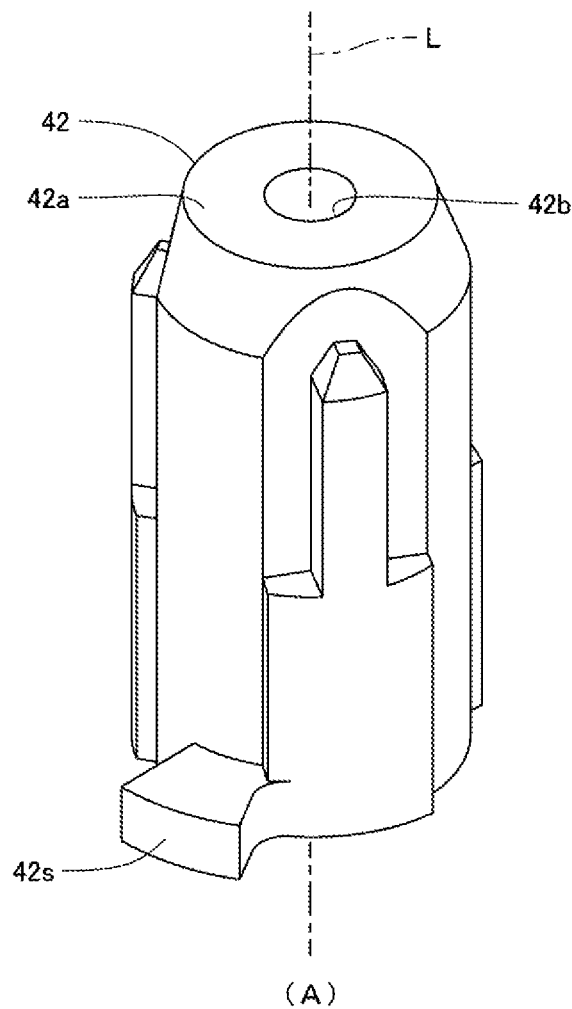
(A)
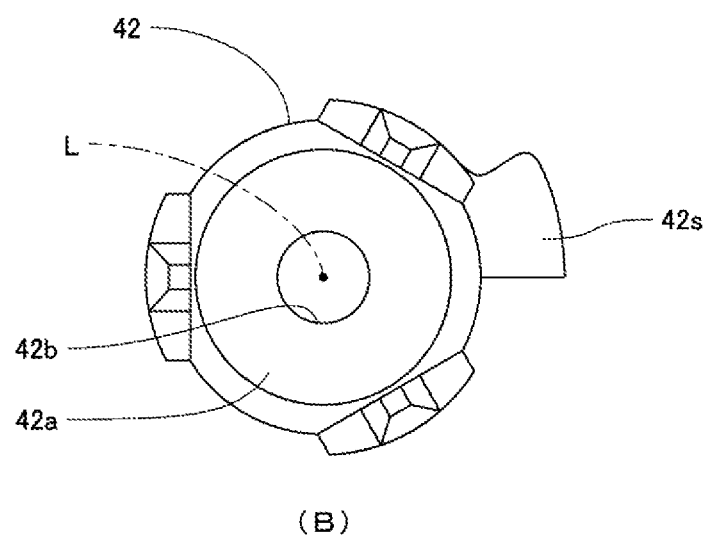
(B)

FIG.5
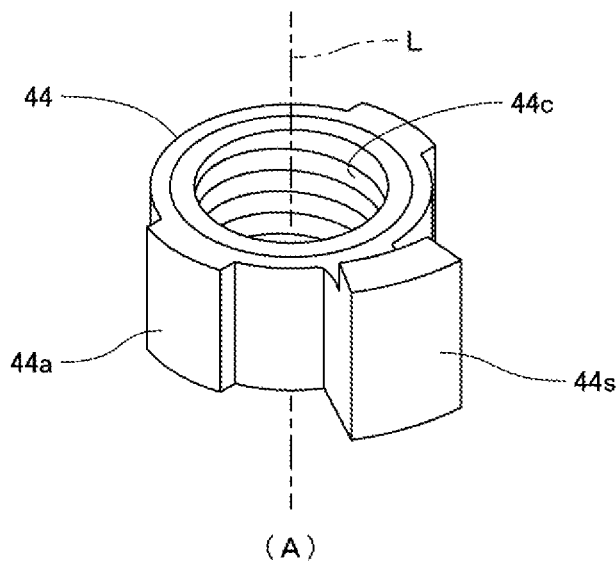
(A)
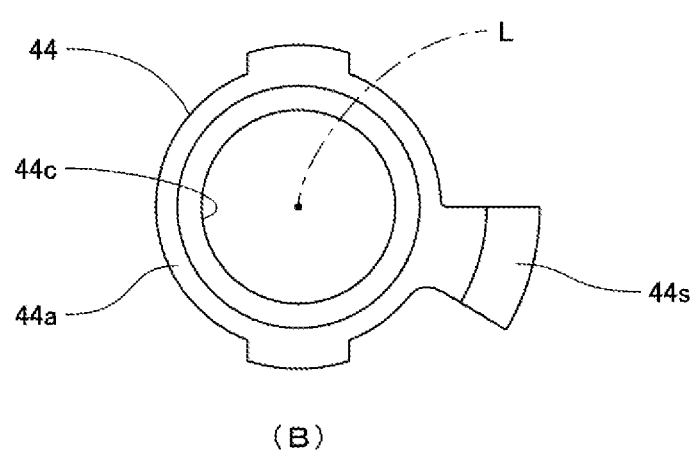
(B)

FIG.29

| # | time t | voltage value rv |
|---|---|---|
| 0 | 0 | 0.0 |
| 1 | 200 | 338.5 |
| 2 | 400 | 468.5 |
| 3 | 600 | 440.3 |
| 4 | 800 | 133.8 |
| 5 | 1000 | 65.8 |
| 6 | 1200 | 41.2 |
| 7 | 1400 | 30.4 |
| 8 | 1600 | 24.9 |
| 9 | 1800 | 23.7 |
| : | : | : |
| 34 | 6800 | 20.0 |
| 35 | 7000 | 15.8 |
| 36 | 7200 | 11.5 |
| 37 | 7400 | 7.8 |
| 38 | 7600 | 0.0 |
| 39 | 7800 | 0.0 |

ELECTRIC VALVE CONTROL DEVICE, ELECTRIC VALVE DEVICE, AND METHOD FOR CONTROLLING ELECTRIC VALVE

CROSS REFERENCE TO RELATED APPLICATION

This Application is a 371 of PCT/JP2022/034456 filed on Sep. 14, 2022 which, in turn, claimed the priority of Japanese Patent Application No. 2021-162138 filed on Sep. 30, 2021, and both applications are incorporated herein by reference.

TECHNICAL FIELD

The present invention relates to an electric valve control device, an electric valve device with the electric valve control device, and a method for controlling an electric valve.

BACKGROUND ART

Patent Literature 1 discloses an example of an electric valve according to the related art. The electric valve is installed in a refrigeration cycle system of an air conditioner. The electric valve includes a valve body, a valve member, and a stepping motor for moving the valve member. The stepping motor includes a rotor and a stator. The rotor rotates in response to pulses input to the stepping motor. The valve member moves along with the rotation of the rotor. When the rotor is at a reference position, a movable stopper rotating with the rotor is in contact with a fixed stopper fixed to the valve body, which restricts the rotation of the rotor in a first direction.

The electric valve is controlled by an electric valve control device. In an initialization operation, the electric valve control device inputs pulses to the stepping motor to rotate the rotor in the first direction and positions the rotor at the reference position. The number of pulses input to the stepping motor is large enough to bring the movable stopper into contact with the fixed stopper. Hereinafter, the number is referred to as "initialization number". When the rotor rotates in the first direction and the movable stopper comes into contact with the fixed stopper, the rotor is positioned at the reference position.

CITATION LIST

Patent Literature

Patent Literature 1: WO2019/130928

SUMMARY OF INVENTION

Technical Problem

The electric valve control device inputs pulses to the stepping motor until the number of pulses input to the stepping motor reaches the initialization number. Thus, the electric valve control device may further input pulses after the rotor is positioned at the reference position, resulting in a long duration of the initialization operation. Additionally, when pulses are input to the stepping motor after the rotor is positioned at the reference position, the movable stopper repeatedly collides with the fixed stopper, which causes a noise. Especially when the rotor is near the reference position immediately before the initialization operation, the noise lasts a long time.

Accordingly, it is an object of the present invention to provide an electric valve control device capable of reducing a duration of an initialization operation for an electric valve and suppressing noise, an electric valve device including the electric valve control device, and a method for controlling an electric valve.

Solution to Problem

The inventors used a plurality of electric valves, measured voltages that are generated in stators by rotations of rotors (voltages induced in stators due to electromagnetic induction) in an initialization operation of the electric valves, and intensively studied the measurement results. As a result, the inventors found a difference between a waveform of the voltage measured before the rotation of the rotor is restricted by a stopper mechanism and a waveform of the voltage measured after the rotation of the rotor is restricted by the stopper mechanism. The present invention has been achieved based on the findings.

An electric valve control device controls an electric valve. The electric valve includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position. The electric valve control device includes a rotation controller configured to supply a driving current to the stator to rotate the rotor in the first direction, a voltage obtainer configured to obtain a voltage generated in the stator by the rotation of the rotor, and a state determiner configured to determine whether the electric valve is in a rotation restricted state, where the rotation of the rotor in the first direction is restricted by the stopper mechanism, based on at least one of (i) an area of a waveform of the voltage, (ii) an amplitude of a wave periodically observed in the waveform of the voltage, and (iii) a periodic appearance of a new wave distinct from the waves periodically observed in the waveform of the voltage.

Preferably, the rotation controller stops supplying the driving current to the stator when the state determiner determines that the electric valve is in the rotation restricted state.

Preferably, the stator includes an A-phase stator and a B-phase stator. Preferably, when the rotation controller supplies the driving current only to one of the A-phase and B-phase stators, the voltage obtainer obtains the voltage generated in the other of the A-phase and B-phase stators.

Preferably, the valve member faces the valve seat and is pushed toward the valve seat via a coil spring when the rotor rotates in the first direction. Preferably, the reference position is reached by the rotor when the rotor further rotates in the first direction from a valve closing position where the valve member is in contact with the valve seat. Preferably, the state determiner determines that the electric valve is in an intermediate state where the rotor is at a position between the valve closing position and the reference position when the waves periodically observed in the waveform of the voltage gradually decrease in amplitude.

An electric valve control device controls an electric valve. The electric valve includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position. The electric valve control device includes a rotation controller configured to supply a driving current to the stator to rotate the rotor in the first direction, a current obtainer configured to obtain a current generated in the stator by the rotation of the rotor, and a state determiner configured to determine whether the electric valve is in a rotation restricted state, where the rotation of the rotor in the first direction is restricted by the stopper mechanism, based on at least one of (i) an area of a waveform of the current, (ii) an amplitude of a wave periodically observed in the waveform of the current, and (iii) a periodic appearance of a new wave distinct from the waves periodically observed in the waveform of the current.

An electric valve device includes the electric valve and the electric valve control device.

A method for controlling an electric valve is provided. The electric valve includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position. The method includes supplying a driving current to the stator to rotate the rotor in the first direction, obtaining a voltage generated in the stator by the rotation of the rotor, and determining whether the electric valve is in a rotation restricted state, where the rotation of the rotor in the first direction is restricted by the stopper mechanism, based on at least one of (i) an area of a waveform of the voltage, (ii) an amplitude of a wave periodically observed in the waveform of the voltage, and (iii) a periodic appearance of a new wave distinct from the waves periodically observed in the waveform of the voltage.

A method for controlling an electric valve is provided. The electric valve includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position. The method includes supplying a driving current to the stator to rotate the rotor in the first direction, obtaining a current generated in the stator by the rotation of the rotor, and determining whether the electric valve is in a rotation restricted state, where the rotation of the rotor in the first direction is restricted by the stopper mechanism, based on at least one of (i) an area of a waveform of the current, (ii) an amplitude of a wave periodically observed in the waveform of the current, and (iii) a periodic appearance of a new wave distinct from the waves periodically observed in the waveform of the current.

To achieve the object above, an electric valve control device according to one aspect of the present invention is an electric valve control device for controlling an electric valve. The electric valve includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position. The electric valve control device includes a rotation controller configured to input a pulse to the stepping motor to rotate the rotor in the first direction, a voltage obtainer configured to obtain a voltage generated in the stator by the rotation of the rotor, and a state determiner configured to determine whether the electric valve is in a first-rotation restricted state where the rotation of the rotor in the first direction is restricted, based on a degree of difference between a waveform of the voltage and a reference waveform of the voltage.

In the present invention, preferably, the reference waveform includes a first-rotation permitted state waveform which is set based on a waveform of the voltage obtained when the electric valve is in a state where the rotation of the rotor in the first direction is permitted and the pulse (hereinafter referred to as "first-direction pulse") for rotating the rotor in the first direction is input to the stepping motor. Preferably, the state determiner calculates a difference degree score indicating a degree of difference between the first-rotation permitted state waveform and a waveform of the voltage obtained by the voltage obtainer in response to the first-direction pulse being input to the stepping motor, and the state determiner determines whether the electric valve is in the first-rotation restricted state, based on a result of comparing the difference degree score with a difference degree score threshold.

In the present invention, preferably, the reference waveform includes a first-rotation restricted state waveform which is set based on a waveform of the voltage obtained when the electric valve is in a state where the rotation of the rotor in the first direction is restricted and the pulse (hereinafter referred to as "first-direction pulse") for rotating the rotor in the first direction is input to the stepping motor. Preferably, the state determiner calculates a difference degree score indicating a degree of difference between the first-rotation restricted state waveform and a waveform of the voltage obtained by the voltage obtainer in response to the first-direction pulse being input to the stepping motor, and the state determiner determines whether the electric valve is in the first-rotation restricted state, based on a result of comparing the difference degree score with a difference degree score threshold.

In the present invention, preferably, the reference waveform includes a first-rotation permitted state waveform which is set based on a waveform of the voltage obtained when the electric valve is in a state where the rotation of the rotor in the first direction is permitted and the pulse (hereinafter referred to as "first-direction pulse") for rotating the rotor in the first direction is input to the stepping motor, and a first-rotation restricted state waveform which is set based on a waveform of the voltage obtained when the electric valve is in a state where the rotation of the rotor in the first direction is restricted and the first-direction pulse is input to the stepping motor. Preferably, the state determiner calculates a difference degree score (hereinafter referred to as "first-rotation permitted state difference degree score") indicating a degree of difference between the first-rotation permitted state waveform and a waveform of the voltage obtained by the voltage obtainer in response to the first-direction pulse being input to the stepping motor. Preferably, the state determiner calculates a difference degree score (hereinafter referred to as "first-rotation restricted state difference degree score") indicating a degree of difference between the first-rotation restricted state waveform and a waveform of the voltage obtained by the voltage obtainer in response to the first-direction pulse being input to the stepping motor. Preferably, the state determiner determines whether the electric valve is in the first-rotation restricted state, based on a result of comparing the first-rotation permitted state difference degree score with a first-rotation permitted state difference degree score threshold and a result of comparing the first-rotation restricted state difference degree score with a first-rotation restricted state difference degree score threshold.

In the present invention, preferably, the rotation controller stops inputting the pulse to the stepping motor when the state determiner determines that the electric valve is in the first-rotation restricted state.

In the present invention, preferably, the reference waveform includes a second-rotation permitted state waveform which is set based on a waveform of the voltage obtained when the electric valve is in a state where the rotation of the rotor in the second direction is permitted and the pulse (hereinafter referred to as "second-direction pulse") for rotating the rotor in a second direction is input to the stepping motor. Preferably, the rotation controller inputs the pulse to the stepping motor to rotate the rotor in the second direction when the state determiner determines that the electric valve is in the first-rotation restricted state. Preferably, the state determiner calculates a difference degree score (hereinafter referred to as "second-rotation permitted state difference degree score") indicating a degree of difference between the second-rotation permitted state waveform and a waveform of the voltage obtained by the voltage obtainer in response to the second direction pulse being input to the stepping motor, and the state determiner determines whether the electric valve is in a second-rotation restricted state where the rotation of the rotor in the second direction is restricted, based on a result of comparing the second-rotation permitted state difference degree score with a second-rotation permitted state difference degree score threshold. Preferably, the rotation controller stops inputting the pulse to the stepping motor when the state determiner determines that the electric valve is in the second-rotation restricted state. Preferably, when a number of pulses input to the stepping motor after the state determiner determines that the electric valve is in the first-rotation restricted state reaches a reversal number of pulses, the rotation controller inputs the reversal number of pulses to the stepping motor to rotate the rotor in the first direction.

In the present invention, preferably, the reference waveform is represented as a data table provided for the first-direction pulse, and the data table includes a time and a reference voltage associated with the time. Preferably, the voltage obtainer sequentially obtains voltages each of which is the voltage obtained in response to the first-direction pulse being input to the stepping motor. Preferably, when the voltage obtainer obtains the voltage at an obtaining time in response to the first-direction pulse being input, the state determiner calculates a squared value (hereinafter referred to as "first intermediate value") of a difference value between the voltage obtained at the obtaining time and the reference voltage associated with the time corresponding to the obtaining time in the data table provided for the first-direction pulse input to the stepping motor. Preferably, the state determiner calculates the difference degree score by summing first intermediate values each of which is calculated by using the voltage obtained by the voltage obtainer in response to the first-direction pulse being input.

In the present invention, preferably, the reference waveform is represented as a data table provided for the second-direction pulse, and the data table includes a time and a reference voltage associated with the time. Preferably, the voltage obtainer sequentially obtains voltages each of which is the voltage obtained in response to the second-direction pulse being input to the stepping motor. Preferably, when the voltage obtainer obtains the voltage at an obtaining time in response to the second-direction pulse being input, the state determiner calculates a squared value (hereinafter referred to as "second intermediate value") of a difference value between the voltage obtained at the obtaining time and the reference voltage associated with the time corresponding to the obtaining time in the data table provided for the second-direction pulse input to the stepping motor. Preferably, the state determiner calculates the difference degree score by summing second intermediate values each of which is calculated by using the voltage obtained by the voltage obtainer in response to the second-direction pulse being input.

In the present invention, preferably, the state determiner calculates the difference degree score by summing the first intermediate values calculated by using the voltages obtained by the voltage obtainer in a part of a period of the first-direction pulse from a start time of the first-direction pulse to an end time of the first-direction pulse. Preferably, the voltage obtained in the part of the period includes a first voltage component due to back electromotive force generated by inductance of the stator and a second voltage component due to electromagnetic induction generated by the rotation of the rotor, and the first voltage component is smaller than the second voltage component.

In the present invention, preferably, the state determiner calculates the difference degree score by summing the second intermediate values calculated by using the voltages obtained by the voltage obtainer in a part of a period of the second-direction pulse from a start time of the second-direction pulse to an end time of the second-direction pulse. Preferably, the voltage obtained in the part of the period includes a first voltage component due to back electromotive force generated by inductance of the stator and a second voltage component due to electromagnetic induction generated by the rotation of the rotor, and the first voltage component is smaller than the second voltage component.

In the present invention, preferably, when the state determiner determines that the electric valve is in the first-rotation restricted state, the state determiner obtains a starting pattern number based on a pattern number of the first-direction pulse that corresponds to the waveform of the voltage used for determining the first-rotation restricted state. Preferably, when the rotation controller rotates the rotor at the reference position in the second direction, the rotation controller starts inputting pulses from the pulse of a pattern number identical to the starting pattern number.

In the present invention, preferably, the first-rotation restricted state waveform is provided for the first-direction pulse and is set based on waveforms of the voltage obtained in advance in the electric valve that is combined with the electric valve control device. Preferably, one first-rotation restricted state waveform is provided for one first-direction pulse.

In the present invention, preferably, the first-rotation restricted state waveform is provided for the first-direction pulse and is set based on waveforms of the voltage obtained in advance in electric valves. Preferably, first-rotation restricted state waveforms different from each other are provided for one first-direction pulse. Preferably, a number of the first-rotation restricted state waveforms provided for one first-direction pulse is identical to a number of a pattern of the pulse. Preferably, the first-rotation restricted state waveforms provided for one first-direction pulse are set based on the waveforms of the voltage obtained in the electric valves in which pulses corresponding to a timing when the stopper mechanism restricts the rotation of the rotor in the first direction are different from each other.

In the present invention, preferably, the stator includes an A-phase stator and a B-phase stator. Preferably, when the rotation controller supplies a driving current only to one of the A-phase and B-phase stators in response to inputting the pulse to the stepping motor, the voltage obtainer obtains the voltage generated in the other of the A-phase and B-phase stators.

In the present invention, preferably, the valve member faces the valve seat and is pushed toward the valve seat via a coil spring when the rotor rotates in the first direction. Preferably, the reference position is reached by the rotor when the rotor further rotates in the first direction from a valve closing position where the valve member is in contact with the valve seat.

To achieve the object above, an electric valve control device according to another aspect of the present invention is an electric valve control device for controlling an electric valve. The electric valve includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position. The electric valve control device includes a rotation controller configured to input a pulse to the stepping motor to rotate the rotor in the first direction, a current obtainer configured to obtain a current generated in the stator by the rotation of the rotor, and a state determiner configured to determine whether the electric valve is in a first-rotation restricted state where the rotation of the rotor in the first direction is restricted, based on a degree of difference between a waveform of the current and a reference waveform of the current.

To achieve the object above, an electric valve device according to still another aspect of the present invention is an electric valve device that includes the electric valve and the electric valve control device.

To achieve the object above, a method according to still another aspect of the present invention is a method for controlling an electric valve. The electric valve includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position. The method includes inputting a pulse to the stepping motor to rotate the rotor in the first direction, obtaining a voltage generated in the stator by the rotation of the rotor, and determining whether the electric valve is in a first-rotation restricted state where the rotation of the rotor in the first direction is restricted, based on a degree of difference between a waveform of the voltage and a reference waveform of the voltage.

To achieve the object above, a method according to still another aspect of the present invention is a method for controlling an electric valve. The electric valve includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position. The method includes inputting a pulse to the stepping motor to rotate the rotor in the first direction, obtaining a current generated in the stator by the rotation of the rotor, and determining whether the electric valve is in a first-rotation restricted state where the rotation of the rotor in the first direction is restricted, based on a degree of difference between a waveform of the current and a reference waveform of the current.

Advantageous Effects of Invention

According to one aspect of the present invention, the pulse is input to the stepping motor to rotate the rotor in the first direction. The voltage generated in the stator by the rotation of the rotor is obtained. Whether the electric valve is in the first-rotation restricted state where the rotation of the rotor is restricted is determined based on the degree of difference between the waveform of the voltage and the reference waveform of the voltage.

According to another aspect of the present invention, the pulse is input to the stepping motor to rotate the rotor in the first direction. The current generated in the stator by the rotation of the rotor is obtained. Whether the electric valve is in the first-rotation restricted state where the rotation of the rotor is restricted is determined based on the degree of difference between the waveform of the current and the reference waveform of the current.

In such configuration, when the electric valve capable of normal operation is determined to be in the first-rotation restricted state, the rotor is at the reference position. As a result, stopping the rotation of the rotor in the first direction when the electric valve is determined to be in the first-rotation restricted state enables the duration of the initialization operation to be reduced and a long-lasting noise after the rotor reaches the reference position to be suppressed. Additionally, the state of the electric valve is determined based on the degree of difference between the waveforms, which enables the state of the electric valve to be determined more accurately than with a configuration in which the state of the electric valve is determined based on the areas or maximum amplitudes of the waveforms.

BRIEF DESCRIPTION OF DRAWINGS

FIG. 3 is a diagram illustrating a valve stem holder of the electric valve device in FIG. 2.

FIG. 5 is a diagram illustrating a stopper member of the electric valve device in FIG. 2.

FIG. 29 is a diagram illustrating an example of a data table of the reference waveform of the voltage (first-rotation permitted state table).

DESCRIPTION OF EMBODIMENTS

An electric valve device is described below with reference to FIGS. 1 to 19. An electric valve device 1 is used as, for example, a flow control valve for controlling the flow rate of refrigerant in a refrigeration cycle system of an air conditioner.

Figure 1:
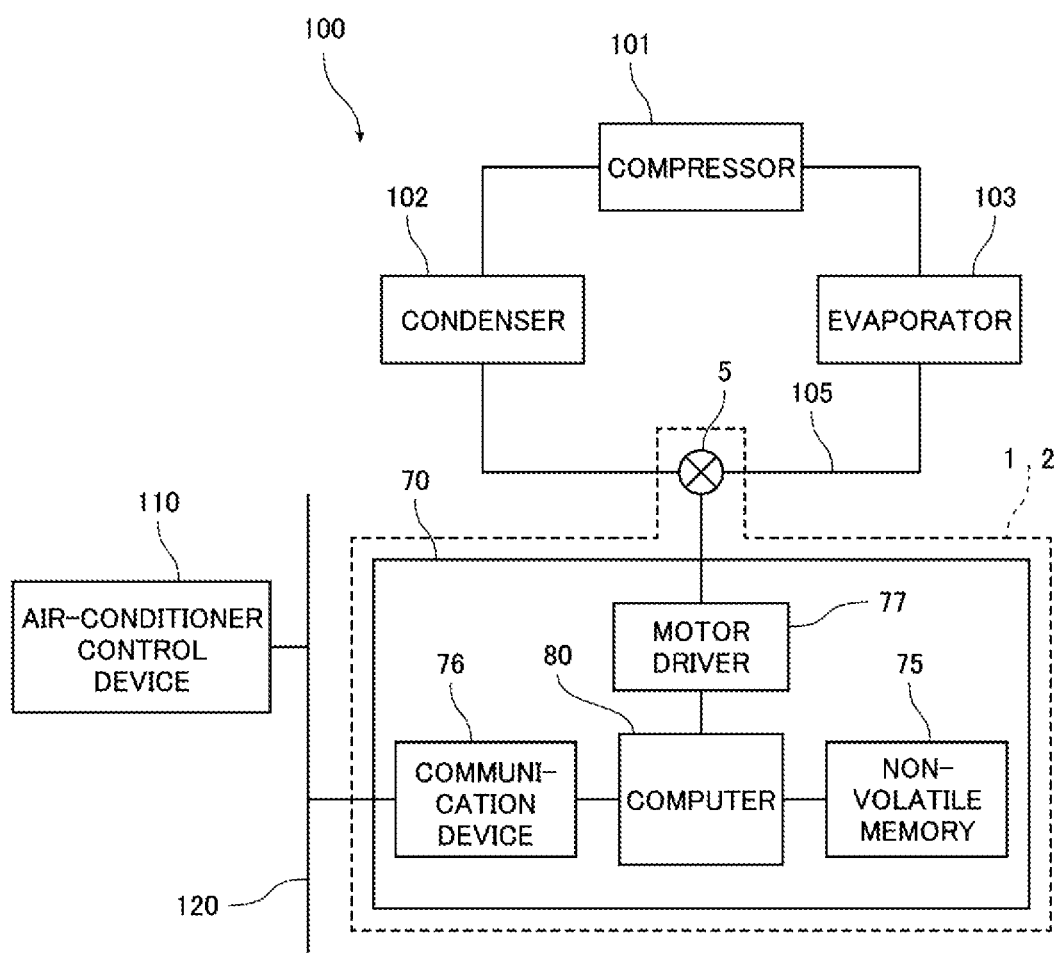
FIG. 1 is a block diagram of an air conditioning system including an electric valve device.
Figure 2:
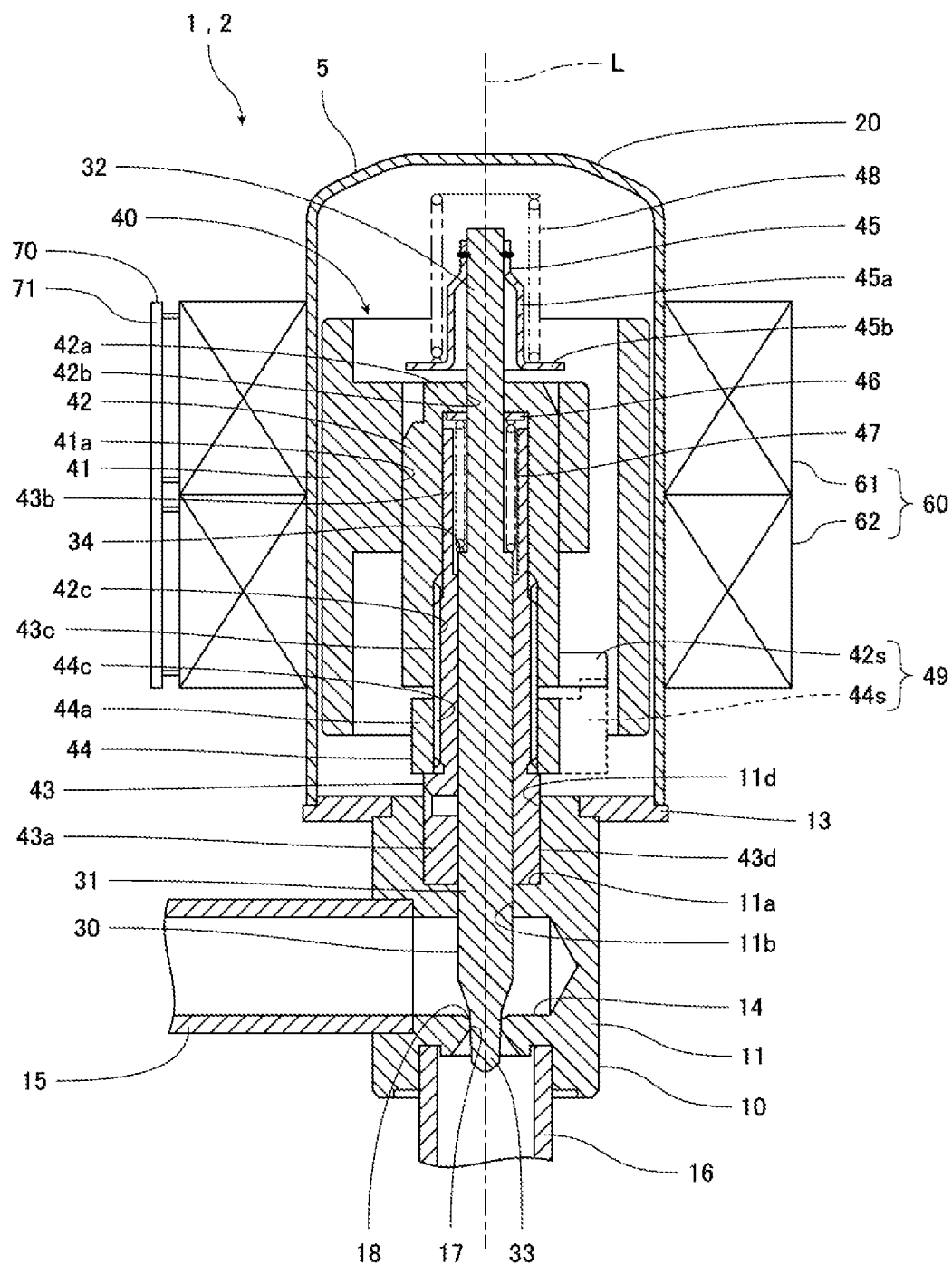
FIG. 2 is a sectional view of the electric valve device in FIG. 1.
Figure 4:
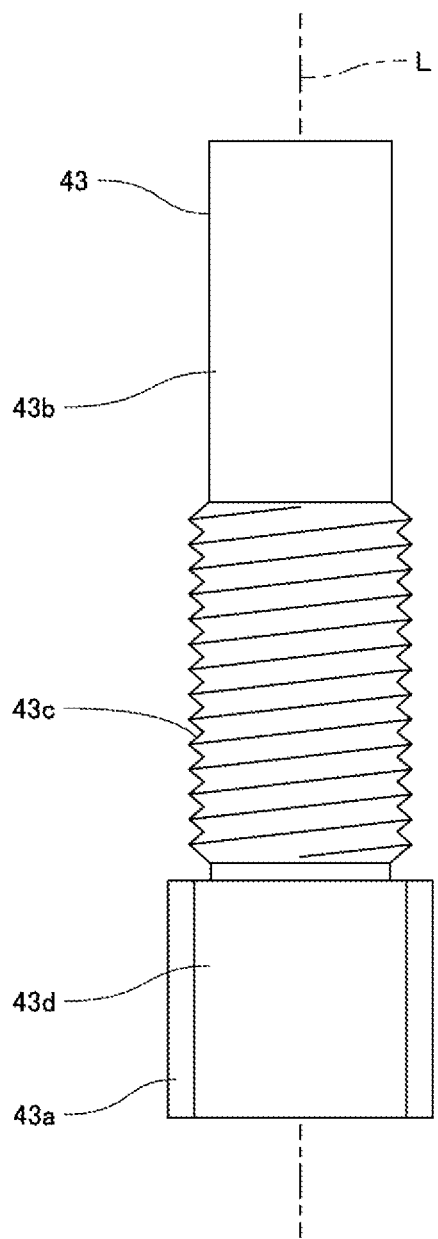
FIG. 4 is a side view of a guide bush of the electric valve device in FIG. 2.
Figure 6:
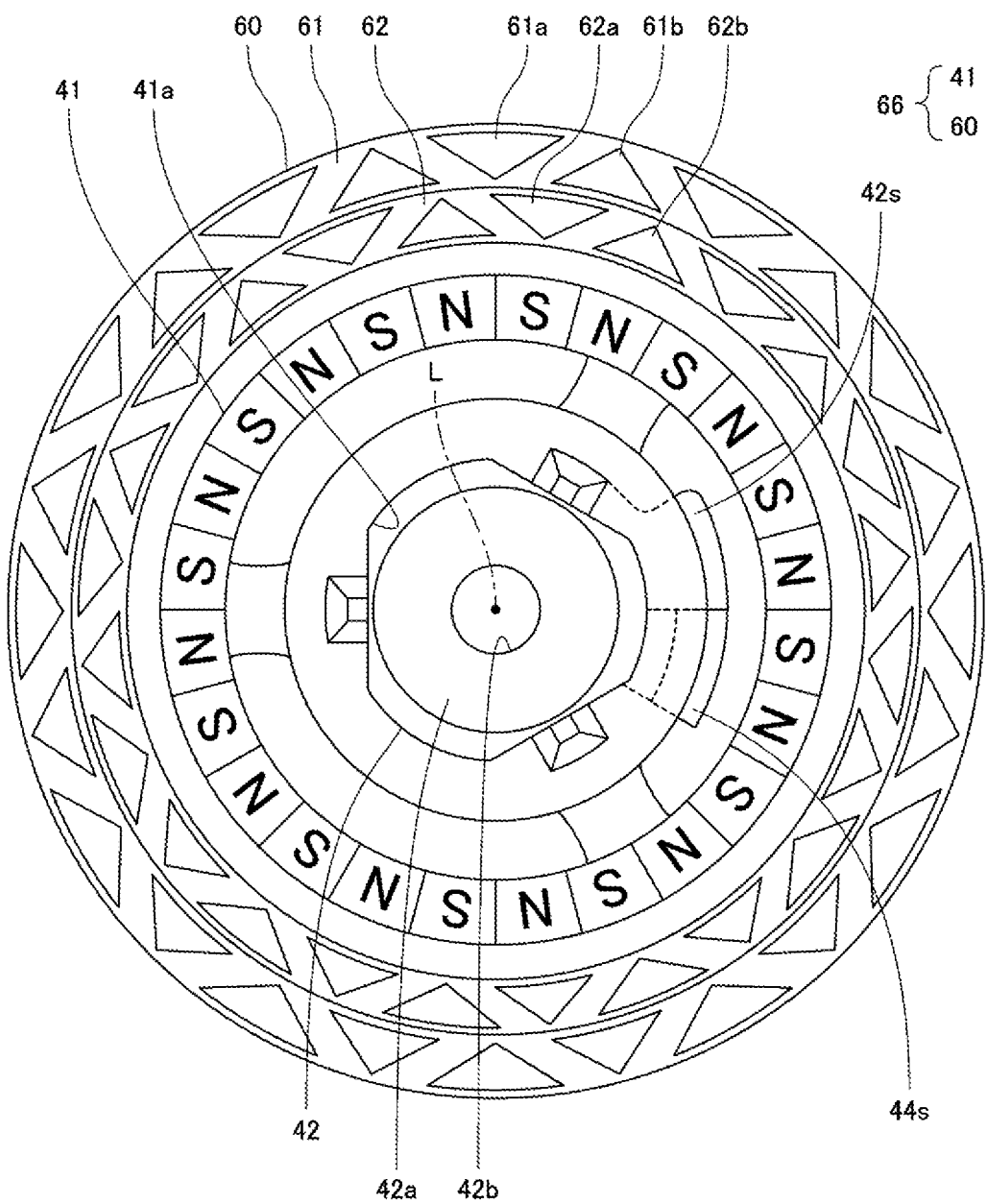
FIG. 6 is a plan view of the valve stem holder, the stopper member, a rotor, and a stator of the electric valve device in FIG. 2.
Figure 7:
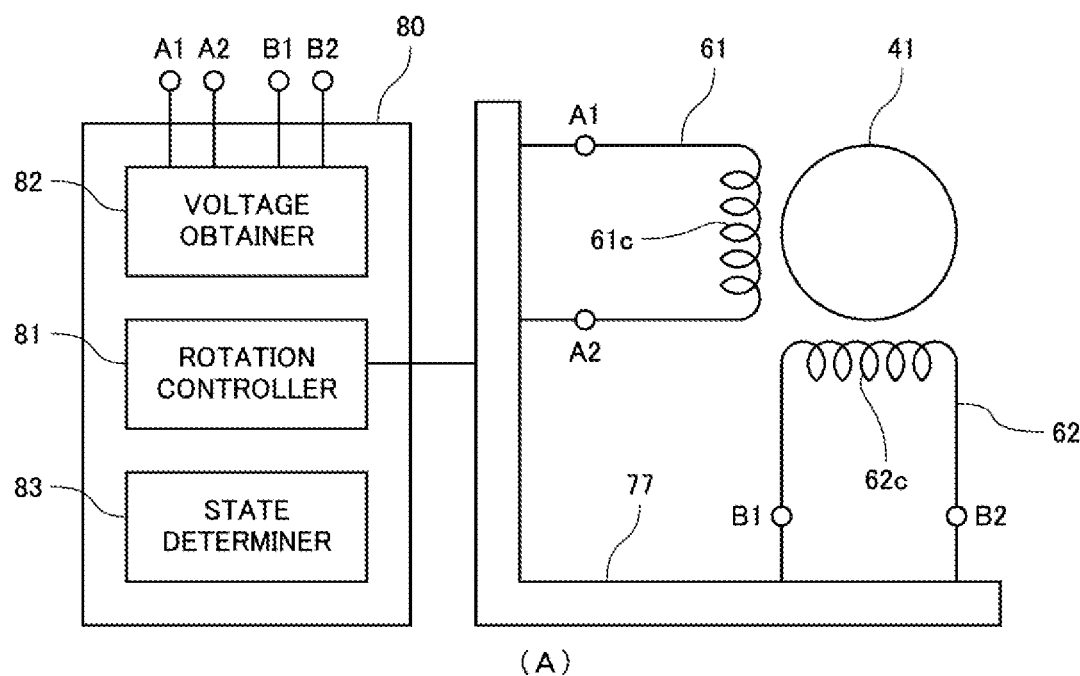
FIG. 7 is a diagram illustrating a computer, a motor driver, and a stepping motor of the electric valve device in FIG. 2.
Figure 8:
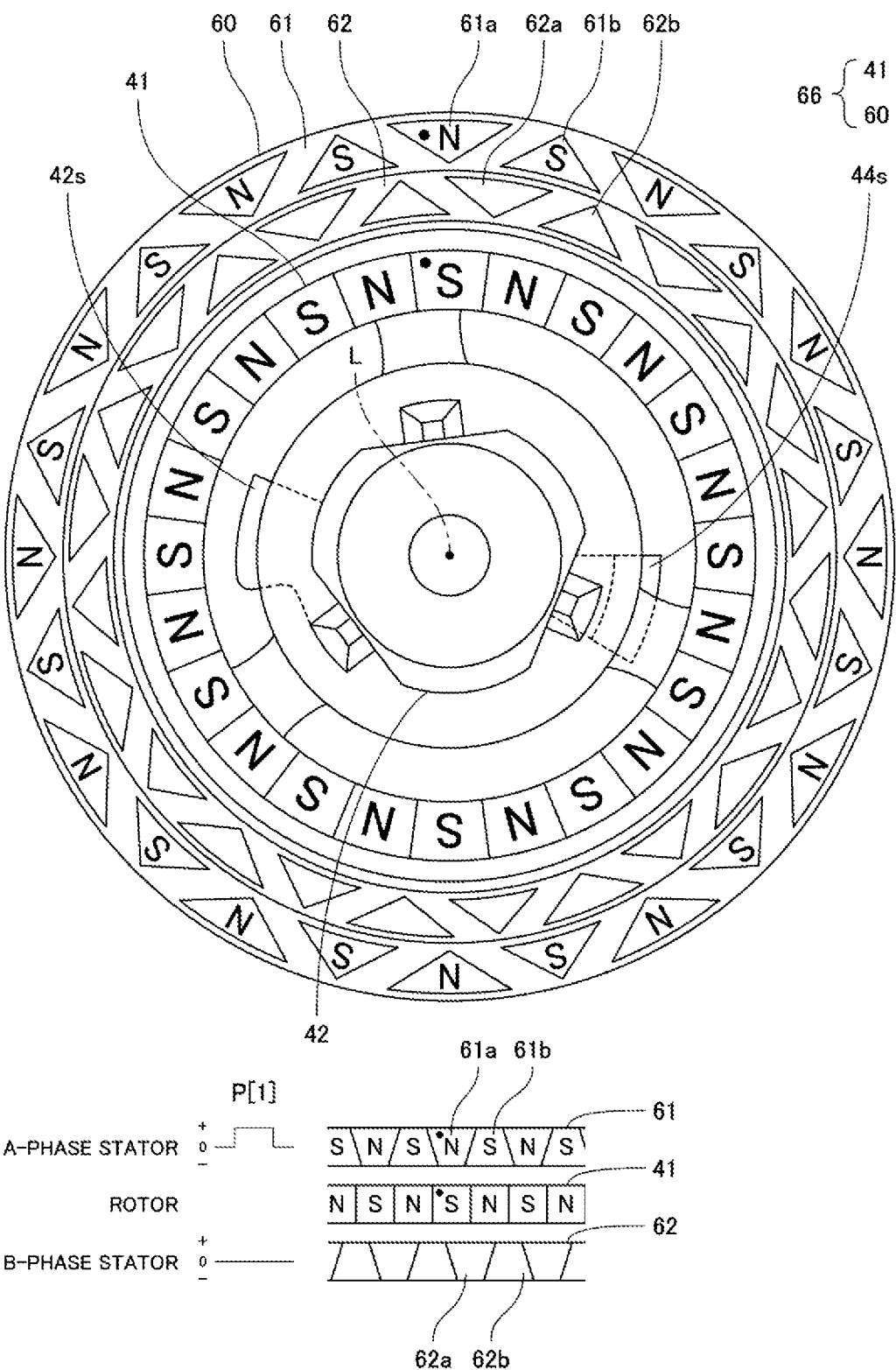
FIG. 8 is a diagram schematically illustrating a positional relationship between magnetic poles of the rotor and pole teeth of the stator (when pulse P[1] is input).
Figure 9:
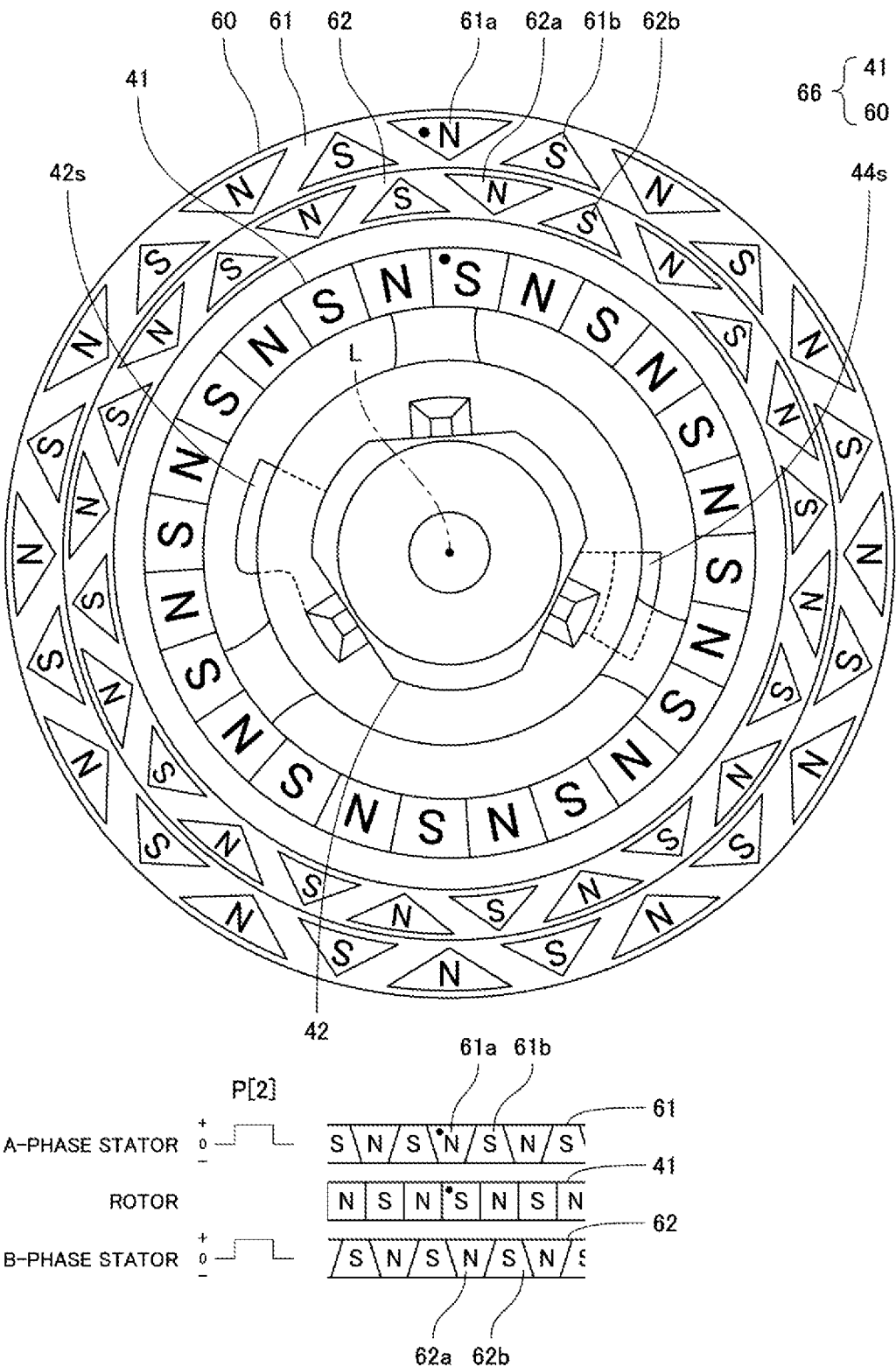
FIG. 9 is a diagram schematically illustrating the positional relationship between the magnetic poles of the rotor and the pole teeth of the stator (when pulse P[2] is input).
Figure 10:
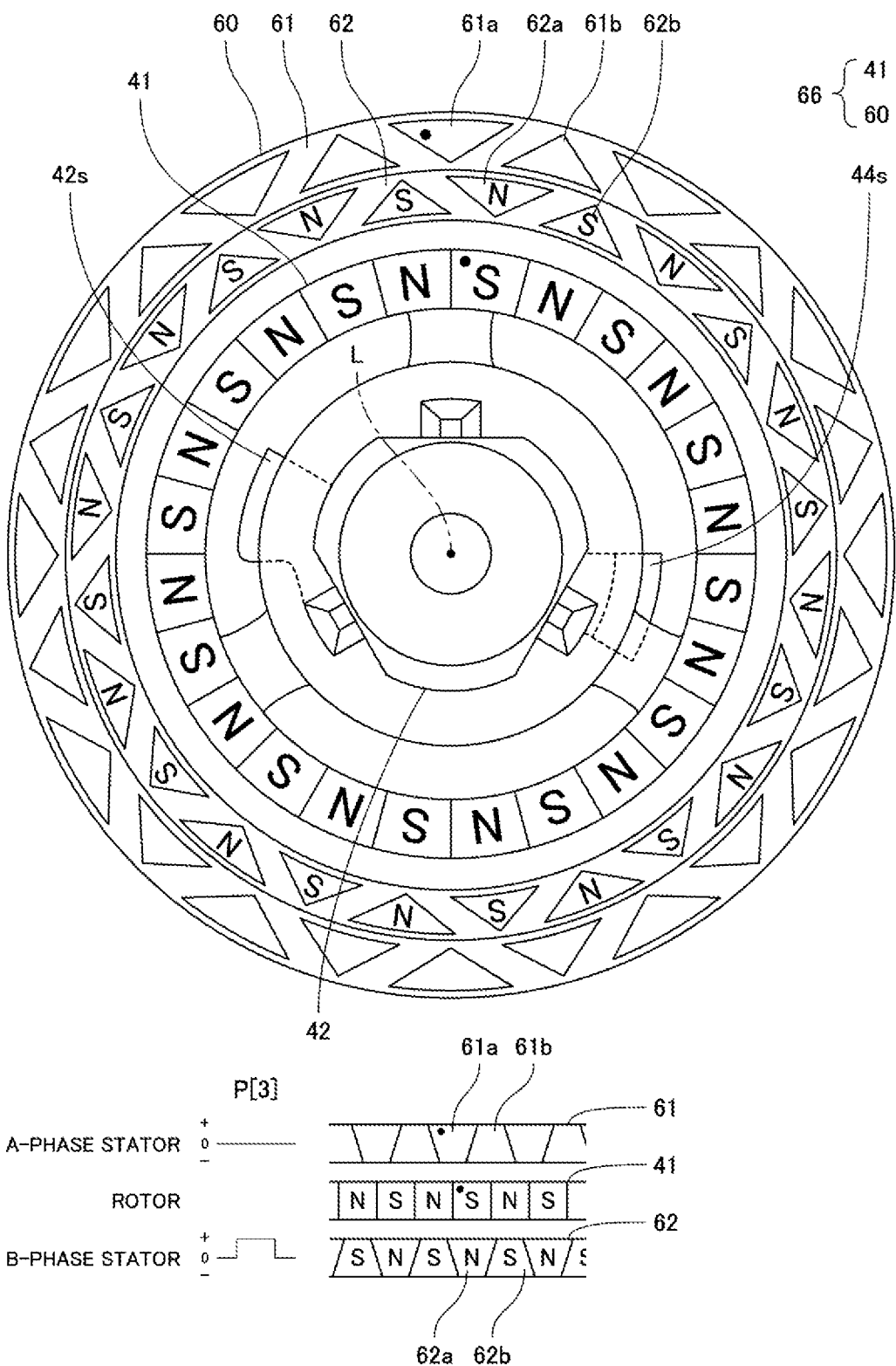
FIG. 10 is a diagram schematically illustrating the positional relationship between the magnetic poles of the rotor and the pole teeth of the stator (when pulse P[3] is input).
Figure 11:
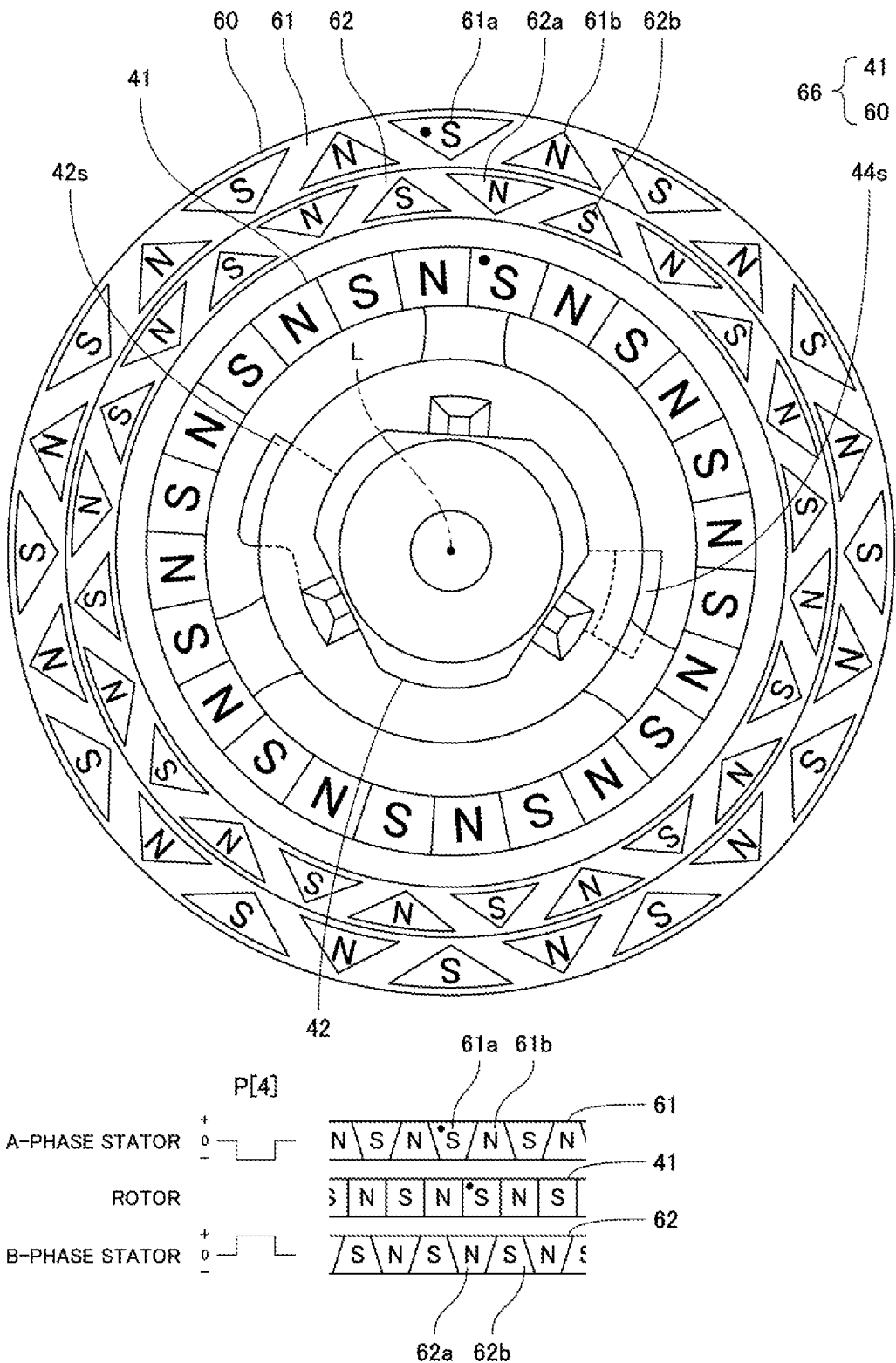
FIG. 11 is a diagram schematically illustrating the positional relationship between the magnetic poles of the rotor and the pole teeth of the stator (when pulse P[4] is input).
Figure 12:
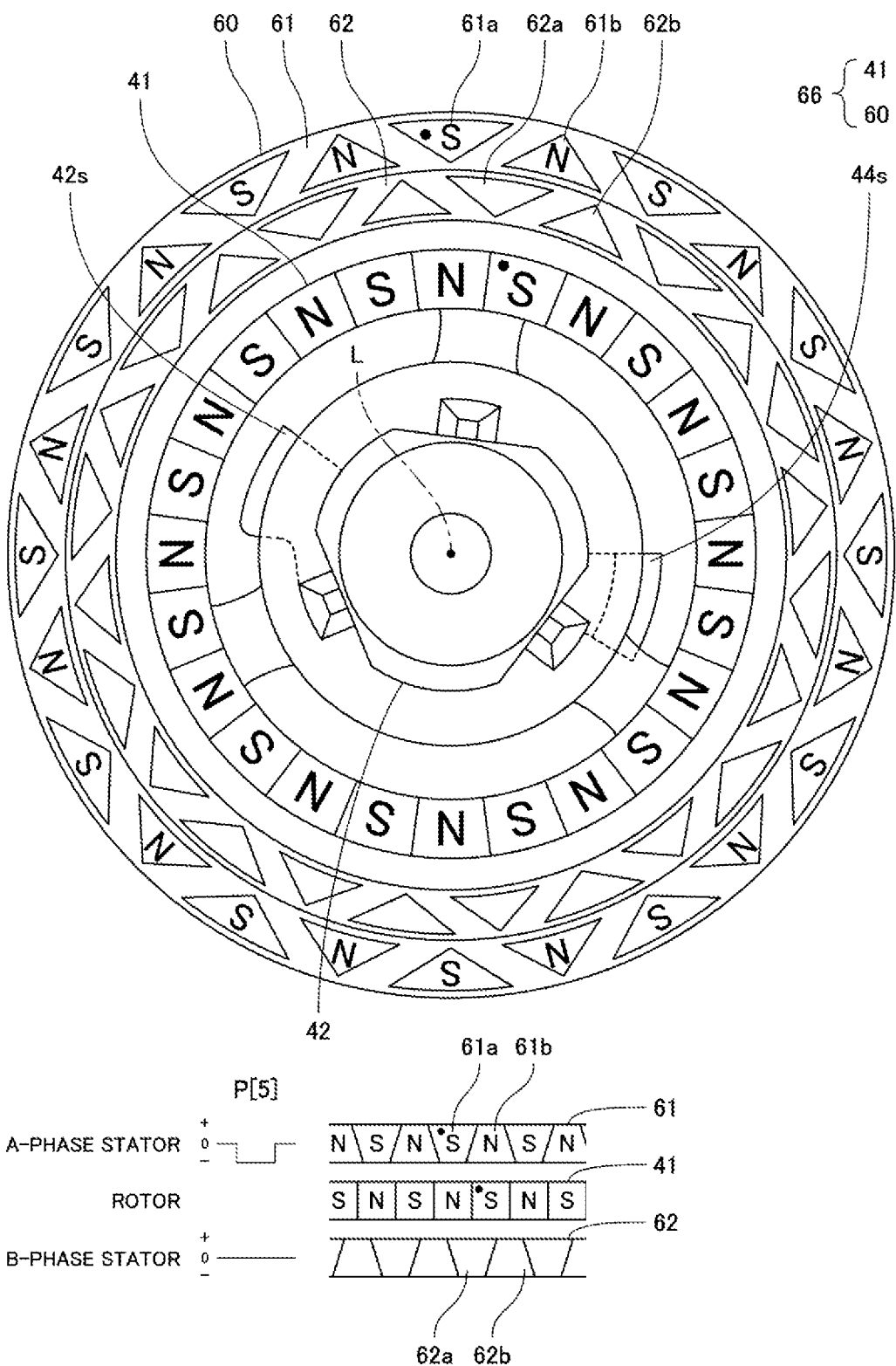
FIG. 12 is a diagram schematically illustrating the positional relationship between the magnetic poles of the rotor and the pole teeth of the stator (when pulse P[5] is input).
Figure 13:
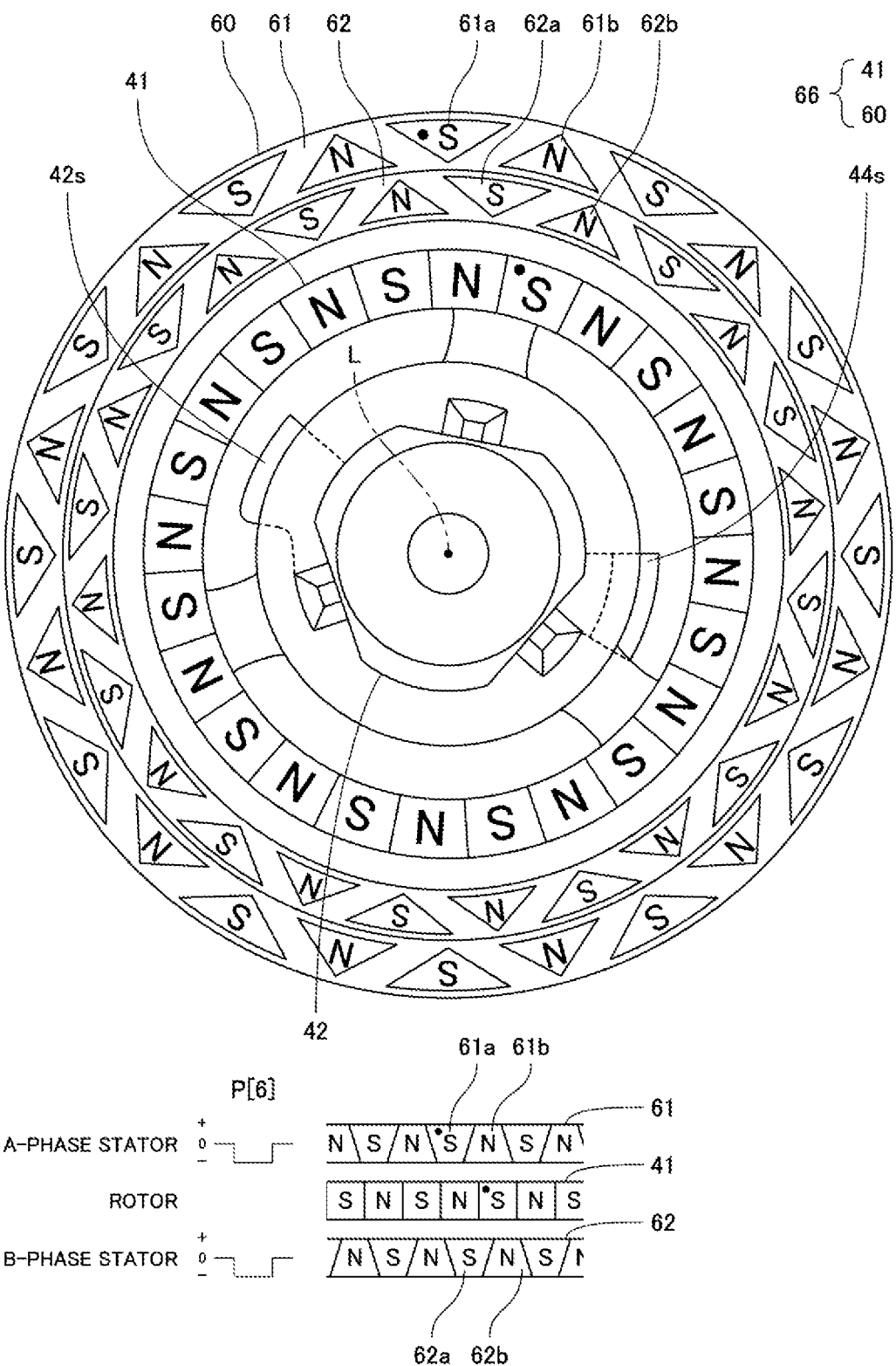
FIG. 13 is a diagram schematically illustrating the positional relationship between the magnetic poles of the rotor and the pole teeth of the stator (when pulse P[6] is input).
Figure 14:
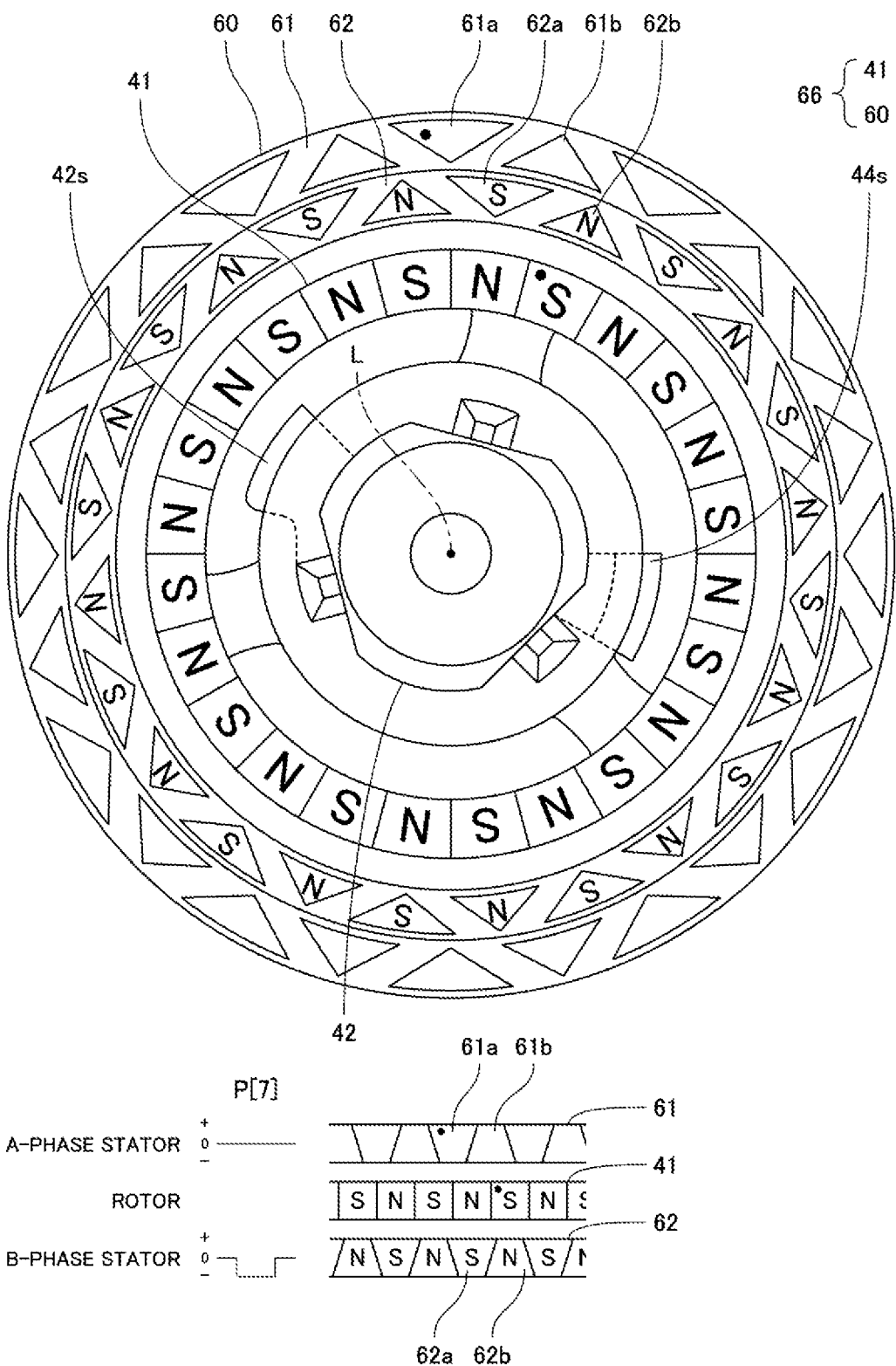
FIG. 14 is a diagram schematically illustrating the positional relationship between the magnetic poles of the rotor and the pole teeth of the stator (when pulse P[7] is input).
Figure 15:
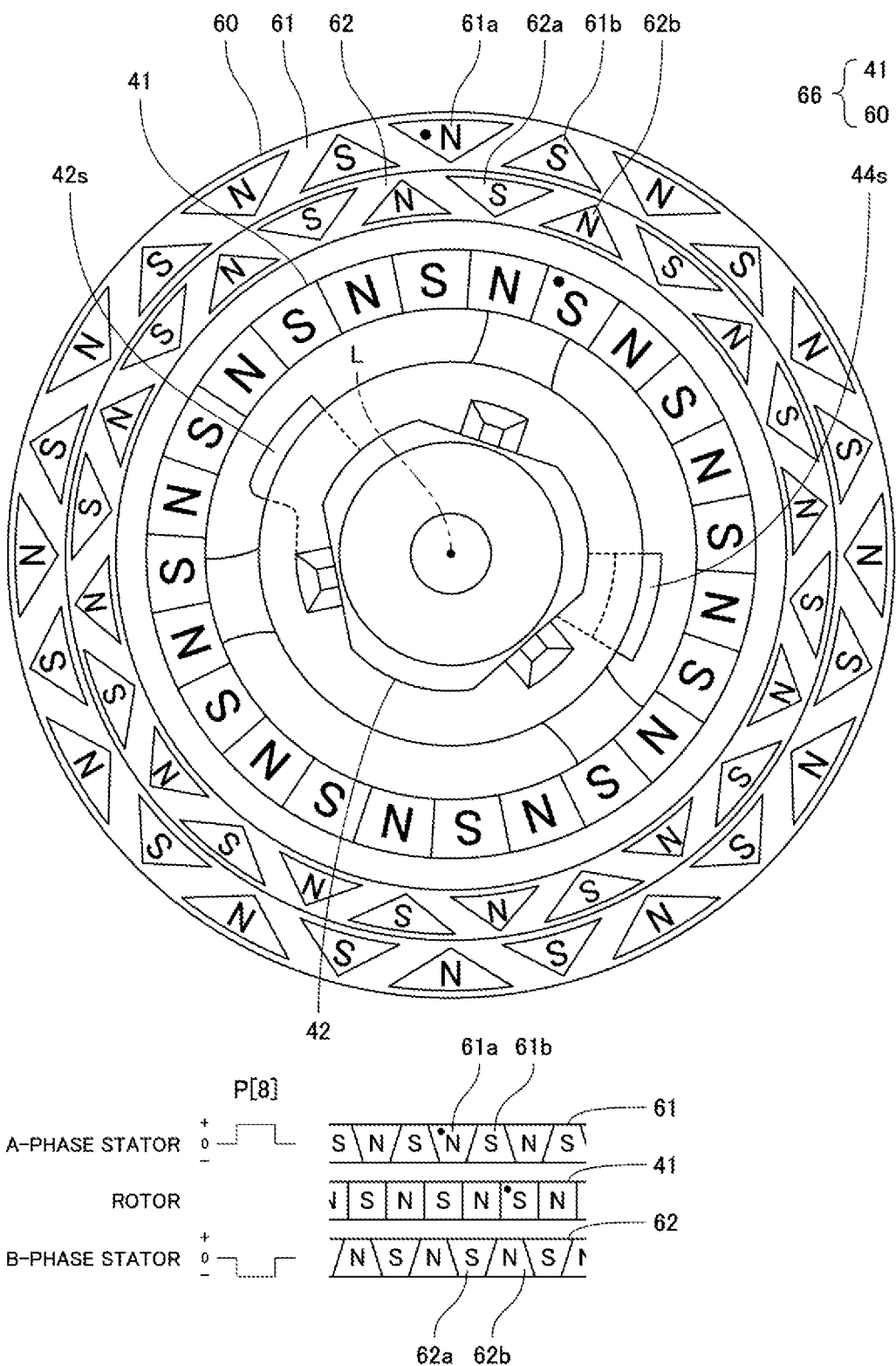
FIG. 15 is a diagram schematically illustrating the positional relationship between the magnetic poles of the rotor and the pole teeth of the stator (when pulse P[8] is input).
Figure 16:
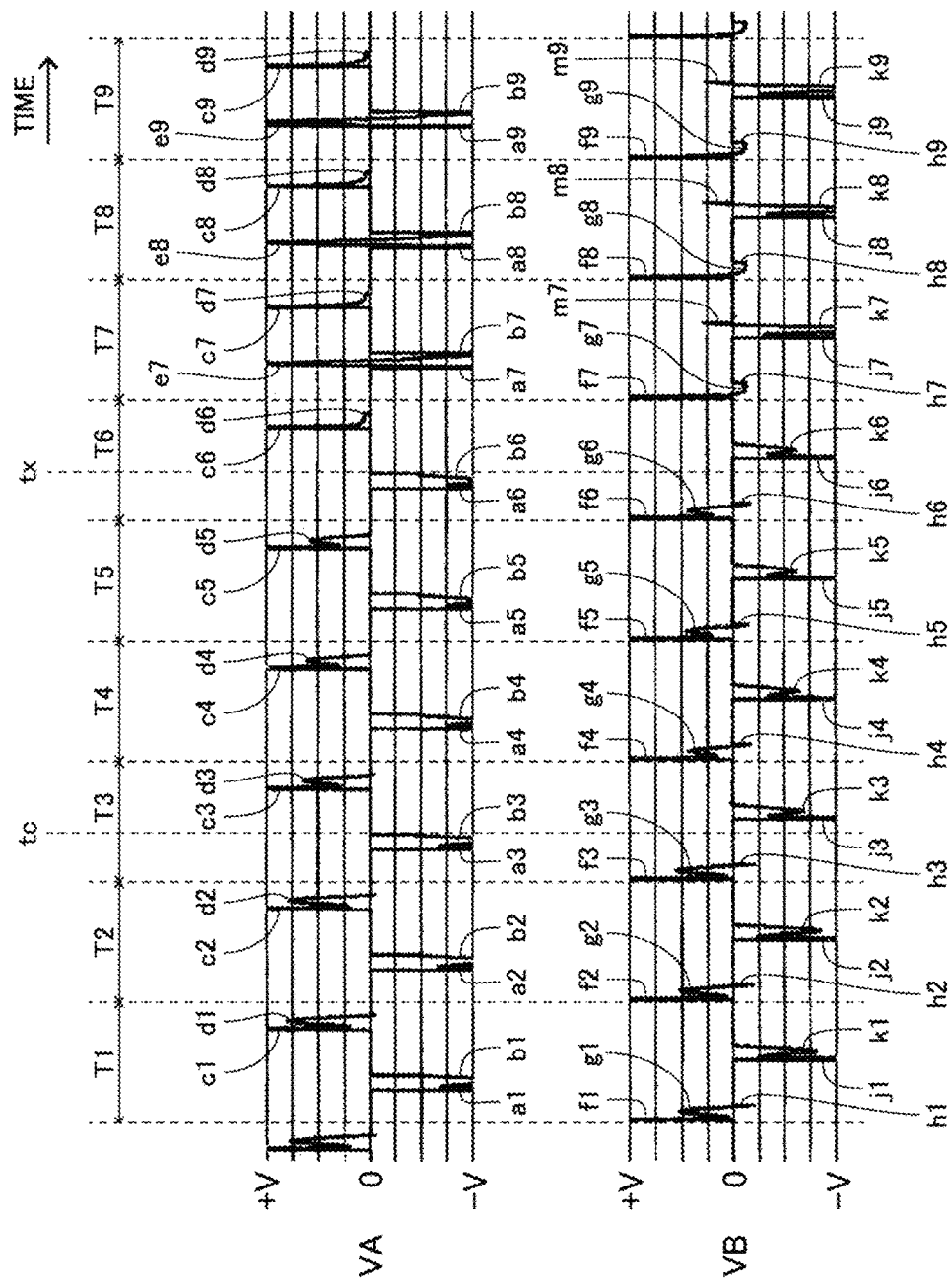
FIG. 16 is a diagram showing an example of a waveform of a voltage generated in the stator by rotation of the rotor in an initialization operation of the electric valve device.
Figure 17:
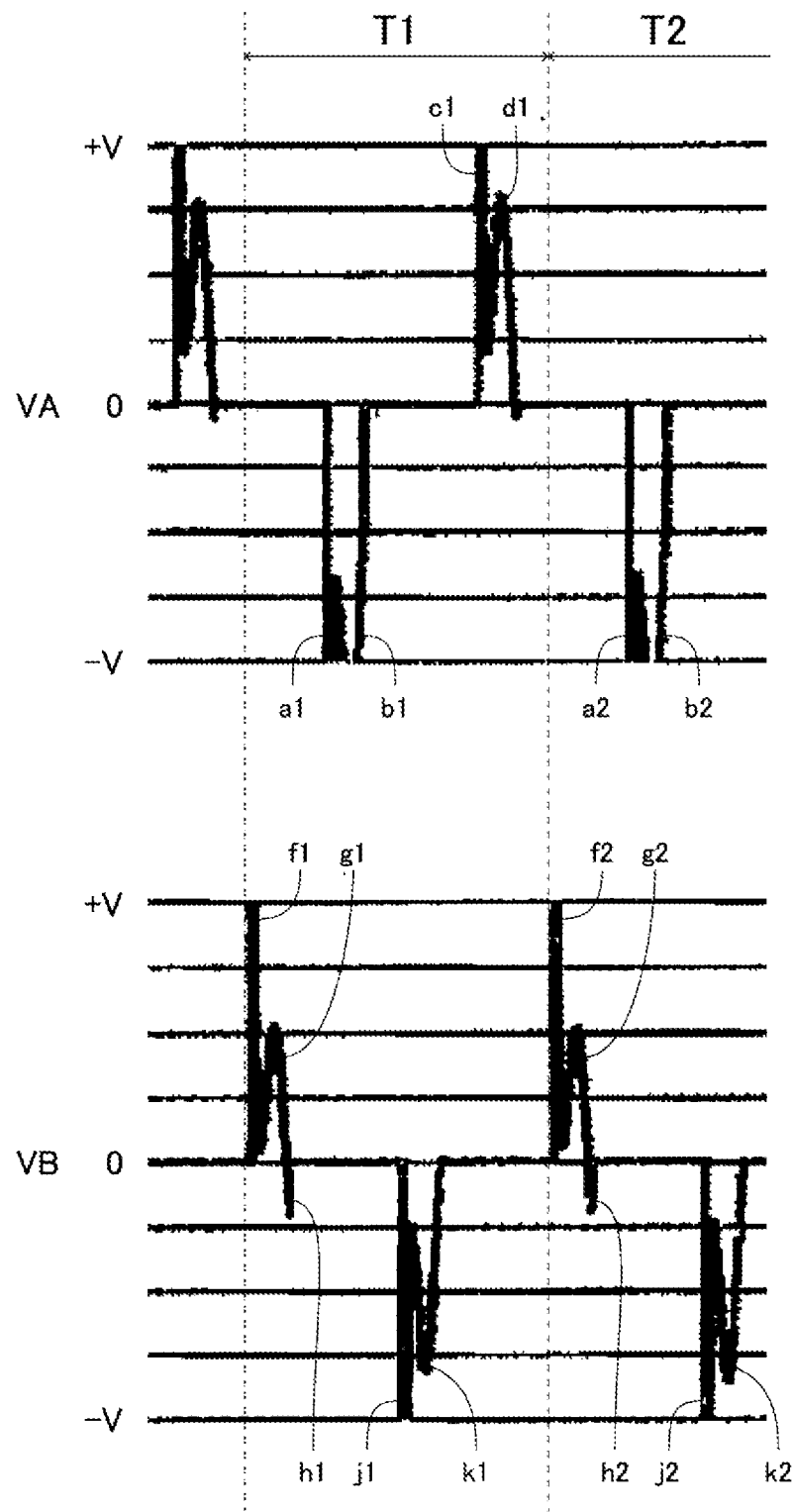
FIG. 17 is an enlarged view of a part of the waveform of the voltage in FIG. 16.
Figure 18:
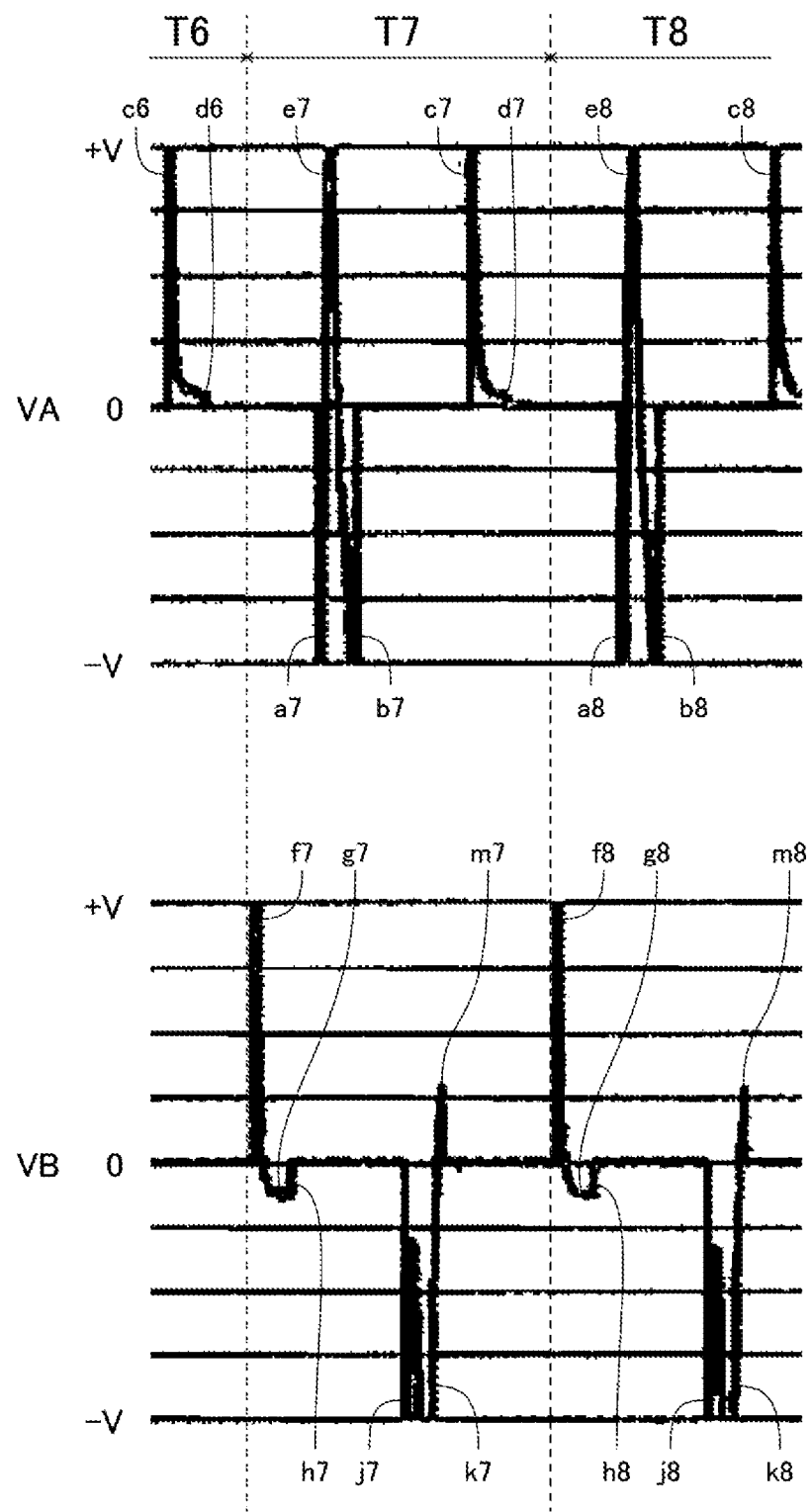
FIG. 18 is an enlarged view of another part of the waveform of the voltage in FIG. 16.
Figure 19:
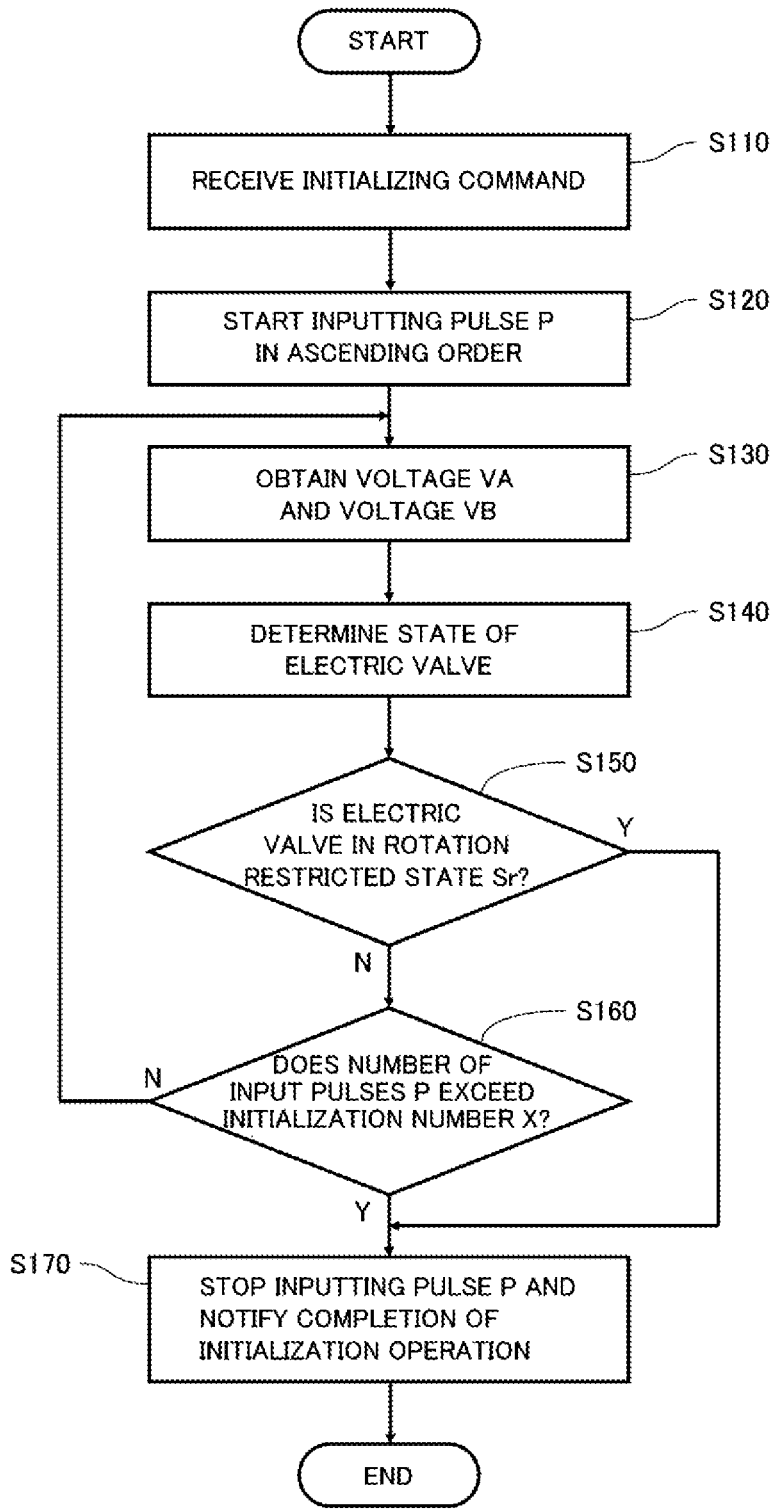
FIG. 19 is a flowchart illustrating an example of the initialization operation executed by the computer included in the electric valve device in FIG. 2.

FIG. 1 is a block diagram of an air conditioning system including an electric valve device. FIG. 2 is a sectional view of the electric valve device in FIG. 1. FIG. 2 schematically illustrates a stator and an electric valve control device. FIG. 3 is a diagram illustrating a valve stem holder of the electric valve device in FIG. 2. FIG. 3A is a perspective view of the valve stem holder. FIG. 3B is a plan view of the valve stem holder. FIG. 4 is a side view of a guide bush of the electric valve device in FIG. 2. FIG. 5 is a diagram illustrating a stopper member of the electric valve device in FIG. 2. FIG. 5A is a perspective view of the stopper member. FIG. 5B is a plan view of the stopper member. FIG. 6 is a plan view of the valve stem holder, the stopper member, a rotor, and the stator of the electric valve device in FIG. 2. FIG. 6 schematically illustrates the stator and magnetic poles of the rotor. FIG. 7 is a diagram illustrating a computer, a motor driver, and a stepping motor of the electric valve device in FIG. 2. FIG. 7A schematically illustrates connections among the computer and motor driver of the electric valve control device, and the stepping motor. FIG. 7B shows an example of correspondence between pulses and driving currents supplied to the stator by the motor driver. FIGS. 8 to 15 are diagrams schematically illustrating positional relationships between the magnetic poles of the rotor and pole teeth of the stator. FIGS. 8 to 15 correspond to when pulses P[1] to P[8] are input. FIGS. 8 to 15 schematically illustrate the stator and the magnetic poles of the rotor. FIG. 16 is a diagram showing an example of a waveform of a voltage generated in the stator by rotation of the rotor in an initialization operation of the electric valve device. FIG. 17 is an enlarged view of a part (in time period T1) of the waveform of the voltage in FIG. 16. FIG. 18 is an enlarged view of another part (in time period T7) of the waveform of the voltage in FIG. 16. FIG. 19 is a flowchart illustrating an example of the initialization operation executed by the computer included in the electric valve device in FIG. 2.

FIG. 1 illustrates an example of an air conditioning system 100 mounted in a vehicle. The air conditioning system 100 includes a compressor 101, a condenser 102, the electric valve device 1 (an electric valve 5), and an evaporator 103, which are connected in this order by a pipe 105. The electric valve device 1 functions as an expansion valve. The air conditioning system 100 includes an air conditioner control device 110. The air conditioner control device 110 is connected to the electric valve device 1 and can communicate with the electric valve device 1. The air conditioner control device 110 uses the electric valve device 1 to control the flow rate of refrigerant flowing through the pipe 105.

As illustrated in FIG. 2, the electric valve device 1 includes the electric valve 5 and an electric valve control device 70.

The electric valve 5 includes a valve body 10, a can 20, a valve member 30, a driving mechanism 40, and a stator 60.

The valve body 10 includes a body member 11 and a connection member 13. The body member 11 has a circular columnar shape. The body member 11 has a valve chamber 14. A first conduit 15 and a second conduit 16 are bonded to the body member 11. The first conduit 15 is disposed in a direction perpendicular to an axis L (a lateral direction in FIG. 2) and is connected to the valve chamber 14. The second conduit 16 is disposed in a direction of the axis L (an up-and-down direction in FIG. 2) and is connected to the valve chamber 14 via a valve port 17. The valve port 17 is enclosed by a valve seat 18, which has a circular annular shape, in the valve chamber 14. The body member 11 has a fitting hole 11a, which has a circular shape. The fitting hole 11a is disposed in the upper end surface of the body member 11. The inner circumferential surface of the fitting hole 11a includes a planar part 11d facing leftward in FIG. 2. A through hole 11b is provided at the bottom of the fitting hole 11a and communicates with the valve chamber 14. The connection member 13 has an annular plate-like shape. The inner peripheral edge of the connection member 13 is bonded to the upper end portion of the body member 11. The body member 11 and the connection member 13 are made of a metal, such as an aluminum alloy, stainless steel, or brass.

The can 20 is made of a metal, such as stainless steel. The can 20 has a circular cylindrical shape. The can 20 is open at the lower end and is closed at the upper end. The lower end of the can 20 is bonded to the outer peripheral edge of the connection member 13.

The valve member 30 includes a first stem portion 31, a second stem portion 32, and a valve portion 33. The first stem portion 31 and the second stem portion 32 each have a circular columnar shape. The diameter of the second stem portion 32 is smaller than that of the first stem portion 31. The second stem portion 32 is provided coaxially and continuously with the upper end of the first stem portion 31. The valve member 30 has a step portion 34. The step portion 34 is an annular plane facing upward. The step portion 34 is disposed in the part where the second stem portion 32 is continuous with the first stem portion 31. The valve portion 33 has a substantially conical shape with a diameter decreasing from top to bottom. The valve portion 33 is provided coaxially and continuously with the lower end of the first stem portion 31. The valve portion 33 is disposed in the valve port 17. A variable throttle passage is formed between the valve portion 33 and the valve port 17. The valve portion 33 faces the valve seat 18. The valve port 17 is closed when the valve portion 33 is in contact with the valve seat 18.

The driving mechanism 40 moves the valve member 30 in the up-and-down direction (the direction of the axis L). The movement of the valve member 30 opens and closes the valve port 17. The driving mechanism 40 includes a rotor 41, a valve stem holder 42, a guide bush 43, a stopper member 44, and a fixed member 45.

The rotor 41 has a circular cylindrical shape. The outer diameter of the rotor 41 is slightly smaller than the inner diameter of the can 20. The rotor 41 is disposed inside the can 20. The rotor 41 is rotatable with respect to the valve body 10. The rotor 41 has a plurality of north (N) poles and a plurality of south (S) poles. The N poles and the S poles are disposed on the outer circumferential surface of the rotor 41. The N poles and the S poles each extend in the up-and-down direction. The N poles and the S poles are alternately arranged at regular angular intervals in the circumferential direction. In the electric valve device 1, the rotor 41 has 12 N poles and 12 S poles for example. The angle between the N pole and the S pole adjacent to each other is 15 degrees.

FIG. 3 illustrates the valve stem holder 42. The valve stem holder 42 has a circular cylindrical shape. The valve stem holder 42 is open at the lower end and is closed at the upper end. The valve stem holder 42 is fitted into a fitting hole 41a of the rotor 41. The valve stem holder 42 rotates together with the rotor 41. A movable stopper 42s is disposed at the lower end of the outer circumferential surface of the valve stem holder 42. The movable stopper 42s is a protrusion radially extending outward from the outer circumferential surface of the valve stem holder 42. The valve stem holder 42 includes an upper wall portion 42a. The upper wall portion 42a has a stem hole 42b. The second stem portion 32 of the valve member 30 is disposed in the stem hole 42b movably in the direction of the axis L. The upper wall portion 42a of the valve stem holder 42 has a lower surface on which a washer 46 is disposed. A valve closing spring 47 is disposed between the washer 46 and the step portion 34 of the valve member 30. The valve closing spring 47 is a coil spring and pushes the valve member 30 toward the valve seat 18. The inner circumferential surface of the valve stem holder 42 has an internal thread 42c. The movable stopper 42s is fixed with respect to the rotor 41.

FIG. 4 illustrates the guide bush 43. The guide bush 43 includes a base portion 43a and a support portion 43b. The base portion 43a and the support portion 43b each have a circular cylindrical shape. The outer circumferential surface of the base portion 43a has a planar part 43d. The base portion 43a is press-fitted into the fitting hole 11a of the body member 11, and the planar part 43d is in contact with the planar part 11d of the fitting hole 11a. This allows the central axis of the guide bush 43 to be aligned with that of the body member 11 on the axis L and allows the guide bush 43 to be properly positioned with respect to the body member 11 about the axis L. The outer diameter of the support portion 43b is smaller than that of the base portion 43a. The inner diameter of the support portion 43b is equal to that of the base portion 43a. The support portion 43b is provided coaxially and continuously with the upper end of the base portion 43a. The outer circumferential surface of the support portion 43b has an external thread 43c. The external thread 43c is screwed into the internal thread 42c of the valve stem holder 42. The first stem portion 31 of the valve member 30 is disposed inside the guide bush 43. The guide bush 43 supports the valve member 30 movably in the direction of the axis L.

FIG. 5 illustrates the stopper member 44. The stopper member 44 includes a stopper body 44a. The stopper body 44a has a circular cylindrical shape. The inner circumferential surface of the stopper body 44a has an internal thread 44c. A fixed stopper 44s is disposed on the outer circumferential surface of the stopper body 44a. The fixed stopper 44s is a protrusion radially extending outward from the outer circumferential surface of the stopper body 44a. The external thread 43c is screwed into the internal thread 44c until the stopper body 44a comes into contact with the base portion 43a of the guide bush 43, which fixes the stopper member 44 to the guide bush 43. The fixed stopper 44s is fixed with respect to the valve body 10.

The fixed member 45 includes a fixed portion 45a and a flange portion 45b. The fixed portion 45a has a stepped circular cylindrical shape. The second stem portion 32 of the valve member 30 is disposed inside the fixed portion 45a. The fixed portion 45a is bonded to the second stem portion 32. The flange portion 45b is provided continuously with the lower end of the fixed portion 45a. A return spring 48 is disposed such that the return spring 48 encloses the fixed member 45. The return spring 48 is a coil spring.

The stator 60 has a circular cylindrical shape. The stator 60 includes an A-phase stator 61 and a B-phase stator 62.

The A-phase stator 61 includes a plurality of claw-pole type pole teeth 61a and 61b in the inner circumference. The tip ends of the pole teeth 61a point down, and the tip ends of the pole teeth 61b point up. The pole teeth 61a and the pole teeth 61b are alternately arranged at regular angular intervals in the circumferential direction. In the electric valve device 1, the A-phase stator 61 has 12 pole teeth 61a and 12 pole teeth 61b for example. The angle between the pole tooth 61a and the pole tooth 61b adjacent to each other is 15 degrees. When a coil 61c of the A-phase stator 61 is energized, the pole teeth 61a and the pole teeth 61b have opposite polarities.

The B-phase stator 62 includes a plurality of claw-pole type pole teeth 62a and 62b in the inner circumference. The tip ends of the pole teeth 62a point down, and the tip ends of the pole teeth 62b point up. The pole teeth 62a and the pole teeth 62b are alternately arranged at regular angular intervals in the circumferential direction. In the electric valve device 1, the B-phase stator 62 has 12 pole teeth 62a and 12 pole teeth 62b for example. The angle between the pole tooth 62a and the pole tooth 62b adjacent to each other is 15 degrees. When a coil 62c of the B-phase stator 62 is energized, the pole teeth 62a and the pole teeth 62b have opposite polarities.

The A-phase stator 61 is coaxially disposed on the B-phase stator 62. When viewed in the direction of the axis L, the angle between the pole tooth 61a of the A-phase stator 61 and the pole tooth 62a of the B-phase stator 62 adjacent to each other is 7.5 degrees. In other words, the B-phase stator 62 is in a position where the B-phase stator 62 is rotated relatively to the A-phase stator 61 about the axis L by 7.5 degrees from the position where the pole tooth 61a and the pole tooth 62 are arranged in the direction of the axis L. As illustrated in FIG. 7A, terminals A1 and A2 of the coil 61c of the A-phase stator 61 and terminals B1 and B2 of the coil 62c of the B-phase stator 62 are connected to the electric valve control device 70 (a motor driver 77).

The can 20 is disposed inside the stator 60. The rotor 41 is disposed inside the can 20. The stator 60 and the rotor 41 are members of a stepping motor 66.

The rotor 41 is rotated by pulses P (pulses P[1] to P[8]) input to the stepping motor 66. Specifically, the rotor 41 is rotated by driving currents, corresponding to pulses P, supplied to the stator 60 of the stepping motor 66. In this specification, "inputting pulses P to the stepping motor 66" is synonymous with "supplying driving currents corresponding to pulses P to the stator 60 of the stepping motor 66".

Pulses P[1] to P[8] illustrated in FIG. 7B are input to the stepping motor 66 in order. Each pulse P has a combination of the driving current supplied to the A-phase stator 61 and the driving current supplied to the B-phase stator 62. Respective combinations are different from each other. The number of the combinations is 8 and is referred to as the number of patterns of pulses P. "Pattern" is also referred to as "switching mode". The index numbers (1 to 8) of pulses P[1] to P[8] are pattern numbers for specifying pulses P[1] to P[8]. FIGS. 8 to 15 illustrate examples of positional relationships between the rotor 41 and the stator 60 when pulses P[1] to P[8] are input. In FIGS. 8 to 15, the reference pole tooth 61a and the reference magnetic pole (S pole) of the rotor 41 are marked with a dot for easy understanding of the positional relationship between the rotor 41 and the stator 60 (the A-phase stator 61, the B-phase stator 62).

In rotating the rotor 41 in a first direction (clockwise in FIGS. 8 to 15), pulses P are cyclically input to the stepping motor 66 in ascending order (in the order from pulse P[1] to pulse P[8]). When the rotor 41 rotates in the first direction, the screw feed action of the internal thread 42c of the valve stem holder 42 and the external thread 43c of the guide bush 43 moves the rotor 41 and the valve stem holder 42 downward. The rotor 41 (the valve stem holder 42) pushes the valve member 30 downward via the valve closing spring 47. The valve member 30 moves downward, and the valve portion 33 comes into contact with the valve seat 18. At this time, the rotor 41 is at a valve closing position Rc. When the rotor 41 at this position further rotates in the first direction, the valve closing spring 47 is compressed and the rotor 41 further moves downward. The valve member 30 does not move downward. When the movable stopper 42s of the valve stem holder 42 comes into contact with the fixed stopper 44s of the stopper member 44, the rotation of the rotor 41 in the first direction is restricted. At this time, the rotor 41 is at a reference position Rx.

In rotating the rotor 41 in a second direction (counter clockwise in FIGS. 8 to 15) opposite to the first direction, pulses P are cyclically input to the stepping motor 66 in descending order (in the order from pulse P[8] to pulse P[1]). When the rotor 41 rotates in the second direction, the screw feed action of the internal thread 42c of the valve stem holder 42 and the external thread 43c of the guide bush 43 moves the rotor 41 and the valve stem holder 42 upward. The rotor 41 (the valve stem holder 42) pushes the fixed member 45 upward. The valve member 30 moves upward together with the fixed member 45 and separates from the valve seat 18. The rotor 41 is considered to be at a valve opening position Ro when a fluid flow rate at the valve port 17 (opening degree of the valve port 17) reaches a predetermined value in a predetermined flow-rate measuring environment. The predetermined value is set as appropriate according to the configuration and application of the electric valve device 1.

In the electric valve 5, the respective central axes of the valve port 17, the valve seat 18, the can 20, the valve member 30, the rotor 41, the valve stem holder 42, the guide bush 43, and the stator 60 (the A-phase stator 61, the B-phase stator 62) are aligned with the axis L.

The electric valve control device 70 includes a circuit board 71 on which electrical components (not illustrated) are mounted. As illustrated in FIG. 1, the electric valve control device 70 includes a non-volatile memory 75, a communication device 76, the motor driver 77, and a computer 80. The electric valve control device 70 controls the electric valve 5 according to a command received from the air conditioner control device 110.

The non-volatile memory 75 stores data required to be held even if power is turned off. The non-volatile memory 75 is, for example, EEPROM or flash memory.

The communication device 76 is connected to the air conditioner control device 110 via a wired communication bus 120 and is able to communicate with the air conditioner control device 110. The air conditioning system 100 utilizes a communication system such as Local Interconnection Network (LIN) or Controller Area Network (CAN). The communication device 76 may be wirelessly connected to the air conditioner control device 110 and be able to wirelessly communicate with the air conditioner control device 110.

The motor driver 77 supplies the driving currents to the stepping motor 66 based on pulses P input from the computer 80. As illustrated in FIG. 7A, the motor driver 77 is connected to the terminals A1 and A2 of the coil 61c of the A-phase stator 61 and the terminals B1 and B2 of the coil 62c of the B-phase stator 62. FIG. 7B illustrates an example of correspondence between pulses P and the driving currents supplied by the motor driver 77. In FIG. 7B, (+) denotes supplying the driving current flowing from the terminal A1 to the terminal A2 or the driving current flowing from the terminal B1 to the terminal B2. (−) denotes supplying the driving current flowing from the terminal A2 to the terminal A1 or the driving current flowing from the terminal B2 to the terminal B1. (0) denotes supplying no driving current.

When the computer 80 inputs pulse P[1] to the motor driver 77, the motor driver 77 supplies the driving current flowing from the terminal A1 to the terminal A2 to the coil 61c (+) and supplies no driving current to the coil 62c (0).

When the computer 80 inputs pulse P[2] to the motor driver 77, the motor driver 77 supplies the driving current flowing from the terminal A1 to the terminal A2 to the coil 61c (+) and supplies the driving current flowing from the terminal B1 to the terminal B2 to the coil 62c (+).

When the computer 80 inputs pulse P[3] to the motor driver 77, the motor driver 77 supplies no driving current to the coil 61c (0) and supplies the driving current flowing from the terminal B1 to the terminal B2 to the coil 62c (+).

When the computer 80 inputs pulse P[4] to the motor driver 77, the motor driver 77 supplies the driving current flowing from the terminal A2 to the terminal A1 to the coil 61c (−) and supplies the driving current flowing from the terminal B1 to the terminal B2 to the coil 62c (+).

When the computer 80 inputs pulse P[5] to the motor driver 77, the motor driver 77 supplies the driving current flowing from the terminal A2 to the terminal A1 to the coil 61c (−) and supplies no driving current to the coil 62c (0).

When the computer 80 inputs pulse P[6] to the motor driver 77, the motor driver 77 supplies the driving current flowing from the terminal A2 to the terminal A1 to the coil 61c (−) and supplies the driving current flowing from the terminal B2 to the terminal B1 to the coil 62c (−).

When the computer 80 inputs pulse P[7] to the motor driver 77, the motor driver 77 supplies no driving current to the coil 61c (0) and supplies the driving current flowing from the terminal B2 to the terminal B1 to the coil 62c (−).

When the computer 80 inputs pulse P[8] to the motor driver 77, the motor driver 77 supplies the driving current flowing from the terminal A1 to the terminal A2 to the coil 61c (+) and supplies the driving current flowing from the terminal B2 to the terminal B1 to the coil 62c (−).

The computer 80 is a microcomputer for embedded devices that incorporates a CPU, ROM, RAM, an input/output interface, an analog-to-digital converter, or the like in a single package. The computer 80 may incorporate the non-volatile memory 75, the communication device 76, and the motor driver 77. The CPU executes a program stored in the ROM, and the computer 80 consequently functions as a rotation controller 81, a voltage obtainer 82, and a state determiner 83.

The rotation controller 81 inputs pulses P to the stepping motor 66 to rotate the rotor 41 in the first direction or the second direction. Specifically, the rotation controller 81 receives the command from the air conditioner control device 110 and inputs pulses P[1] to P[8] to the motor driver 77 according to the command. The motor driver 77 supplies the driving current to the coil 61c of the A-phase stator 61 and the coil 62c of the B-phase stator 62 corresponding to pulses P[1] to P[8] input by the rotation controller 81.

The voltage obtainer 82 obtains voltage generated in the stator 60 by the rotation of the rotor 41 (voltage induced in the stator 60 due to electromagnetic induction). Specifically, the voltage obtainer 82 sequentially obtains the voltages VB generated between the terminals B1 and B2 of the coil 62c of the B-phase stator 62 when the rotation controller 81 supplies the driving currents corresponding to pulses P[1] and P[5] only to the coil 61c of the A-phase stator 61. The voltage obtainer 82 sequentially obtains the voltages VA generated between the terminals A1 and A2 of the coil 61c of the A-phase stator 61 when the rotation controller 81 supplies the driving currents corresponding to pulses P[3] and P[7] only to the coil 62c of the B-phase stator 62. The voltage obtainer 82 does not obtain the voltages VA and VB when the rotation controller 81 supplies the driving currents corresponding to pulses P[2], P[4], P[6], and P[8] to the coils 61c and 62c. The voltage obtainer 82 may obtain the voltages VA and VB when the rotation controller 81 supplies the driving currents corresponding to pulses P[1] to P[8] to the coils 61c and 62c. In this configuration, the voltage obtainer 82 separates a voltage component due to electromagnetic induction from the voltage generated between the terminals A1 and A2 and obtains the voltage component as the voltage VA. The voltage obtainer 82 separates a voltage component due to electromagnetic induction from the voltage generated between the terminals B1 and B2 and obtains the voltage component as the voltage VB. The voltages VA sequentially obtained form a waveform of the voltage VA. The voltages VB sequentially obtained form a waveform of the voltage VB.

The state determiner 83 determines the state of the electric valve 5 based on the waveforms of the voltages VA and VB obtained by the voltage obtainer 82 in an operation (an initialization operation) for positioning the rotor 41 at the reference position Rx. The electric valve 5 has a rotation permitted state Sp and a rotation restricted state Sr. The rotation permitted state Sp is where the rotor 41 does not reach the reference position Rx and the rotation of the rotor 41 in the first direction is permitted. The rotation restricted state Sr is where the rotor 41 reaches the reference position Rx to bring the movable stopper 42s into contact with the fixed stopper 44s and the rotation of the rotor 41 in the first direction is restricted. The movable stopper 42s and the fixed stopper 44s are members of the stopper mechanism 49.

In this specification, "waveform" refers to the variations in a physical quantity (voltage) over time at a fixed point. "Waveform" is represented on a coordinate plane for visualization, with the vertical axis corresponding to physical quantity and the horizontal axis corresponding to time. The word "waveform" can also refer to physical quantity data associated with time data, such as a data table, stored in the RAM of the computer 80 or the non-volatile memory 75. In a waveform represented on a coordinate plane with the vertical axis corresponding to physical quantity and the horizontal axis corresponding to time where the horizontal axis crosses at a point 0 on the vertical axis, "area of the waveform" refers to an area of a region enclosed by the waveform and the horizontal axis.

FIGS. 16 to 18 illustrate examples of the waveforms of the voltages VA and VB measured in the initialization operation. In time periods T1 to T9, pulses P[1] to P[8] are input to the stepping motor 66 in ascending order. The waveforms of the voltages VA and VB in time periods before time period T1 are not illustrated in FIG. 16 but are equal (including substantially equal) to the waveforms of the voltages VA and VB in time period T1. The electric valve device 1 has, for example, a period of pulse P of 8 milliseconds and a time period T of 64 milliseconds. At time tc, the valve member 30 comes into contact with the valve seat 18, and the rotor 41 is positioned at the valve closing position Rc. At time tx, the movable stopper 42s comes into contact with the fixed stopper 44s, and the rotor 41 is positioned at the reference position Rx. The rotation of the rotor 41 in the first direction is permitted before time tx and is restricted after time tx.

The waveform of the voltage VA includes A-waves (a1 to a9), B-waves (b1 to b9), C-waves (c1 to c9), D-waves (d1 to d9), and E-waves (e7 to e9). A-waves and B-waves are negative voltage waves (−V) periodically observed in all time periods T. C-waves and D-waves are positive voltage waves (+V) periodically observed in all time periods T. E-waves are positive voltage waves (+V) periodically observed after time tx. The waves each have an amplitude larger than or equal to a predetermined magnitude.

When the areas of the waveform (waveform including C-waves and D-waves) in the sections corresponding to pulse P[7] in time periods T1 to T9 are referred to as areas SA1 to SA9, the areas SA6 to SA9 in time periods T6 to T9 after time tx, are smaller than the areas SA1 to SA5 in time periods T1 to T5 before time tx.

D-waves (d1 to d5) are positive voltage waves with relatively large amplitudes before time tx, and D-waves (d6 to d9) are positive voltage waves with relatively small amplitudes after time tx.

No E-waves are observed before time tx, and E-waves (e7 to e9) are periodically observed after time tx. In other words, E-waves are new waves distinct from periodically observed waves in all time periods T and appear periodically after time tx.

The waveform of the voltage VB includes F-waves (f1 to f9), G-waves (g1 to g9), H-waves (h1 to h9), J-waves (j1 to j9), K-waves (k1 to k9) and M-waves (m7 to m9). F-waves and G-waves are positive voltage waves (+V) periodically observed in all time periods T. H-waves, J-waves and K-waves are negative voltage waves (−V) periodically observed in all time periods T. M-waves are positive voltage waves (+V) periodically observed after time tx. The waves each have an amplitude larger than or equal to a predetermined magnitude.

When the areas of the waveform (waveform including F-waves, G-waves and H-waves) in the sections corresponding to pulse P[1] in time periods T1 to T9 are referred to as areas SB1 to SB9, the areas SB7 to SB9 in time periods T7 to T9 after time tx, are smaller than the areas SB1 to SA6 in time periods T1 to T6 before time tx.

G-waves (g1 to g6) are positive voltage waves with relatively large amplitudes before time tx, and G-waves (g7 to g9) are negative voltage waves with relatively small amplitudes after time tx. G-wave (each of g7 to g9) is joined with H-wave after time tx, resulting in one wave.

K-waves (k1 to k5) are negative voltage waves with relatively small amplitudes before time tx, and K-waves (k7 to k9) are negative voltage waves with relatively large amplitudes after time tx.

No M-waves are observed before time tx, and M-waves (m7 to m9) are periodically observed after time tx. In other words, M-waves are new waves distinct from waves periodically observed in all time periods T and appear periodically after time tx.

As a result, the waveforms of the voltages VA and VB have differences before and after time tx. The differences are as follows.

(i) The area of the waveform in time period T after time tx is smaller than the area of the waveform in time period T before time tx.
(ii) The amplitude of the wave after time tx is different from the amplitude of the wave before time tx.
(iii) New waves distinct from waves observed before time tx appear periodically after time tx.

Thus, it can be determined that time tx is passed (in other words, the rotor 41 reaches the reference position Rx and the electric valve 5 is in the rotation restricted state Sr) by detecting at least one of the events according to (i) to (iii) described above in the waveforms of the voltages VA and VB.

The state determiner 83 determines that the electric valve 5 is in the rotation permitted state Sp when the state determiner 83 does not detect any one of the events according to (i) to (iii) described above in the waveforms of the voltages VA and VB obtained by the voltage obtainer 82 during the initialization operation. The state determiner 83 determines that the electric valve 5 is in the rotation restricted state Sr when the state determiner 83 detects at least one of the events according to (i) to (iii) described above. When the state determiner 83 determines that the electric valve 5 is in the rotation restricted state Sr, the rotation controller 81 stops inputting pulses P[1] to P[8] to the stepping motor 66, and the initialization operation is finished.

The state determiner 83 may determine that the electric valve 5 is in the rotation restricted state Sr when the state determiner 83 detects two or more events according to (i) to (iii) described above. In this configuration, the state determiner 83 determines that the electric valve 5 is in the rotation permitted state Sp when the state determiner 83 does not determine that the electric valve 5 is in the rotation restricted state Sr.

Next, an example of an operation of the electric valve control device 70 is described below with reference to FIG. 19.

When the electric valve control device 70 (specifically, the computer 80) receives an initializing command from the air conditioner control device 110 (S110), the electric valve control device 70 starts inputting pulses P[1] to P[8] to the stepping motor 66 in ascending order (S120). This starts the initialization operation, and the driving currents corresponding to pulses P[1] to P[8] are supplied to the stator 60 to rotate the rotor 41 in the first direction.

When the rotor 41 rotates in the first direction, the electric valve control device 70 sequentially obtains the voltage VA generated between the terminals A1 and A2 of the coil 61c of the A-phase stator 61 and the voltage VB generated between the terminals B1 and B2 of the coil 62c of the B-phase stator 62 (S130). That is, the electric valve control device 70 obtains the waveforms of the voltages VA and VB. Specifically, the electric valve control device 70 obtains the voltage VB generated between the terminals B1 and B2 of the coil 62c of the B-phase stator 62 when the driving currents are supplied only to the coil 61c of the A-phase stator 61 in response to pulses P[1] and P[5]. The electric valve control device 70 obtains the voltage VA generated between the terminals A1 and A2 of the coil 61c of the A-phase stator 61 when the driving currents are supplied only to the coil 62c of the B-phase stator 62 in response to pulses P[3] and P[7]. When the electric valve control device 70 inputs pulses P[2], P[4], P[6], and P[8], the electric valve control device 70 does not obtain the voltages VA and VB.

At the end of the present time period T, in which pulses P[1] to P[8] are input to the stepping motor 66, the electric valve control device 70 determines the state of the electric valve 5 (S140). Specifically, the electric valve control device 70 performs items (1) to (8) described below.

(1) The electric valve control device 70 calculates the area SA(k) of the waveform of the voltage VA in the section corresponding to pulse P[7] in the present time period T(k). The electric valve control device 70 determines that the electric valve 5 is in the rotation restricted state Sr when the electric valve control device 70 detects that the area SA(k) is smaller than the area SA(k−1) of the waveform of the voltage VA in the section corresponding to pulse P[7] in the time period T(k−1) immediately before time period T(k), and that difference between the area SA(k) and the area SA(k−1) is larger than or equal to a predetermined first area threshold. The area SA(k) may be an area of the waveform of the voltage VA in a partial section in the time period T(k) or an area of the waveform of the voltage VA throughout the time period T(k).

(2) The electric valve control device 70 obtains the amplitude WA(k) of D-wave of the waveform of the voltage VA in the present time period T(k). The electric valve control device 70 determines that the electric valve 5 is in the rotation restricted state Sr when the electric valve control device 70 detects that the amplitude WA(k) is smaller than the amplitude WA(k−1) of D-wave of the waveform of the voltage VA in the time period T(k−1) immediately before the time period T(k), and that difference between the amplitude WA(k) and the amplitude WA(k−1) is larger than or equal to a predetermined first amplitude threshold.

(3) The electric valve control device 70 determines that the electric valve 5 is in the rotation restricted state Sr when the electric valve control device 70 detects that new E-waves of the waveform of the voltage VA, which are distinct from A-waves, B-waves, C-waves, and D-waves periodically observed in all time periods T, appear periodically in consecutive time periods T (for example, 3 time periods).

(4) The electric valve control device 70 calculates the area SB(k) of the waveform of the voltage VB in the section corresponding to pulse P[1] in the present time period T(k). The electric valve control device 70 determines that the electric valve 5 is in the rotation restricted state Sr when the electric valve control device 70 detects that the area SB(k) is smaller than the area SB(k−1) of the waveform of the voltage VB in the section corresponding to pulse P[1] in the time period T(k−1) immediately before time period T(k), and that difference between the area SB(k) and the area SB(k−1) is larger than or equal to a predetermined second area threshold. The area SB(k) may be an area of the waveform of the voltage VB in a partial section in the time period T(k) or an area of the waveform of the voltage VB throughout the time period T(k).

(5) The electric valve control device 70 obtains the amplitude WB1($k$) of G-wave of the waveform of the voltage VB in the present time period T(k). The electric valve control device 70 determines that the electric valve 5 is in the rotation restricted state Sr when the electric valve control device 70 detects that the amplitude WB1($k$) is smaller than the amplitude WB1($k$−1) of G-wave of the waveform of the voltage VB in the time period T(k−1) immediately before the time period T(k), and that difference between the amplitude WB1($k$) and the amplitude WB1($k$−1) is larger than or equal to a predetermined second amplitude threshold.

(6) The electric valve control device 70 obtains the amplitude WB2($k$) of K-wave of the waveform of the voltage VB in the present time period T(k). The electric valve control device 70 determines that the electric valve 5 is in the rotation restricted state Sr when the electric valve control device 70 detects that the amplitude WB2($k$) is larger than the amplitude WB2($k$−1) of K-wave of the waveform of the voltage VB in the time period T(k−1) immediately before the time period T(k), and that difference between the amplitude WB2($k$) and the amplitude WB2($k$−1) is larger than or equal to a predetermined third amplitude threshold.

(7) The electric valve control device 70 determines that the electric valve 5 is in the rotation restricted state Sr when the electric valve control device 70 detects that new M-waves of the waveform of the voltage VB, which are distinct from F-waves, G-waves, H-waves, J-waves, and K-waves periodically observed in all time periods T, appear periodically in consecutive time periods T (for example, 3 time periods).

The areas and the amplitudes used in the items (1), (2), and (4) to (6) described above may be moving average values in consecutive time periods T. The electric valve control device 70 may perform only a subset of the items (1) to (7).

(8) The electric valve control device 70 determines that the electric valve 5 is in the rotation permitted state Sp when the electric valve control device 70 does not determine that the electric valve 5 is in the rotation restricted state Sr in the items (1) to (7).

The electric valve control device 70 may be configured to tentatively determine the state of the electric valve 5 in the items (1) to (7). In this configuration, the electric valve control device 70 definitely determines that the electric valve 5 is in the rotation restricted state Sr when the electric valve control device 70 tentatively determines multiple times (for example, two or more times) that the electric valve 5 is in the rotation restricted state Sr. In this configuration, the electric valve control device 70 determines that the electric valve 5 is in the rotation permitted state Sp when the electric valve control device 70 does not definitely determine that the electric valve 5 is in the rotation restricted state Sr.

When the electric valve 5 is in the rotation restricted state Sr (Y in S150), the electric valve control device 70 finishes inputting pulses P[1] to P[8] to the stepping motor 66 and notifies the completion of the initialization operation to the air conditioner control device 110 (S170).

When the electric valve 5 is in the rotation permitted state Sp (N in S150) and the number of pulses P input to the stepping motor 66 exceeds an initialization number X (Y in S160), the electric valve control device 70 finishes inputting pulses P to the stepping motor 66 and notifies the completion of the initialization operation to the air conditioner control device 110 (S170). The initialization number X is the number of pulses P required to rotate the rotor 41 from a position (a full-open position Rz) corresponding to the maximum opening degree of the valve port 17 to the reference position Rx. For example, the initialization number X is 500.

When the number of pulses P input to the stepping motor 66 is smaller than or equal to the initialization number X (N in S160), the electric valve control device 70 obtains the voltages VA and VB again (S130) and repeats the operation described above (S130 to S160).

The electric valve device 1 includes the electric valve 5 and the electric valve control device 70. The electric valve 5 includes the valve body 10 including the valve seat 18, the rotor 41 rotatable with respect to the valve body 10, the stator 60 constituting the stepping motor 66 together with the rotor 41, the valve member 30 facing the valve seat 18 and being pushed toward the valve seat 18 via the valve closing spring 47 when the rotor 41 rotates in the first direction, and the stopper mechanism 49 restricting the rotation of the rotor 41 in the first direction when the rotor 41 is at the reference position Rx. The electric valve control device 70 supplies the driving current to the stator 60 to rotate the rotor 41 in the first direction. The electric valve control device 70 obtains the voltages VA and VB generated in the stator 60 by the rotation of the rotor 41. The electric valve control device 70 determines whether the electric valve 5 is in the rotation restricted state Sr where the rotation of the rotor 41 in the first direction is restricted by the stopper mechanism 49 based on at least one of (i) the areas of the waveforms of the voltages VA and VB, (ii) the amplitudes of the waves periodically observed in the waveforms of the voltages VA and VB, and (iii) the periodic appearance of new waves distinct from the waves periodically observed in the waveforms of the voltages VA and VB.

In this configuration, the rotor 41 is at the reference position Rx when the electric valve control device 70 determines that the electric valve 5 is in the rotation restricted state Sr. As a result, the electric valve control device 70 stops the rotation of the rotor 41 in the first direction when the electric valve control device 70 determines that the electric valve 5 is in the rotation restricted state Sr, which enables the duration of the initialization operation to be reduced. Additionally, the number of collisions of the movable stopper 42s to the fixed stopper 44s repeated after the rotor 41 is positioned at the reference position Rx can be reduced. Therefore, the electric valve control device 70 can suppress a long-lasting noise and reduce the wear and fatigue of the movable stopper 42s and the fixed stopper 44s. The electric valve control device 70 can suppress noise and ensure a long life of the electric valve 5.

The electric valve control device 70 determines whether the electric valve 5 is in the rotation restricted state Sr, based on the area SA of the waveform of the voltage VA and the area SB of the waveform of the voltage VB. The electric valve control device 70 determines whether the electric valve 5 is in the rotation restricted state Sr, based on the amplitudes WA of D-waves periodically observed in the waveform of the voltage VA, and the amplitudes WB1 of G-waves and the amplitudes WB2 of K-waves periodically observed in the waveform of the voltage VB. The electric valve control device 70 determines whether the electric valve 5 is in the rotation restricted state Sr, based on the periodic appearance of the new E-waves distinct from A-waves, B-waves, C-waves, and D-waves periodically observed in the waveform of the voltage VA and the periodic appearance of the new M-waves distinct from F-waves, G-waves, H-waves, J-waves, and K-waves periodically observed in the waveform of the voltage VB. This configuration enables the electric valve control device 70 to determine whether the electric valve 5 is in the rotation restricted state Sr in a relatively simple operation for the voltages VA and VB.

When the electric valve control device 70 determines that the electric valve 5 is in the rotation restricted state Sr, the electric valve control device 70 stops inputting pulses P to the stepping motor 66 and supplying the driving currents to the stator 60. In this configuration, the electric valve control device 70 can quickly stop the rotation of the rotor 41 in the first direction in a simple operation compared to a configuration, for example, in which the air conditioner control device 110 is notified of the electric valve 5 being in the rotation restricted state Sr, a stopping command is received from the air conditioner control device 110, and subsequently the initialization operation is stopped.

The stator 60 includes the A-phase stator 61 and the B-phase stator 62. When the electric valve control device 70 supplies the driving current only to the A-phase stator 61, the electric valve control device 70 obtains the voltage VB generated in the B-phase stator 62. When the electric valve control device 70 supplies the driving current only to the B-phase stator 62, the electric valve control device 70 obtains the voltage VA generated in the A-phase stator 61. In this configuration, the electric valve control device 70 need not separate a voltage component due to electromagnetic induction from the voltages generated in the A-phase stator 61 and the B-phase stator 62. As a result, the electric valve control device 70 can obtain the voltages VA and VB in a relatively simple configuration.

The electric valve control device 70 determines whether the electric valve 5 is in the rotation permitted state Sp or the rotation restricted state Sr. The electric valve control device 70 may determine whether the electric valve 5 is in a state other than the rotation permitted state Sp and the rotation restricted state Sr.

According to FIG. 16, in the waveform of the voltage VA, D-waves (d1 and d2) are positive voltage waves with a constant amplitude in time periods T before time tc, and D-waves (d3 to d5) are positive voltage waves that gradually decrease in amplitude between times tc and tx. In the waveform of the voltage VB, K-waves (k1 and k2) are negative voltage waves with a constant amplitude in time periods T before time tc, and K-waves (k3 to k5) are negative voltage waves that gradually decrease in amplitude between time tc and tx. These are believed to arise due to a gradual reduction in the rotational speed of the rotor 41 as the rotor 41 passes the valve closing position Rc and the valve closing spring 47 is gradually compressed. As a result, detecting a gradual decrease in amplitude of the wave in the waveform of the voltages VA or in the waveform of the voltage VB enables the rotor 41 to be determined that the rotor 41 is between the valve closing position Rc and the reference position Rx.

Accordingly, the electric valve control device 70 may determine that the electric valve 5 is in an intermediate state Sq where the rotor 41 is at a position between the valve closing position Rc and the reference position Rx when D-waves periodically observed in the waveform of the voltage VA gradually decrease in amplitude and/or when K-waves periodically observed in the waveform of the voltage VB gradually decrease in amplitude. The intermediate state Sq is a transitional state that occurs between the rotation permitted state Sp and the rotation restricted state Sr. For example, the determination condition of the rotation restricted state Sr includes the determination that the electric valve 5 is in the intermediate state Sq, resulting in a more accurate determination of the rotation restricted state Sr.

The electric valve 5 has a configuration in which the valve member 30 is pushed downward by the valve stem holder 42 fitted into the rotor 41 via the valve closing spring 47 when the rotor 41 rotates in the first direction. The electric valve 5 may have a configuration in which the valve member 30 is pushed downward directly by the valve stem holder 42 fitted into the rotor 41 when the rotor 41 rotates in the first direction. Alternatively, the electric valve 5 may have a configuration in which the valve member 30 is fixed to the rotor 41 (or the valve stem holder 42). In these configurations, the rotation of the rotor 41 in the first direction is restricted when the valve member 30 comes into contact with the valve seat 18. In other words, the valve member 30 and the valve seat 18 constitute a stopper mechanism, and a position of the rotor 41 when the valve member 30 is in contact with the valve seat 18 is a reference position Rx where the rotation of the rotor 41 in the first direction is restricted.

The electric valve control device 70 determines that the electric valve 5 is in the rotation restricted state Sr, based on the voltage generated in the stator 60 by the rotation of the rotor 41. As current and voltage have a close relationship, the electric valve control device 70 may determine whether the electric valve 5 is in the rotation restricted state Sr, based on a current generated in the stator 60 by the rotation of the rotor 41. In this configuration, the electric valve control device 70 includes, instead of a voltage obtainer, a current obtainer that obtains the current generated in the stator 60 by the rotation of the rotor 41 (current induced in the stator 60 due to electromagnetic induction). A state determiner determines whether the electric valve 5 is in the rotation restricted state Sr, based on at least one of (i) an area of a waveform of the current, (ii) an amplitude of a wave periodically observed in the waveform of the current, and (iii) a periodic appearance of a new wave distinct from the waves periodically observed in the waveform of the current.

The electric valve 5 includes the driving mechanism 40 using the rotation of the rotor 41 without speed being reduced. The electric valve 5 may include, instead of the driving mechanism 40, a driving mechanism using the rotation of the rotor 41 with speed being reduced.

Next, an electric valve device 2 according to an embodiment of the present invention is described below. The electric valve device 2 has the same hardware configuration as the electric valve device 1. An electric valve control device 70 of the electric valve device 2 performs an operation different from the operation of the electric valve control device 70 of the electric valve device 1.

The electric valve control device 70 sequentially obtains voltages VA and VB. That is, the electric valve control device 70 obtains the waveforms of the voltages VA and VB. The electric valve control device 70 determines a state of an electric valve 5 by comparing the waveforms of the voltages VA and VB with reference waveforms of the voltages VA and VB provided in advance.

The electric valve 5 has a first-rotation permitted state Sp1, a second-rotation permitted state Sp2, a first-rotation restricted state Sr1, and a second-rotation restricted state Sr2. The first-rotation permitted state Sp1 is where rotation of a rotor 41 in a first direction is permitted. The second-rotation permitted state Sp2 is where the rotation of the rotor 41 in a second direction is permitted. The first-rotation restricted state Sr1 is where the rotation of the rotor 41 in the first direction is restricted. The second-rotation restricted state Sr2 is where the rotation of the rotor 41 in the second direction is restricted.

A non-volatile memory 75 of the electric valve control device 70 stores the reference waveforms of the voltages VA and VB. The reference waveforms include a first-rotation permitted state waveform, a second-rotation permitted state waveform, and a first-rotation restricted state waveform.

The reference waveforms are provided for pulses P. In the embodiment, the reference waveforms are provided for pulses P (P[1], P[3], P[5], and P[7]), and no reference waveform is provided for the rest of pulses P (P[2], P[4], P[6], and P[8]). The reference waveforms are set based on the waveforms of the voltages VA and VB obtained in the electric valve 5 capable of normal operation.

The first-rotation permitted state waveforms of the voltage VA are set based on the waveforms of the voltage VA obtained when the electric valve 5 is in the first-rotation permitted state Sp1 and driving currents are supplied only to a coil 62c of a B-phase stator 62 in response to pulses P[3] and P[7] for rotating the rotor 41 in the first direction.

The first-rotation permitted state waveforms of the voltage VB are set based on the waveforms of the voltage VB obtained when the electric valve 5 is in the first-rotation permitted state Sp1 and driving currents are supplied only to a coil 61c of an A-phase stator 61 in response to pulses P[1] and P[5] for rotating the rotor 41 in the first direction.

The second-rotation permitted state waveforms of the voltage VA are set based on the waveforms of the voltage VA obtained when the electric valve 5 is in the second-rotation permitted state Sp2 and the driving currents are supplied only to the coil 62c of the B-phase stator 62 in response to pulses P[3] and P[7] for rotating the rotor 41 in the second direction.

The second-rotation permitted state waveforms of the voltage VB are set based on the waveforms of the voltage VB obtained when the electric valve 5 is in the second-rotation permitted state Sp2 and the driving currents are supplied only to the coil 61c of the A-phase stator 61 in response to pulses P[1] and P[5] for rotating the rotor 41 in the second direction.

In the embodiment, the first-rotation and second-rotation permitted state waveforms are set based on the waveforms of the voltages (the waveforms of the voltages VA and VB) obtained in each electric valve 5 on shipment from the factory. The electric valve control device 70 stores the first-rotation and second-rotation permitted state waveforms, which are set based on the waveforms of the voltages obtained in the electric valve 5 that is combined with the electric valve control device 70.

Alternatively, the first-rotation and second-rotation permitted state waveforms are set based on the waveforms of the voltages obtained in a plurality of electric valves 5. In this configuration, a plurality of electric valve control devices 70 stores common first-rotation and second-rotation permitted state waveforms among them.

To avoid effect of a valve closing spring 47 on the rotation of the rotor 41, the rotor 41 is preferably between a valve closing position Rc and a full-open position Rz when the waveforms of the voltages for setting the first-rotation and second-rotation permitted state waveforms are obtained. The first-rotation permitted state waveform is a centroid line of the waveforms of the voltage. The second-rotation permitted state waveform is a centroid line of the waveforms of the voltage. The centroid line is, for example, defined as a line connecting average voltages at respective obtaining times (sampling times) in the waveforms of the voltage in the obtaining time order.

Pulses P[3] and P[7] each have one first-rotation permitted state waveform of the voltage VA, and pulses P[1] and P[5] each have one first-rotation permitted state waveform of the voltage VB. Pulses P[3] and P[7] each have one second-rotation permitted state waveform of the voltage VA, and pulses P[1] and P[5] each have one second-rotation permitted state waveform of the voltage VB.

Figure 20:
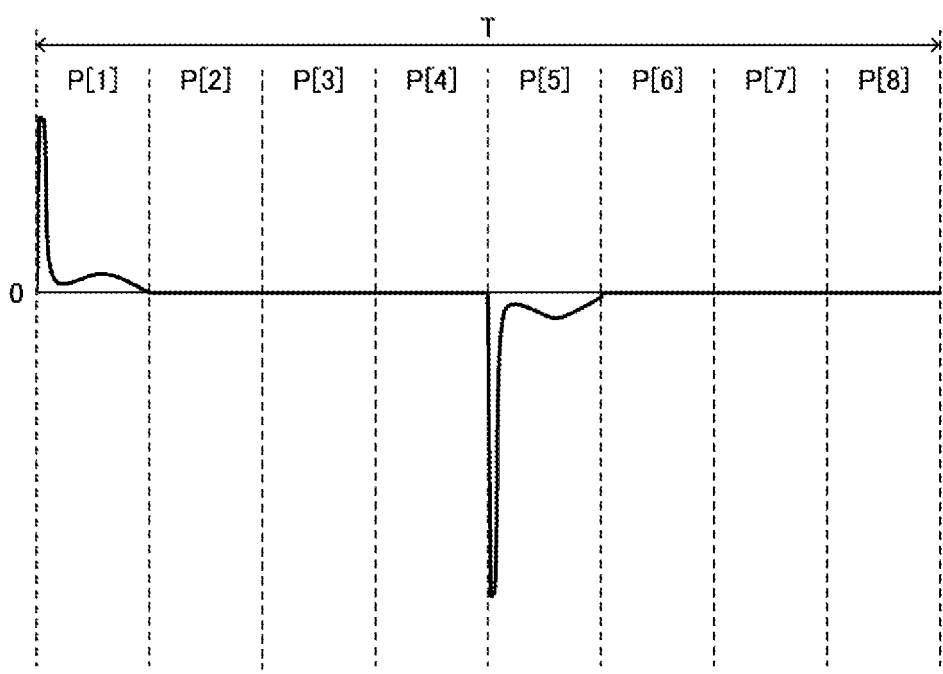
FIG. 20 is a diagram illustrating an example of a waveform including a reference waveform of the voltage (first-rotation permitted state waveform).
Figure 21:
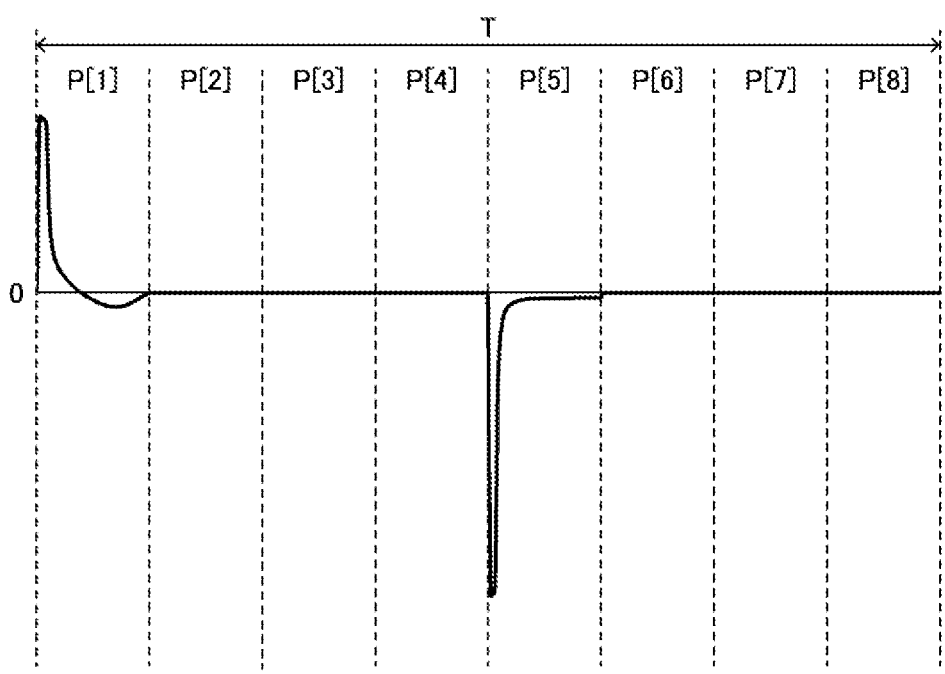
FIG. 21 is a diagram illustrating an example of a waveform including a reference waveform of the voltage (first-rotation restricted state waveform #1).
Figure 22:
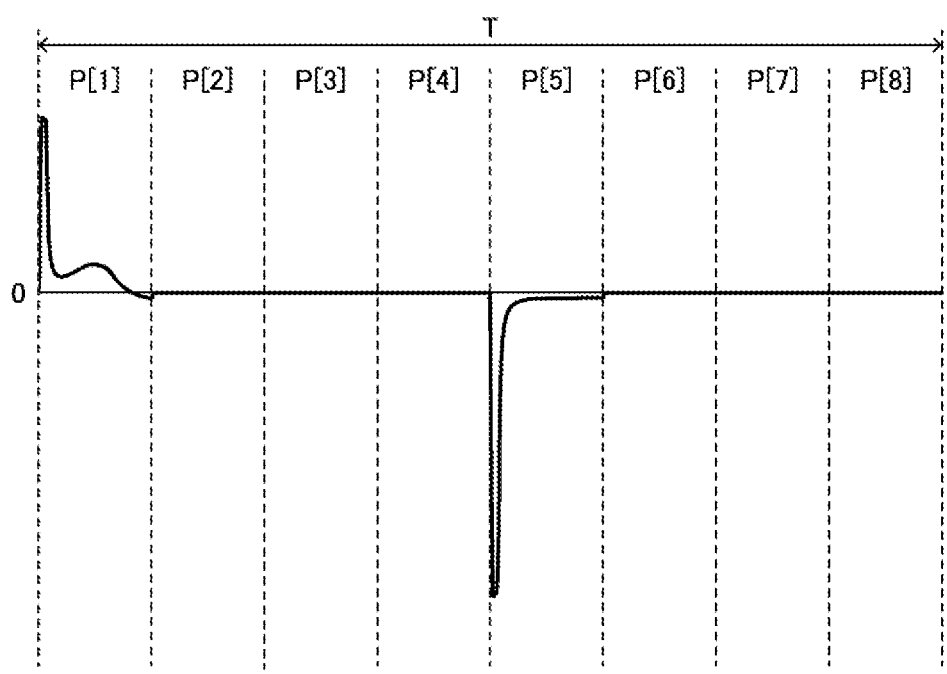
FIG. 22 is a diagram illustrating an example of a waveform including a reference waveform of the voltage (first-rotation restricted state waveform #2).
Figure 23:
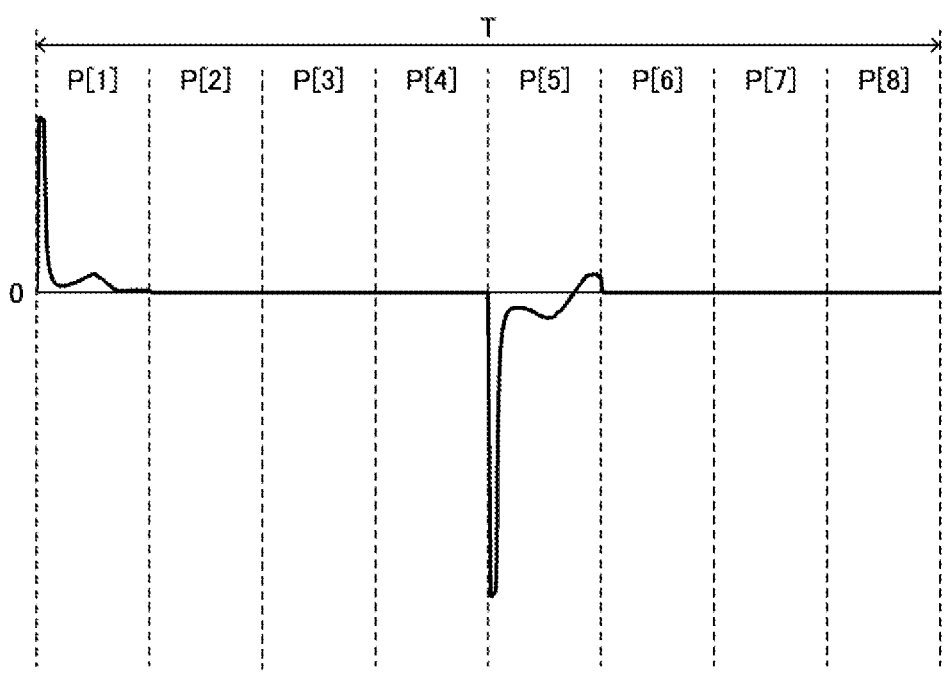
FIG. 23 is a diagram illustrating an example of a waveform including a reference waveform of the voltage (first-rotation restricted state waveform #3).
Figure 24:
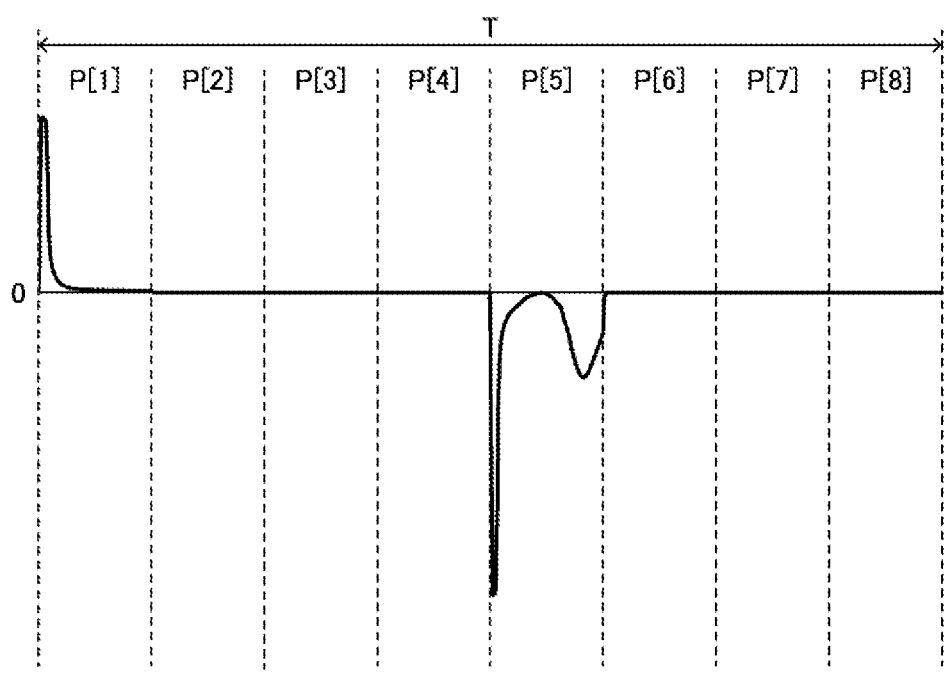
FIG. 24 is a diagram illustrating an example of a waveform including a reference waveform of the voltage (first-rotation restricted state waveform #4).
Figure 25:
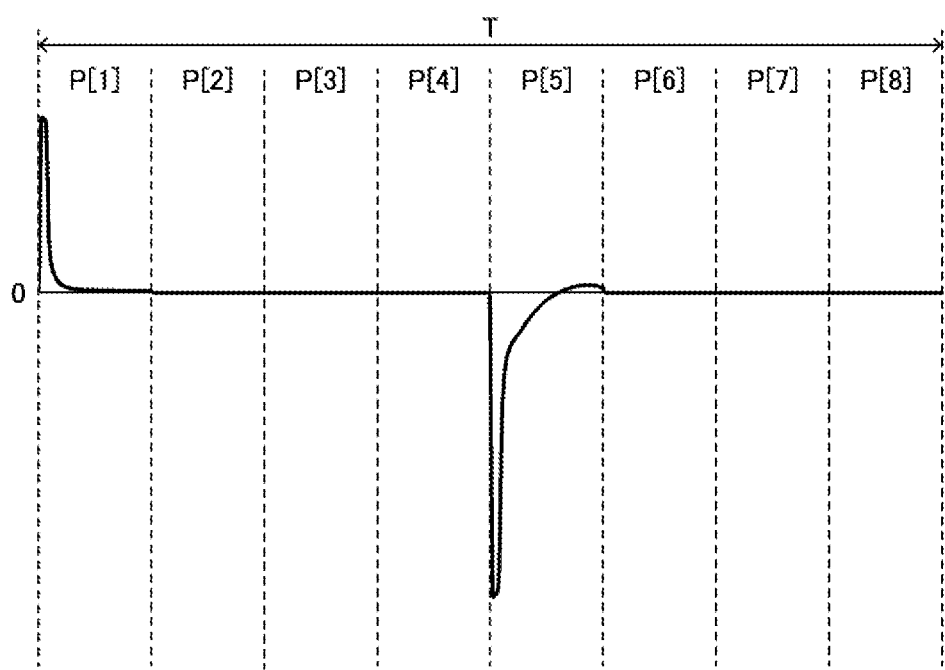
FIG. 25 is a diagram illustrating an example of a waveform including a reference waveform of the voltage (first-rotation restricted state waveform #5).
Figure 26:
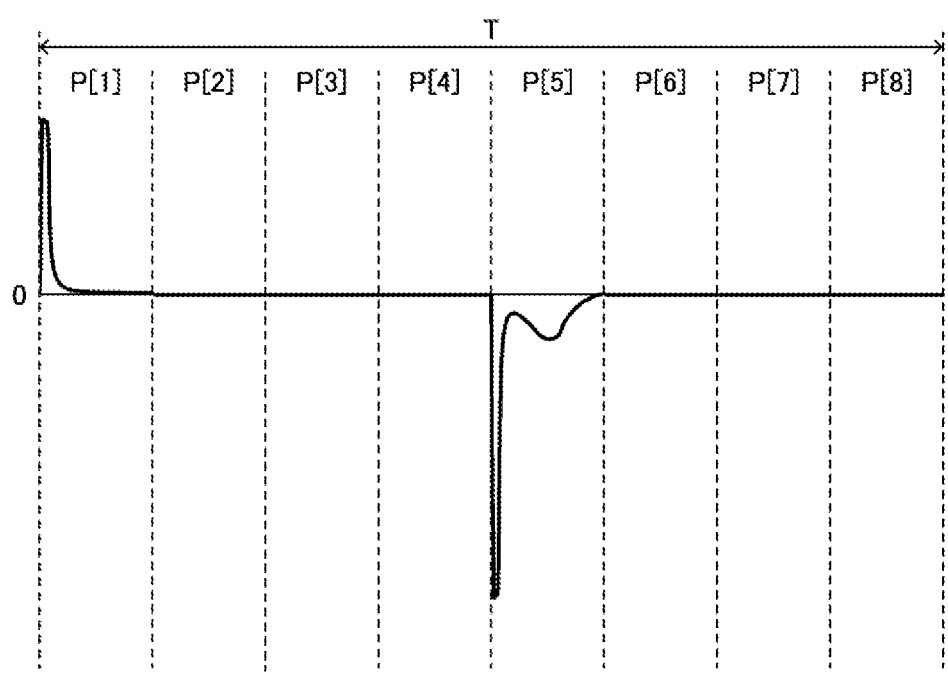
FIG. 26 is a diagram illustrating an example of a waveform including a reference waveform of the voltage (first-rotation restricted state waveform #6).
Figure 27:
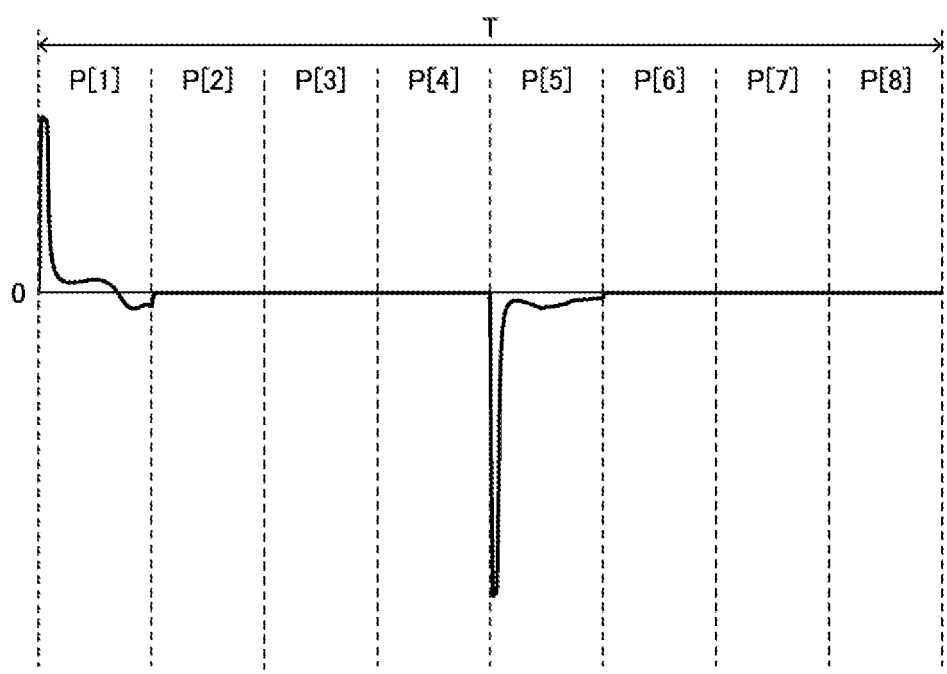
FIG. 27 is a diagram illustrating an example of a waveform including a reference waveform of the voltage (first-rotation restricted state waveform #7).
Figure 28:
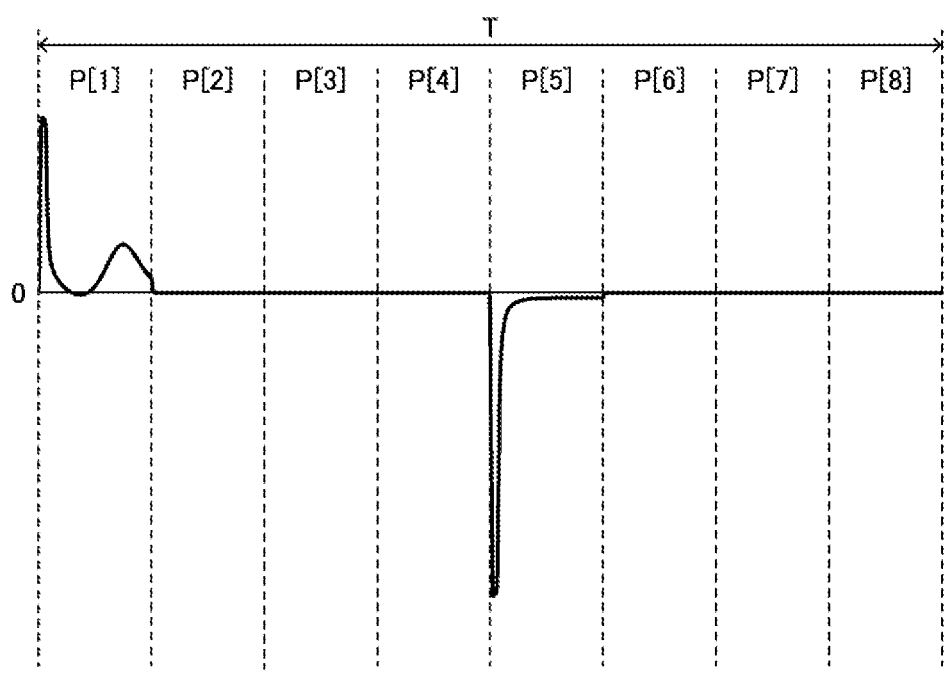
FIG. 28 is a diagram illustrating an example of a waveform including a reference waveform of the voltage (first-rotation restricted state waveform #8).

FIG. 20 illustrates an example of a waveform including the first-rotation permitted state waveforms of the voltage VB provided for pulses P[1] and P[5].

The non-volatile memory 75 stores the first-rotation and second-rotation permitted state waveforms as data tables.

The non-volatile memory 75 stores first-rotation permitted state tables C[3], C[7], C[1], and C[5]. The first-rotation permitted state table C[3] represents the first-rotation permitted state waveform of the voltage VA provided for pulse P[3], which is input when the rotor 41 is rotated in the first direction. The first-rotation permitted state table C[7] represents the first-rotation permitted state waveform of the voltage VA provided for pulse P[7], which is input when the rotor 41 is rotated in the first direction. The first-rotation permitted state table C[1] represents the first-rotation permitted state waveform of the voltage VB provided for pulse P[1], which is input when the rotor 41 is rotated in the first direction. The first-rotation permitted state table C[5] represents the first-rotation permitted state waveform of the voltage VB provided for pulse P[5], which is input when the rotor 41 is rotated in the first direction. P[3], P[7], P[1], and P[5] for rotating the rotor 41 in the first direction are first-direction pulses.

The non-volatile memory 75 stores second-rotation permitted state tables D[3], D[7], D[1], and D[5]. The second-rotation permitted state table D[3] represents the second-rotation permitted state waveform of the voltage VA provided for pulse P[3], which is input when the rotor 41 is rotated in the second direction. The second-rotation permitted state table D[7] represents the second-rotation permitted state waveform of the voltage VA provided for pulse P[7], which is input when the rotor 41 is rotated in the second direction. The second-rotation permitted state table D[1] represents the second-rotation permitted state waveform of the voltage VB provided for pulse P[1], which is input when the rotor 41 is rotated in the second direction. The second-rotation permitted state table D[5] represents the second-rotation permitted state waveform of the voltage VB provided for pulse P[5], which is input when the rotor 41 is rotated in the second direction. P[3], P[7], P[1], and P[5] for rotating the rotor 41 in the second direction are second-direction pulses.

The first-rotation restricted state waveforms of the voltage VA are set based on the waveforms of the voltage VA obtained when the electric valve 5 is in the first-rotation restricted state Sr1 and the driving currents are supplied only to the coil 62c of the B-phase stator 62 in response to pulses P[3] and P[7] for rotating the rotor 41 in the first direction.

The first-rotation restricted state waveforms of the voltage VB are set based on the waveforms of the voltage VB obtained when the electric valve 5 is in the first-rotation restricted state Sr1 and the driving currents are supplied only to the coil 61c of the A-phase stator 61 in response to pulses P[1] and P[5] for rotating the rotor 41 in the first direction.

The electric valves 5 are different from each other in pulse P (the pattern number), which corresponds to a timing when a stopper mechanism 49 restricts the rotation of the rotor 41 in the first direction, depending on component and assembly accuracy. At the timing when the stopper mechanism 49 restricts the rotation of the rotor 41 in the first direction, a movable stopper 42s comes into contact with a fixed stopper 44s. For example, in some (the former electric valves 5) of the electric valves 5, the movable stopper 42s may come into contact with the fixed stopper 44s at a timing when pulse P[1] is input, or in others (the latter electric valves 5) of the electric valves 5, the movable stopper 42s may come into contact with the fixed stopper 44s at a timing when pulse P[2] (or any one of pulses P[3] to P[8]) is input. The former electric valves 5 are different from the latter electric valves 5 in the position of the rotor 41 (specifically, the position of the rotor 41 relative to the stator 60) when pulse P corresponding to the timing is input, in other words, the former electric valves 5 are different from the latter electric valves 5 in the position of the rotor 41 when pulse P[1] (or any one of pulses P[2] to P[8]) is input. When the electric valves 5 are different from each other in the position of the rotor 41, the electric valves 5 are also different from each other in the waveform of the voltage generated by the rotation of the rotor 41. Thus, the former electric valves 5 are different from the latter electric valves 5 in the waveforms of the voltages (the waveforms of the voltages VA and VB) when pulse P with the same pattern number is input. As a result, the electric valves 5, which are different from each other in pulse P corresponding to the timing when the movable stopper 42s comes into contact with the fixed stopper 44s, are different from each other in the waveform of the voltage when one pulse P with the same pattern number is input, and the first-rotation restricted state waveforms, which vary from each other, exist for one pulse P. The number of the first-rotation restricted state waveforms of the voltage VA, which vary from each other and exist for one pulse P, is the same as the number of the patterns of pulse P. The number of the first-rotation restricted state waveforms of the voltage VB, which vary from each other and exist for one pulse P, is also the same as the number of the patterns of pulse P.

In any one of the electric valves 5, pulse P (the pattern number) corresponding to the timing when the movable stopper 42s comes into contact with the fixed stopper 44s is constant. For example, in some of the electric valves 5, pulse P[1] is input at the timing when the movable stopper 42s comes into contact with the fixed stopper 44s, and in others of the electric valves 5, pulse P[2] (or any one of pulses P[3] to P[8]) is input at the timing when the movable stopper 42s comes into contact with the fixed stopper 44s.

In the embodiment, the first-rotation restricted state waveforms are set based on the waveforms of the voltages (the waveforms of the voltages VA and VB) obtained in each electric valve 5 on shipment from the factory. The electric valve control device 70 stores the first-rotation restricted state waveforms, which are set based on the waveforms of the voltage obtained in the electric valve 5 that is combined with the electric valve control device 70.

In the embodiment, pulses P[3] and P[7] each have one first-rotation restricted state waveform of the voltage VA, and pulses P[1] and P[5] each have one first-rotation restricted state waveform of the voltage VB.

Alternatively, the first-rotation restricted state waveform may be set based on the waveforms of the voltages obtained in the plurality of electric valves 5. In this configuration, the plurality of electric valve control devices 70 stores the common first-rotation restricted state waveform among them. Pulses P[3], P[7], P[1], and P[5] each have the first-rotation restricted state waveforms. The first-rotation restricted state waveforms are waveforms that vary from each other. Pulses P[3] and P[7] each have eight first-rotation restricted state waveforms of the voltage VA, and pulses P[1] and P[5] each have eight first-rotation restricted state waveforms of the voltage VB.

Alternatively, in the electric valve control device 70, the most optimum one of the first-rotation restricted state waveforms (the waveforms that vary from each other) for the electric valve 5 that is combined with the electric valve control device 70 may be provided as the first-rotation restricted state waveform. In this configuration, pulses P[3] and P[7] each have one first-rotation restricted state waveform of the voltage VA, and pulses P[1] and P[5] each have one first-rotation restricted state waveform of the voltage VB.

When the waveforms of the voltage for setting the first-rotation restricted state waveform are obtained, the electric valve 5 may preferably be in a state where the stopper mechanism 49 restricts the rotation of the rotor 41 in the first direction. The first-rotation restricted state waveform is a centroid line of the waveforms of the voltage.

The non-volatile memory 75 stores the first-rotation restricted state waveforms as data tables.

The non-volatile memory 75 stores the first-rotation restricted state tables E[3], E[7], E[1], and E[5]. The first-rotation restricted state table E[3] represents the first-rotation restricted state waveform of the voltage VA provided for pulse P[3], which is input when the rotor 41 is rotated in the first direction. The first-rotation restricted state table E[7] represents the first-rotation restricted state waveform of the voltage VA provided for pulse P[7], which is input when the rotor 41 is rotated in the first direction. The first-rotation restricted state table E[1] represents the first-rotation restricted state waveform of the voltage VB provided for pulse P[1], which is input when the rotor 41 is rotated in the first direction. The first-rotation restricted state table E[5] represents the first-rotation restricted state waveform of the voltage VB provided for pulse P[5], which is input when the rotor 41 is rotated in the first direction.

Alternatively, in a configuration in which the first-rotation restricted state waveforms are provided for pulses P[3], P[7], P[1], and P[5] each, the non-volatile memory 75 stores the first-rotation restricted state tables E[3]_1 to E[3]_8, E[7]_1 to E[7]_8, E[1]_1 to E[1]_8, and E[5]_1 to E[5]_8. The first-rotation restricted state tables E[3]_1 to E[3]_8 represent eight first-rotation restricted state waveforms of the voltage VA provided for pulse P[3], which is input when the rotor 41 is rotated in the first direction. The first-rotation restricted state tables E[7]_1 to E[7]_8 represent eight first-rotation restricted state waveforms of the voltage VA provided for pulse P[7], which is input when the rotor 41 is rotated in the first direction. The first-rotation restricted state tables E[1]_1 to E[1]_8 represent eight first-rotation restricted state waveforms of the voltage VB provided for pulse P[1], which is input when the rotor 41 is rotated in the first direction. The first-rotation restricted state tables E[5]_1 to E[5]_8 represent eight first-rotation restricted state waveforms of the voltage VB provided for pulse P[5], which is input when the rotor 41 is rotated in the first direction.

FIGS. 21 to 28 illustrate examples of the waveforms including the first-rotation restricted state waveforms of the voltage VB provided for pulse P[1] and the first-rotation restricted state waveforms of the voltage VB provided for pulse P[5]. The waveforms illustrated in FIGS. 21 to 28 are obtained in the plurality of electric valves 5 different from each other in pulse P, which corresponds to the timing when the movable stopper 42s comes into contact with the fixed stopper 44s, and are examples of the first-rotation restricted state waveforms of the voltage VB that vary from each other.

In the embodiment, the data tables stored in the non-volatile memory 75 are listed below. The numbers in square brackets correspond to the pattern numbers of pulse P.

The first-rotation permitted state waveforms of the voltage VA
The first-rotation permitted state table C[3]
The first-rotation permitted state table C[7]
The first-rotation permitted state waveforms of the voltage VB
The first-rotation permitted state table C[1]
The first-rotation permitted state table C[5]
The second-rotation permitted state waveforms of the voltage VA
The second-rotation permitted state table D[3]
The second-rotation permitted state table D[7]
The second-rotation permitted state waveforms of the voltage VB
The second-rotation permitted state table D[1]
The second-rotation permitted state table D[5]
The first-rotation restricted state waveforms of the voltage VA
The first-rotation restricted state table E[3]
The first-rotation restricted state table E[7]
The first-rotation restricted state waveforms of the voltage VB
The first-rotation restricted state table E[1]
The first-rotation restricted state table E[5]

In each of the data tables, a time t at predetermined intervals from the start time of pulse P (time 0) is associated with a reference voltage rv at the time t. For example, the period from the start time to the end time of pulse P is 8 milliseconds, and the time t is at intervals of 200 microseconds. One data table has 40 pairs of the time t and the reference voltage rv. FIG. 29 illustrates an example of the first-rotation permitted state table C[1]. In FIG. 29, a microsecond is used for the unit of the time t, and a millivolt is used for the unit of the reference voltage rv. A proprietary unit, such as a unit corresponding to resolution or a sampling period of the analog-to-digital converter of the electric valve control device 70, may be used for the units of the time t and the reference voltage rv.

The electric valve control device 70 includes a computer 80, which functions as a rotation controller 81, a voltage obtainer 82, and a state determiner 83.

The rotation controller 81 and the voltage obtainer 82 each have the same (including substantially the same) functions as those of the electric valve device 1 described above. The voltage obtainer 82 sequentially obtains the voltages VA and VB during the period from the start time to the end time of pulse P at the same intervals as those of the time t in the data table. In the embodiment, the voltage obtainer 82 obtains 40 voltages VA in response to one pulse P being input and 40 voltages VB in response to one pulse P being input.

The state determiner 83 calculates a value (a difference degree score) indicating a degree of difference between the waveforms of the voltages (the waveforms of the voltages VA and VB) obtained by the voltage obtainer 82 and the reference waveforms of the voltages (the reference waveforms of the voltages VA and VB), in an initialization operation. The state determiner 83 determines the state of the electric valve 5, based on the difference degree score. The larger the difference degree score, the larger the degree of difference between the waveform of the voltage and the reference waveform of the voltage.

When the voltage obtainer 82 obtains voltage v (voltage VA, voltage VB) at an obtaining time tv in response to pulse P[k] (k=1, 3, 5, 7) being input, the state determiner 83 reads the reference voltage rv associated with the time t corresponding to the obtaining time tv from the data table of the reference waveform (at least one of the first-rotation permitted state table C[k], the second-rotation permitted state table D[k], and the first-rotation restricted state table E[k]) corresponding to pulse P[k]. The state determiner 83 calculates a value (a difference value dv) by subtracting the reference voltage rv from the voltage v obtained by the voltage obtainer 82. The state determiner 83 calculates a squared value (an intermediate value dv2) of the difference value dv. The state determiner 83 calculates a difference degree score sv[k] by summing the intermediate values dv2 calculated in response to pulse P[k] being input. The state determiner 83 compares the difference degree score sv[k] with a predetermined difference degree score threshold H. The state determiner 83 determines whether the electric valve 5 is in any of the first-rotation permitted state Sp1, the second-rotation permitted state Sp2, the first-rotation restricted state Sr1, and the second-rotation restricted state Sr2, based on the result of comparing the difference degree score sv[k] with the difference degree score threshold H. The state determiner 83 determines that the electric valve 5 is in the first-rotation permitted state Sp1 when pulses P[2], P[4], P[6], and P[8] for rotating the rotor 41 in the first direction are input. The state determiner 83 determines that the electric valve 5 is in the second-rotation permitted state Sp2 when pulses P[2], P[4], P[6], and P[8] for rotating the rotor 41 in the second direction are input.

Figure 30:
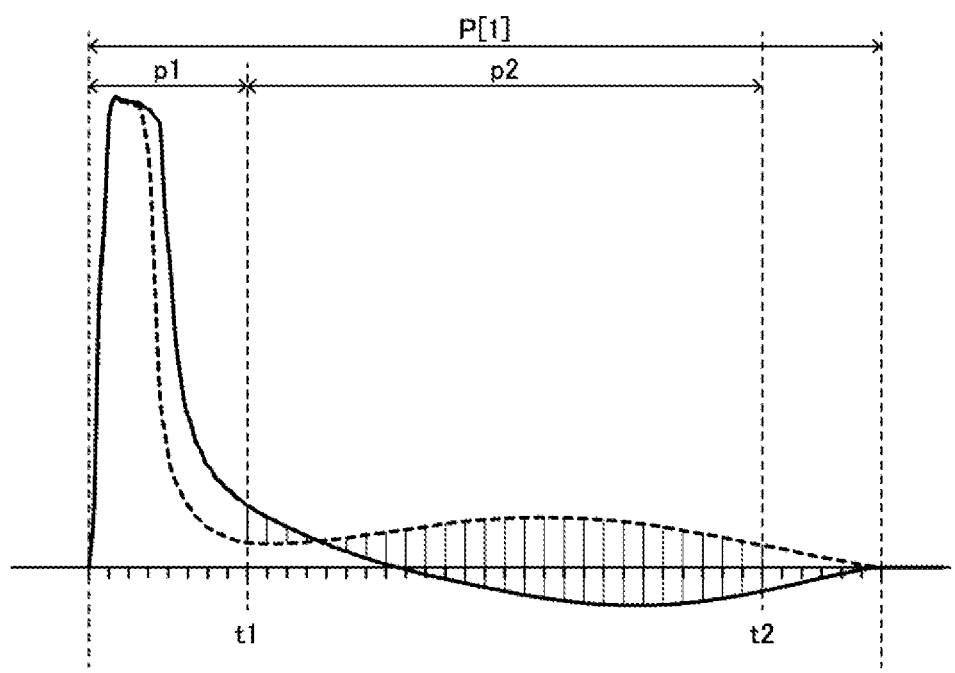
FIG. 30 is a diagram illustrating an example of a waveform of the voltage and a reference waveform of the voltage.

In the embodiment, the state determiner 83 calculates the difference degree score sv[k] by using the voltages v obtained by the voltage obtainer 82 during a part of the period from the start time to the end time of pulse P[k]. Specifically, when a time period from the start time of pulse P[k] to a time t1 is defined as a first part p1 and a time period from the time t1 to a time t2 is defined as a second part p2, the state determiner 83 calculates the difference degree score sv[k] by using the voltages v obtained in the second part p2. FIG. 30 illustrates examples of the waveform (a solid line) of the voltage VB obtained in response to pulse P[1] being input and the first-rotation permitted state waveform (a dashed line) of the voltage VB. The time t1 is after the start time of pulse P[k], and the time t2 is after the time t1 and before the end time of pulse P[k]. The time t2 may coincide with the end time of pulse P[k]. In FIG. 30, the length of each vertical line that connects the waveform of the voltage VB with the first-rotation permitted state waveform of the voltage VB in the second part p2 corresponds to the difference value dv used for calculating the difference degree score svC[1]. The state determiner 83 does not use the voltage v in the first part p1 for calculating the difference degree score sv[k].

At a time shortly after the start time of pulse P[k], the voltage v includes a voltage component (a first voltage component) due to back electromotive force generated by inductance of the coils of the stator 60 and a voltage component (a second voltage component) due to electromagnetic induction generated by the rotation of the rotor 41, and the magnitude of the first voltage component is larger than that of the second voltage component. The magnitude of the first voltage component decreases as time passes. Therefore, the state determiner 83 calculates the difference degree score sv[k] by using the voltages v obtained by the voltage obtainer 82 after a certain time passes from the start time of pulse P[k]. Specifically, the state determiner 83 calculates the difference degree score sv[k] by using the voltages v obtained by the voltage obtainer 82 after the magnitude of the first voltage component becomes smaller than that of the second voltage component. In this configuration, the percentage of the magnitude of the second voltage component become relatively large in the voltage v, and the state determiner 83 can determine the state of the electric valve 5 more accurately. The length of the first part p1 is 5 to 50% of the period from the start time to the end time of pulse P[k] and is preferably 20 to 30%. The length of the second part p2 is 50 to 95% of the period from the start time to the end time of pulse P[k] and is preferably 70 to 80%. Concerning the voltage v obtained by the voltage obtainer 82 during the second part p2, the magnitude of the first voltage component of the voltage v due to back electromotive force generated by inductance of the coils of the stator 60 is smaller than that of the second voltage component of the voltage v due to electromagnetic induction generated by the rotation of the rotor 41. The state determiner 83 may calculate the difference degree score sv[k] by using the voltages v obtained by the voltage obtainer 82 during the period (the entire period) from the start time to the end time of pulse P[k]. In this configuration, the time t1 coincides with the start time of pulse P[k], and the time t2 coincides with the end time of pulse P[k].

When the voltage v obtained at the obtaining time tv in the time period from the time t1 to the time t2 is referred to as v[tv] and the reference voltage rv associated with the time t corresponding to the obtaining time tv in the data table of the reference waveform is referred to as rv[tv], the difference degree score sv is given by the following expression (1).

[expression 1]

$$sv = \sum_{tv=t1}^{t2} (v[tv] - rv[tv])^2 \quad (1)$$

Figure 31:
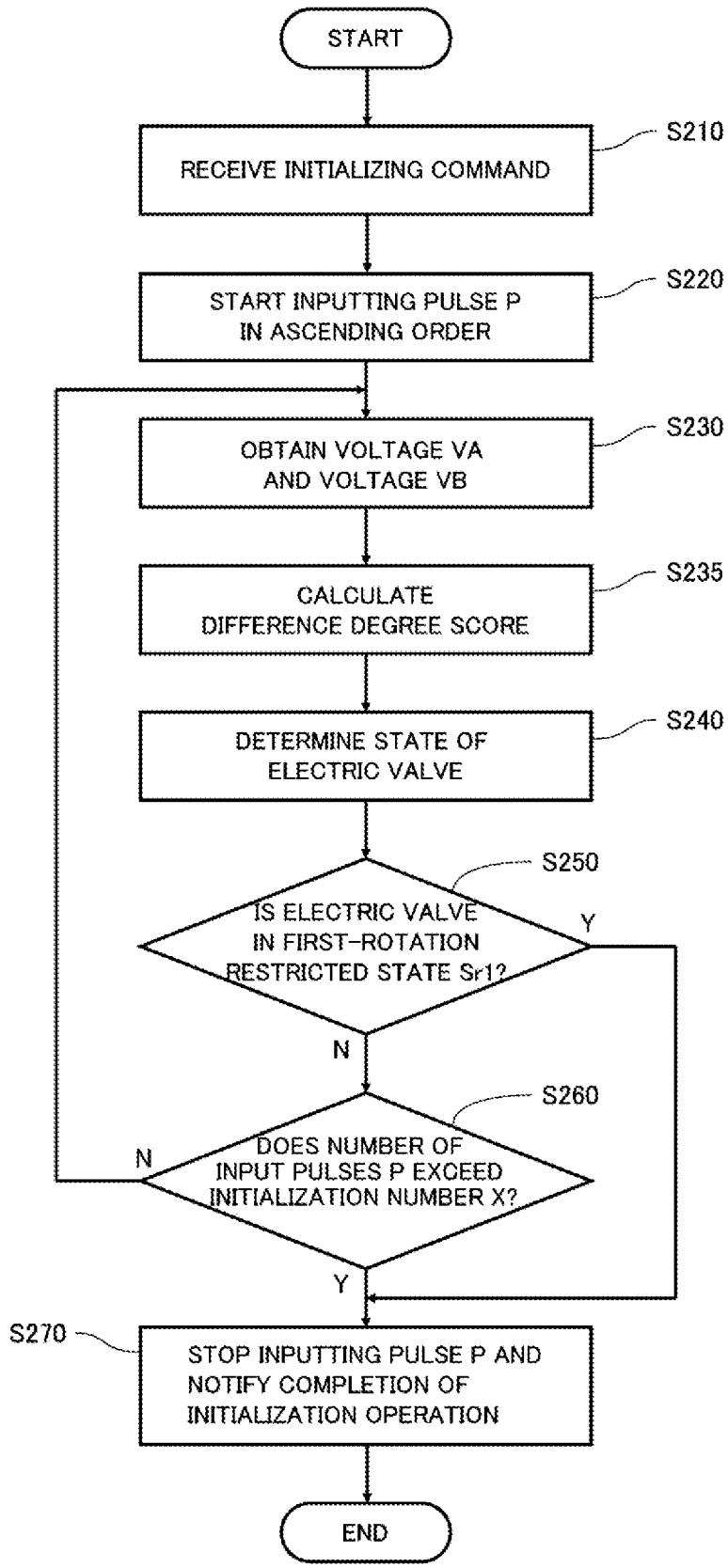
FIG. 31 is a flowchart illustrating an operation example 1 of an electric valve control device according to an embodiment of the present invention.

Next, an example (operation example 1) of the initialization operation of the electric valve control device 70 is described below with reference to FIG. 31.

In operation example 1, the electric valve control device 70 finishes the initialization operation for the electric valve 5 when the rotation of the rotor 41 in the first direction is restricted.

When the electric valve control device 70 receives an initializing command from an air conditioner control device 110 (S210), the electric valve control device 70 starts inputting pulses P[1] to P[8] to a stepping motor 66 in ascending order (S220). This starts the initialization operation, and the driving currents corresponding to pulses P[1] to P[8] are supplied to the stator 60 to rotate the rotor 41 in the first direction.

When the rotor 41 rotates in the first direction, the electric valve control device 70 sequentially obtains the voltages VA generated between the terminals A1 and A2 of the coil 61c of the A-phase stator 61 and the voltages VB generated between the terminals B1 and B2 of the coil 62c of the B-phase stator 62 (S230). In other words, the electric valve control device 70 obtains the waveforms of the voltages VA and VB. Specifically, the electric valve control device 70 obtains the voltage VB generated between the terminals B1 and B2 of the coil 62c of the B-phase stator 62 when the driving currents are supplied only to the coil 61c of the A-phase stator 61 in response to inputting pulses P[1] and P[5]. The electric valve control device 70 obtains the voltage VA generated between the terminals A1 and A2 of the coil 61c of the A-phase stator 61 when the driving currents are supplied only to the coil 62c of the B-phase stator 62 in response to inputting pulses P[3] and P[7]. When the electric valve control device 70 inputs pulses P[2], P[4], P[6], and P[8], the electric valve control device 70 does not obtain the voltages VA and VB.

The electric valve control device 70 calculates the difference degree score sv (S235) and determines the state of the electric valve 5 based on the difference degree score sv (S240). The electric valve control device 70 has three determining methods for determining the first-rotation restricted state Sr1 based on the difference degree score sv.

Determining method 1: using only the first-rotation permitted state tables C.
Determining method 2: using only the first-rotation restricted state tables E.
Determining method 3: using the first-rotation permitted state tables C and the first-rotation restricted state tables E.

<Determining Method 1>

The electric valve control device 70 calculates the difference degree score svC[k] (k=1, 3, 5, 7) by using the first-rotation permitted state table C[k] (S235). Specifically, the electric valve control device 70 calculates the difference degree score svC[1] by using the first-rotation permitted state table C[1] in response to inputting pulse P[1]. The electric valve control device 70 calculates the difference degree score svC[3] by using the first-rotation permitted state table C[3] in response to inputting pulse P[3]. The electric valve control device 70 calculates the difference degree score svC[5] by using the first-rotation permitted state table C[5] in response to inputting pulse P[5]. The electric valve control device 70 calculates the difference degree score svC[7] by using the first-rotation permitted state table C[7] in response to inputting pulse P[7].

The electric valve control device 70 determines the state of the electric valve 5 at the end time of pulse P[k] (S240). Specifically, the electric valve control device 70 compares the difference degree score svC[k] with a difference degree score threshold HC and compares the difference degree score svc[j] (j=k−2 when k=3, 5, 7, and j=7 when k=1), which is calculated immediately before the difference degree score svC[k], with the difference degree score threshold HC. The electric valve control device 70 determines that the electric valve 5 is in the first-rotation restricted state Sr1 when the difference degree score svC[k] is larger than or equal to the difference degree score threshold HC and the difference degree score svC[j] is larger than or equal to the difference degree score threshold HC. With this determination, the electric valve control device 70 stores a starting pattern number Nx, which is the number immediately before j (j−1 when j=3, 5, 7, and 8 when j=1), in the non-volatile memory 75. The electric valve control device 70 determines that the electric valve 5 is in the first-rotation permitted state Sp1 when the electric valve control device 70 does not determine that the electric valve 5 is in the first-rotation restricted state Sr1.

As a modification example of determining method 1, the electric valve control device 70 may determine the state of the electric valve 5 by using only the difference degree score svC[k] without using the difference degree score svC[j]. In this configuration, the electric valve control device 70 determines that the electric valve 5 is in the first-rotation restricted state Sr1 when the difference degree score svC[k] is larger than or equal to the difference degree score threshold HC. With this determination, the electric valve control device 70 stores the starting pattern number Nx, which is the number immediately before k (k−1 when k=3, 5, 7, and 8 when k=1), in the non-volatile memory 75. The electric valve control device 70 determines that the electric valve 5 is in the first-rotation permitted state Sp1 when the difference degree score svC[k] is smaller than the difference degree score threshold HC.

As another modification example of determining method 1, the electric valve control device 70 may determine the state of the electric valve 5 by using the waveforms of only one of the voltages VA and VB. The electric valve control device 70 may determine the state of the electric valve 5 by using only the waveform of the voltage VA corresponding to one of pulses P[3] and P[7]. The electric valve control device 70 may determine the state of the electric valve 5 by using only the waveform of the voltage VB corresponding to one of pulses P[1] and P[5]. The waveforms used for the determination preferably include less noise.

For example, the electric valve control device 70 calculates the difference degree score svC[k] (k=1, 7) by using the first-rotation permitted state table C[k] (S235). The electric valve control device 70 determines the state of the electric valve 5 at the end time of pulse P[k] (S240). In this modification example, k can be either k=3, 5, k=1, 3, or k=5, 7, or k may be one of the values 1, 3, 5, and 7.

Specifically, when k=7, the electric valve control device 70 compares the difference degree score svC[7] with the difference degree score threshold HC and compares the difference degree score svC[7]', which is calculated immediately before the difference degree score svC[7], with the difference degree score threshold HC. When a time period, where pulses P[1] to P[8] are input, is defined as a time period T, the difference degree score svC[7]' is calculated in response to pulse P[7] being input in the time period T immediately before the present time period T. The electric valve control device 70 determines that the electric valve 5 is in the first-rotation restricted state Sr1 when the difference degree score svC[7] is larger than or equal to the difference degree score threshold HC and the difference degree score svC[7]' is larger than or equal to the difference degree score threshold HC. With this determination, the electric valve control device 70 stores the starting pattern number Nx, which is the number immediately before k (i.e., 6), in the non-volatile memory 75. When k=1, the electric valve control device 70 compares the difference degree score svC[1] with the difference degree score threshold HC and compares the difference degree score svC[1]', which is calculated immediately before the difference degree score svC[1], with the difference degree score threshold HC. The difference degree score svC[1]' is calculated in response to pulse P[1] being input in the time period T immediately before the present time period T. The electric valve control device 70 determines that the electric valve 5 is in the first-rotation restricted state Sr1 when the difference degree score svC[1] is larger than or equal to the difference degree score threshold HC and the difference degree score svC[1]' is larger than or equal to the difference degree score threshold HC. With this determination, the electric valve control device 70 stores the starting pattern number Nx, which is the number immediately before k (i.e., 8), in the non-volatile memory 75. The electric valve control device 70 determines that the electric valve 5 is in the first-rotation permitted state Sp1 when the electric valve control device 70 does not determine that the electric valve 5 is in the first-rotation restricted state Sr1.

<Determining Method 2>

The electric valve control device 70 calculates the difference degree score svE[k] by using the first-rotation restricted state table E[k] (S235). Specifically, the electric valve control device 70 calculates the difference degree score svE[1] by using the first-rotation restricted state table E[1] in response to inputting pulse P[1]. The electric valve control device 70 calculates the difference degree score svE[3] by using the first-rotation restricted state table E[3] in response to inputting pulse P[3]. The electric valve control device 70 calculates the difference degree score svE[5] by using the first-rotation restricted state table E[5] in response to inputting pulse P[5]. The electric valve control device 70 calculates the difference degree score svE[7] by using the first-rotation restricted state table E[7] in response to inputting pulse P[7].

The electric valve control device 70 determines the state of the electric valve 5 at the end time of pulse P[k](S240). Specifically, the electric valve control device 70 compares the difference degree score svE[k] with a difference degree score threshold HE and compares the difference degree score svE[j], which is calculated immediately before the difference degree score svE[k], with the difference degree score threshold HE. The electric valve control device 70 determines that the electric valve 5 is in the first-rotation restricted state Sr1 when the difference degree score svE[k] is smaller than the difference degree score threshold HE and the difference degree score svE[j] is smaller than the difference degree score threshold HE. With this determination, the electric valve control device 70 stores the starting pattern number Nx, which is the number immediately before j, in the non-volatile memory 75. The electric valve control device 70 determines that the electric valve 5 is in the first-rotation permitted state Sp1 when the electric valve control device 70 does not determine that the electric valve 5 is in the first-rotation restricted state Sr1.

As a modification example of determining method 2, the electric valve control device 70 determines the state of the electric valve 5 by using only the difference degree score svE[k] without using the difference degree score svE[j]. In this configuration, the electric valve control device 70 determines that the electric valve 5 is in the first-rotation restricted state Sr1 when the difference degree score svE[k] is smaller than the difference degree score threshold HE. With this determination, the electric valve control device 70 stores the starting pattern number Nx, which is the number immediately before k, in the non-volatile memory 75. The electric valve control device 70 determines that the electric valve 5 is in the first-rotation permitted state Sp1 when the difference degree score svE[k] is larger than or equal to the difference degree score threshold HE.

As another modification example of determining method 2, the electric valve control device 70 may determine the state of the electric valve 5 in the following manner when the first-rotation restricted state waveforms (E[3]_1 to E[3]_8, E[7]_1 to E[7]_8, E[1]_1 to E[1]_8, and E[5]_1 to E[5]_8) are provided for one pulse P. The electric valve control device 70 calculates the difference degree scores svE[k]_1 to svE[k]_8 by using the first-rotation restricted state table E[k]_1 to E[k]_8. The electric valve control device 70 compares each of the difference degree scores svE[k]_1 to svE[k]_8 with the difference degree score threshold HE and compares each of the difference degree scores svE[j]_1 to svE[j]_8 with the difference degree score threshold HE. The electric valve control device 70 determines that the electric valve 5 is in the first-rotation restricted state Sr1 when at least one of the difference degree scores svE[k]_1 to svE[k]_8 is smaller than the difference degree score threshold HE and at least one of the difference degree scores svE[j]_1 to svE[j]_8 is smaller than the difference degree score threshold HE. With this determination, the electric valve control device 70 stores the starting pattern number Nx, which is the number immediately before j, in the non-volatile memory 75. The electric valve control device 70 determines that the electric valve 5 is in the first-rotation permitted state Sp1 when the electric valve control device 70 does not determine that the electric valve 5 is in the first-rotation restricted state Sr1. The electric valve control device 70 may determine the state of the electric valve 5 by using only the difference degree scores svE[k]_1 to svE[k]_8 without using the difference degree scores svE[j]_1 to svE[j]_8.

As still another modification example of determining method 2, the electric valve control device 70 may determine the state of the electric valve 5 by using the waveforms of only one of the voltages VA and VB. The electric valve control device 70 may determine the state of the electric valve 5 by using the waveform of the voltage VA corresponding to one of pulses P[3] and P[7]. The electric valve control device 70 may determine the state of the electric valve 5 by using the waveform of the voltage VB corresponding to one of pulses P[1] and P[5]. The waveforms used for the determination preferably include less noise.

For example, the electric valve control device 70 calculates the difference degree score svE[k] (k=1, 7) by using the first-rotation restricted state table E[k] (S235). The electric valve control device 70 determines the state of the electric valve 5 at the end time of pulse P[k] (S240). In this modification example, k can be either k=3, 5, k=1, 3, or k=5, 7, or k may be one of the values 1, 3, 5, and 7.

Specifically, when k=7, the electric valve control device 70 compares the difference degree score svE[7] with the difference degree score threshold HE and compares the difference degree score svE[7]', which is calculated immediately before the difference degree score svE[7], with the difference degree score threshold HE. The difference degree score svE[7]' is calculated in response to pulse P[7] being input in the time period T immediately before the present time period T. The electric valve control device 70 determines that the electric valve 5 is in the first-rotation restricted state Sr1 when the difference degree score svE[7] is smaller than the difference degree score threshold HE and the difference degree score svE[7]' is smaller than the difference degree score threshold HE. With this determination, the electric valve control device 70 stores the starting pattern number Nx, which is the number immediately before k (i.e., 6), in the non-volatile memory 75. When k=1, the electric valve control device 70 compares the difference degree score svE[1] with the difference degree score threshold HE and compares the difference degree score svE[1]', which is calculated immediately before the difference degree score svE[1], with the difference degree score threshold HE. The difference degree score svE[1]' is calculated in response to pulse P[1] being input in the time period T immediately before the present time period T. The electric valve control device 70 determines that the electric valve 5 is in the first-rotation restricted state Sr1 when the difference degree score svE[1] is smaller than the difference degree score threshold HE and the difference degree score svE[1]' is smaller than the difference degree score threshold HE. With this determination, the electric valve control device 70 stores the starting pattern number Nx, which is the number immediately before k (i.e., 8), in the non-volatile memory 75. The electric valve control device 70 determines that the electric valve 5 is in the first-rotation permitted state Sp1 when the electric valve control device 70 does not determine that the electric valve 5 is in the first-rotation restricted state Sr1.

<Determining Method 3>

The electric valve control device 70 calculates the difference degree scores svC[k] and svE[k] by using the first-rotation permitted state table C[k] and the first-rotation restricted state table E[k] (S235). Specifically, the electric valve control device 70 calculates the difference degree score svC[1] by using the first-rotation permitted state table C[1] and the difference degree score svE[1] by using the first-rotation restricted state table E[1], in response to inputting pulse P[1]. The electric valve control device 70 calculates the difference degree score svC[3] by using the first-rotation permitted state table C[3] and the difference degree score svE[3] by using the first-rotation restricted state table E[3], in response to inputting pulse P[3]. The electric valve control device 70 calculates the difference degree score svC[5] by using the first-rotation permitted state table C[5] and the difference degree score svE[5] by using the first-rotation restricted state table E[5], in response to inputting pulse P[5]. The electric valve control device 70 calculates the difference degree score svC[7] by using the first-rotation permitted state table C[7] and the difference degree score svE[7] by using the first-rotation restricted state table E[7], in response to inputting pulse P[7].

The electric valve control device 70 determines the state of the electric valve 5 at the end time of pulse P[k](S240). Specifically, the electric valve control device 70 compares the difference degree score svC[k] with the difference degree score threshold HC and compares the difference degree score svC[j], which is calculated immediately before the difference degree score svC[k], with the difference degree score threshold HC. The electric valve control device 70 compares the difference degree score svE[k] with the difference degree score threshold HE and compares the difference degree score svE[j], which is calculated immediately before the difference degree score svE[k], with the difference degree score threshold HE. The electric valve control device 70 determines that the electric valve 5 is in the first-rotation restricted state Sr1 when the difference degree score svC[k] is larger than or equal to the difference degree score threshold HC, the difference degree score svC[j] is larger than or equal to the difference degree score threshold HC, the difference degree score svE[k] is smaller than the difference degree score threshold HE, and the difference degree score svE[j] is smaller than the difference degree score threshold HE. With this determination, the electric valve control device 70 stores the starting pattern number Nx, which is the number immediately before j, in the non-volatile memory 75. The electric valve control device 70 determines that the electric valve 5 is in the first-rotation permitted state Sp1 when the electric valve control device 70 does not determine that the electric valve 5 is in the first-rotation restricted state Sr1.

In determining method 3, the difference degree scores svC[k] and svC[j] are first-rotation permitted state difference degree scores, and the difference degree scores svE[k] and svE[j] are first-rotation restricted state difference degree scores. The difference degree score threshold HC is a first-rotation permitted state difference degree score threshold. The difference degree score threshold HE is a first-rotation restricted state difference degree score threshold. The difference degree score threshold HC may be the same as or different from the difference degree score threshold HE.

As a modification example of determining method 3, the electric valve control device 70 may determine the state of the electric valve 5 by using only the difference degree scores svC[k] and svE[k] without using the difference degree scores svC[j] and svE[j]. In this configuration, the electric valve control device 70 determines that the electric valve 5 is in the first-rotation restricted state Sr1 when the difference degree score svC[k] is larger than or equal to the difference degree score threshold HC and the difference degree score svE[k] is smaller than the difference degree score threshold HE. With this determination, the electric valve control device 70 stores the starting pattern number Nx, which is the number immediately before k, in the non-volatile memory 75. The electric valve control device 70 determines that the electric valve 5 is in the first-rotation permitted state Sp1 when the electric valve control device 70 does not determine that the electric valve 5 is in the first-rotation restricted state Sr1.

As another modification example of determining method 3, the electric valve control device 70 may determine the state of the electric valve 5 by using the waveforms of only one of the voltages VA and VB. The electric valve control device 70 may determine the state of the electric valve 5 by using only the waveform of the voltage VA corresponding to one of pulses P[3] and P[7]. The electric valve control device 70 may determine the state of the electric valve 5 by using only the waveform of the voltage VB corresponding to one of pulses P[1] and P[5]. The waveforms used for the determination preferably include less noise.

For example, the electric valve control device 70 calculates the difference degree scores svC[k] and svE[k] (k=1, 7) by using the first-rotation permitted state table C[k] and the first-rotation restricted state table E[k](S235). The electric valve control device 70 determines the state of the electric valve 5 at the end time of pulse P[k](S240). In this modification example, k can be either k=3, 5, k=1, 3, or k=5, 7, or k may be one of the values 1, 3, 5, and 7.

Specifically, when k=7, the electric valve control device 70 compares the difference degree score svC[7] with the difference degree score threshold HC and compares the difference degree score svC[7]', which is calculated immediately before the difference degree score svC[7], with the difference degree score threshold HC. When k=7, the electric valve control device 70 compares the difference degree score svE[7] with the difference degree score threshold HE and compares the difference degree score svE[7]', which is calculated immediately before the difference degree score svE[7], with the difference degree score threshold HE. The electric valve control device 70 determines that the electric valve 5 is in the first-rotation restricted state Sr1 when the difference degree score svC[7] is larger than or equal to the difference degree score threshold HC, the difference degree score svC[7]' is larger than or equal to the difference degree score threshold HC, the difference degree score svE[7] is smaller than the difference degree score threshold HE, and the difference degree score svE[7]' is smaller than the difference degree score threshold HE. With this determination, the electric valve control device 70 stores the starting pattern number Nx, which is the number immediately before k (i.e., 6), in the non-volatile memory 75. When k=1, the electric valve control device 70 compares the difference degree score svC[1] with the difference degree score threshold HC and compares the difference degree score svC[1]', which is calculated immediately before the difference degree score svC[1], with the difference degree score threshold HC. When k=1, the electric valve control device 70 compares the difference degree score svE[1] with the difference degree score threshold HE and compares the difference degree score svE[1]', which is calculated immediately before the difference degree score svE[1], with the difference degree score threshold HE. The electric valve control device 70 determines that the electric valve 5 is in the first-rotation restricted state Sr1 when the difference degree score svC[1] is larger than or equal to the difference degree score threshold HC, the difference degree score svC[1]' is larger than or equal to the difference degree score threshold HC, the difference degree score svE[1] is smaller than the difference degree score threshold HE, and the difference degree score svE[1]' is smaller than the difference degree score threshold HE. With this determination, the electric valve control device 70 stores the starting pattern number Nx, which is the number immediately before k (i.e., 8), in the non-volatile memory 75. The electric valve control device 70 determines that the electric valve 5 is in the first-rotation permitted state Sp1 when the electric valve control device 70 does not determine that the electric valve 5 is in the first-rotation restricted state Sr1.

An appropriate pattern number may be stored in the non-volatile memory 75 as the starting pattern number Nx of the electric valve 5 on shipment of the electric valve device 1 from the factory. In this configuration, the electric valve control device 70 does not store the starting pattern number Nx in determining methods 1 to 3.

When the electric valve 5 is in the first-rotation restricted state Sr1 (Y in S250), the electric valve control device 70 finishes inputting pulses P[1] to P[8] to the stepping motor 66 and notifies the completion of the initialization operation to the air conditioner control device 110 (S270).

When the electric valve 5 is in the first-rotation permitted state Sp1 (N in S250) and the number of pulses P input to the stepping motor 66 exceeds an initialization number X (Y in S260), the electric valve control device 70 finishes inputting pulses P to the stepping motor 66 and notifies the completion of the initialization operation to the air conditioner control device 110 (S270).

When the number of pulses P input to the stepping motor 66 is smaller than or equal to the initialization number X (N in S260), the electric valve control device 70 obtains the voltages VA and VB again (S230) and repeats the operation described above (S230 to S260).

When the initialization operation is completed, the rotor 41 is positioned at the reference position Rx. When the electric valve control device 70 rotates the rotor 41 at the reference position Rx in the second direction, the electric valve control device 70 inputs pulses P[1] to P[8] to the stepping motor 66 in descending order. At this time, the electric valve control device 70 starts inputting pulses P from pulse P of a pattern number identical to the starting pattern number Nx. For example, when the starting pattern number Nx is [7], the electric valve control device 70 starts inputting pulses P from pulse P[7] in descending order.

Figure 32:
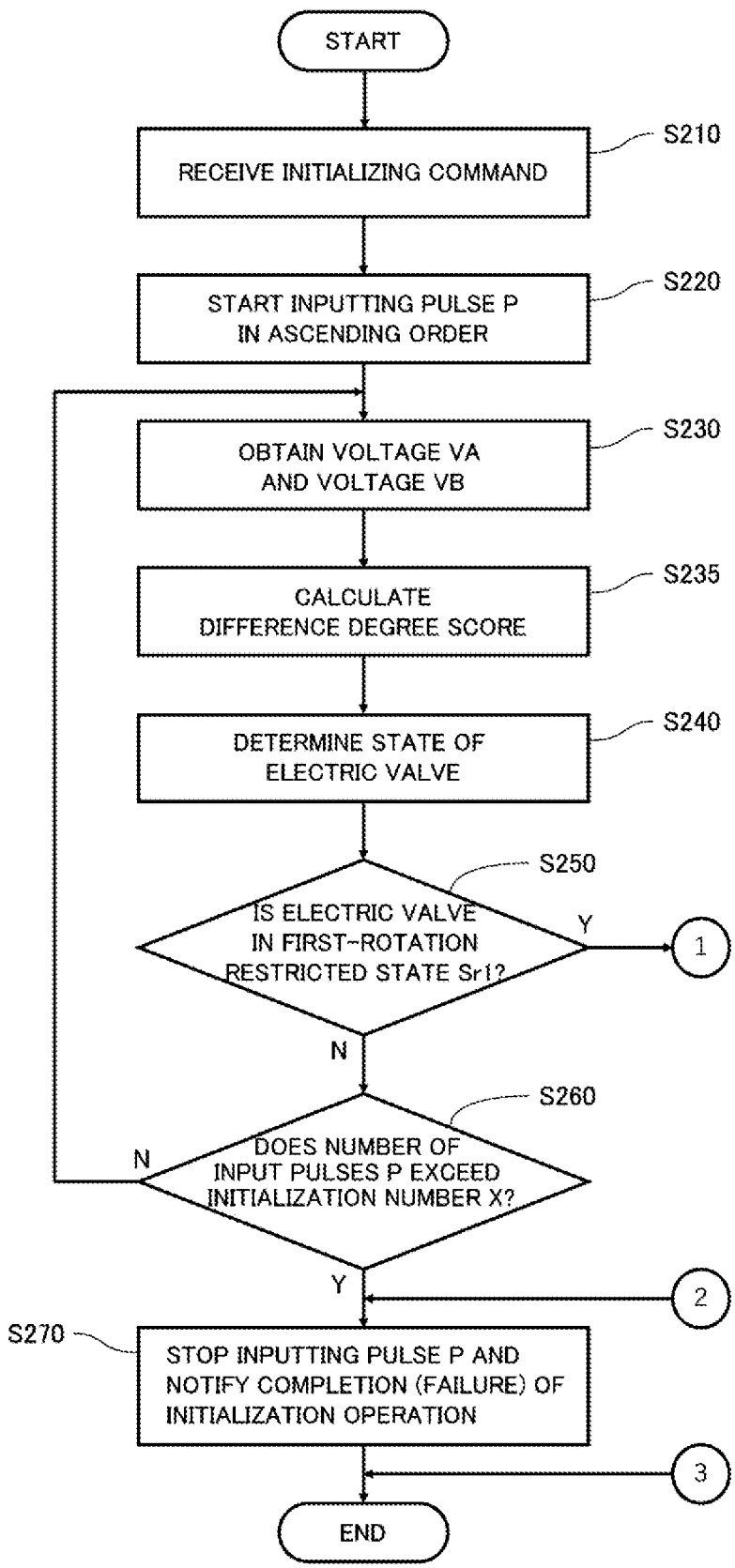
FIG. 32 is a flowchart illustrating an operation example 2 of the electric valve control device according to the embodiment of the present invention.
Figure 33:
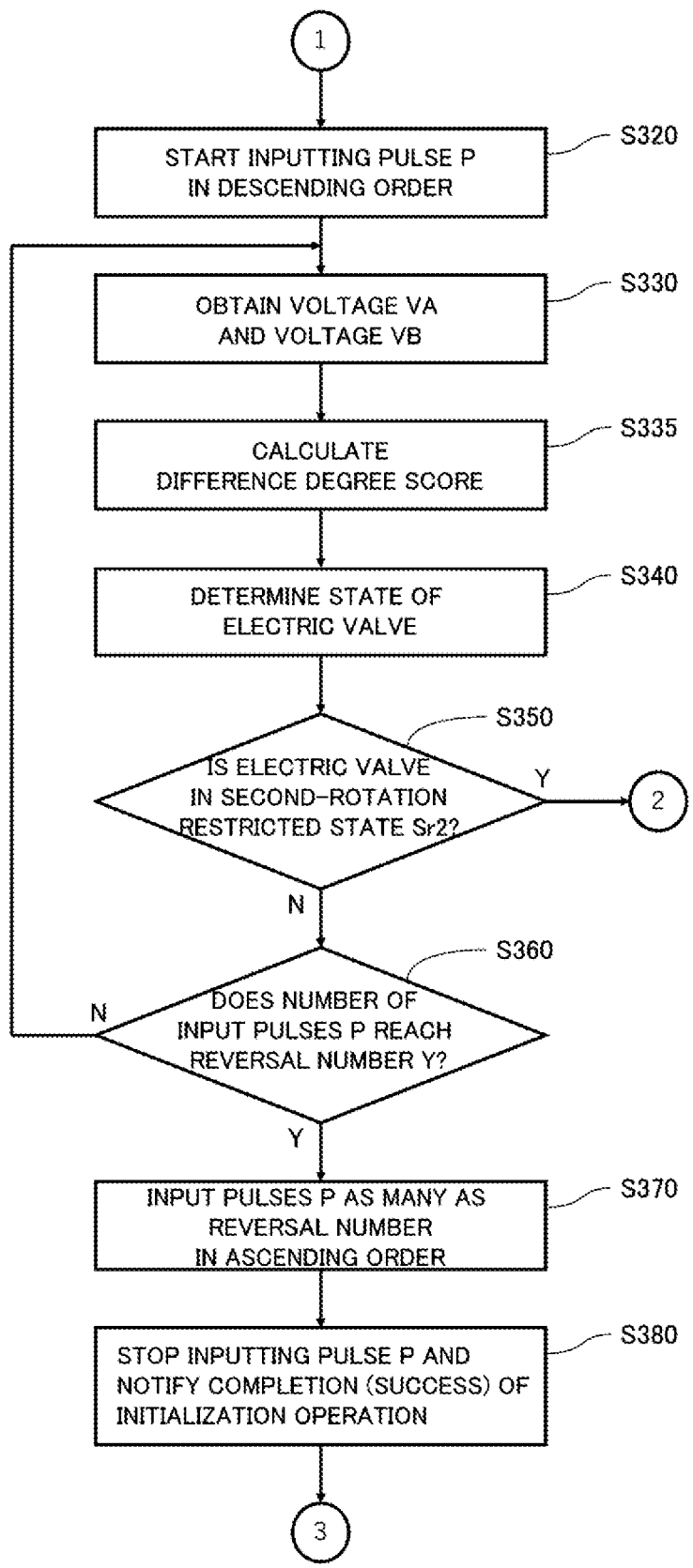
FIG. 33 is a flowchart illustrating the operation example 2 of the electric valve control device according to an embodiment of the present invention (following the flowchart in FIG. 32).

Next, another example (operation example 2) of the initialization operation of the electric valve control device 70 is described below with reference to FIGS. 32 and 33.

In operation example 2, when the rotor 41 can rotate in the second direction after the rotation of the rotor 41 in the first direction is restricted, the electric valve control device 70 determines that initializing of the electric valve 5 is successful and completes the initialization operation. The electric valve control device 70 determines the state of the electric valve 5 more strictly in operation example 2 than in operation example 1.

Steps of operation example 2, which involve the same (including substantially the same) operations as those of operation example 1, are marked with identical symbols, and detailed explanations thereof are omitted.

When the electric valve control device 70 (specifically, the computer 80) receives the initializing command from the air conditioner control device 110 (S210), the electric valve control device 70 starts inputting pulses P[1] to P[8] to the stepping motor 66 in ascending order (S220). This starts the initialization operation, and the driving currents corresponding to pulses P[1] to P[8] are supplied to the stator 60 to rotate the rotor 41 in the first direction.

When the rotor 41 rotates in the first direction, the electric valve control device 70 sequentially obtains the voltages VA generated between the terminals A1 and A2 of the coil 61c of the A-phase stator 61 and the voltages VB generated between the terminals B1 and B2 of the coil 62c of the B-phase stator 62 (S230).

The electric valve control device 70 calculates the difference degree score sv (S235) and determines the state of the electric valve 5 based on the difference degree score sv (S240). The electric valve control device 70 determines the state of the electric valve 5 by using any one of determining methods 1 to 3.

When the electric valve 5 is in the first-rotation permitted state Sp1 (N in S250) and the number of pulses P input to the stepping motor 66 exceeds the initialization number X (Y in S260), the electric valve control device 70 finishes inputting pulses P to the stepping motor 66 and notifies the completion of the initialization operation (failure of initialization) to the air conditioner control device 110 (S270). In this case, the electric valve control device 70 may have not determined the state of the electric valve 5 accurately due to change in the waveforms of the voltages VA and VB caused by factors such as wear of the stopper mechanism 49 in the electric valve 5.

When the number of pulses P input to the stepping motor 66 is smaller than or equal to the initialization number X (N in S260), the electric valve control device 70 obtains the voltages VA and VB again (S230) and repeats the operation described above (S230 to S260).

When the electric valve 5 is in the first-rotation restricted state Sr1 (Y in S250), the electric valve control device 70 starts inputting pulses P[1] to P[8] to the stepping motor 66 in descending order (S320). At this time, the electric valve control device 70 starts inputting pulses P from pulse P of a pattern number identical to the starting pattern number Nx. Thus, the driving currents corresponding to pulses P[1] to P[8] are supplied to the stator 60 to rotate the rotor 41 in the second direction.

When the rotor 41 rotates in the second direction, the electric valve control device 70 sequentially obtains the voltages VA and VB (S330). In step S330, the electric valve control device 70 performs the same (including substantially the same) operation as that in step S230.

The electric valve control device 70 calculates the difference degree score sv (S335), and determines the state of the electric valve 5 based on the difference degree score sv (S340).

The electric valve control device 70 calculates the difference degree score svD[k] (k=1, 3, 5, 7) by using the second-rotation permitted state table D[k] (S335). Specifically, the electric valve control device 70 calculates the difference degree score svD[1] by using the second-rotation permitted state table D[1] in response to inputting pulse P[1]. The electric valve control device 70 calculates the difference degree score svD[3] by using the second-rotation permitted state table D[3] in response to inputting pulse P[3]. The electric valve control device 70 calculates the difference degree score svD[5] by using the second-rotation permitted state table D[5] in response to inputting pulse P[5]. The electric valve control device 70 calculates the difference degree score svD[7] by using the second-rotation permitted state table D[7] in response to inputting pulse P[7].

The electric valve control device 70 determines the state of the electric valve 5 at the end time of pulse P[k](S340). Specifically, the electric valve control device 70 compares the difference degree score svD[k] with a difference degree score threshold HD and compares the difference degree score svD[j] (j=k−2 when k=3, 5, 7, j=7 when k=1), which is calculated immediately before the difference degree score svD[k], with the difference degree score threshold HD. The electric valve control device 70 determines that the electric valve 5 is in the second-rotation restricted state Sr2 when the difference degree score svD[k] is larger than or equal to the difference degree score threshold HD and the difference degree score svD[j] is larger than or equal to the difference degree score threshold HD. The electric valve control device 70 determines that the electric valve 5 is in the second-rotation permitted state Sp2 when the electric valve control device 70 does not determine that the electric valve 5 is in the second-rotation restricted state Sr2.

The difference degree scores svD[k] and svD[j] are second-rotation permitted state difference degree scores. The difference degree score threshold HD is a second-rotation permitted state difference degree score threshold. The difference degree score threshold HD may be the same as or different from the difference degree score threshold HC (or the difference degree score threshold HE).

The electric valve control device 70 may determine the state of the electric valve 5 by using only the difference degree score svD[k] without using the difference degree score svD[j]. In this configuration, the electric valve control device 70 determines that the electric valve 5 is in the second-rotation restricted state Sr2 when the difference degree score svD[k] is larger than or equal to the difference degree score threshold HD and determines that the electric valve 5 is in the second-rotation permitted state Sp2 when the difference degree score svD[k] is smaller than the difference degree score threshold HD.

Alternatively, the electric valve control device 70 may determine the state of the electric valve 5 by using the waveforms of only one of the voltages VA and VB. The electric valve control device 70 may determine the state of the electric valve 5 by using only the waveform of the voltage VA corresponding to one of pulses P[3] and P[7]. The electric valve control device 70 may determine the state of the electric valve 5 by using only the waveform of the voltage VB corresponding to one of pulses P[1] and P[5]. The waveforms used for the determination preferably include less noise.

For example, the electric valve control device 70 calculates the difference degree score svD[k] (k=1, 7) by using the second-rotation permitted state table D[k] (S335). The electric valve control device 70 determines the state of the electric valve 5 at the end time of pulse P[k] (S340). In this modification example, k can be either k=3, 5, k=1, 3, or k=5, 7, or k may be one of the values 1, 3, 5, and 7.

Specifically, when k=7, the electric valve control device 70 compares the difference degree score svD[7] with the difference degree score threshold HD and compares the difference degree score svD[7]', which is calculated immediately before the difference degree score svD[7], with the difference degree score threshold HD. The difference degree score svD[7]' is calculated in response to pulse P[7] being input in the time period T immediately before the present time period T. The electric valve control device 70 determines that the electric valve 5 is in the second-rotation restricted state Sr2 when the difference degree score svD[7] is larger than or equal to the difference degree score threshold HD and the difference degree score svD[7]' is larger than or equal to the difference degree score threshold HD. When k=1, the electric valve control device 70 compares the difference degree score svD[1] with the difference degree score threshold HD and compares the difference degree score svD[1]', which is calculated immediately before the difference degree score svD[1], with the difference degree score threshold HD. The difference degree score svD[1]' is calculated in response to pulse P[1] being input in the time period T immediately before the present time period T. The electric valve control device 70 determines that the electric valve 5 is in the second-rotation restricted state Sr2 when the difference degree score svD[1] is larger than or equal to the difference degree score threshold HD and the difference degree score svD[1]' is larger than or equal to the difference degree score threshold HD. The electric valve control device 70 determines that the electric valve 5 is in the second-rotation permitted state Sp2 when the electric valve control device 70 does not determine that the electric valve 5 is in the second-rotation restricted state Sr2.

When the electric valve 5 is in the second-rotation restricted state Sr2 (Y in S350), the electric valve control device 70 finishes inputting pulses P[1] to P[8] to the stepping motor 66 and notifies the completion of the initialization operation (failure of initialization) to the air conditioner control device 110 (S270). In this case, the rotor 41 may have not rotated in the first and second directions due to some faults in the electric valve 5.

When the electric valve 5 is in the second-rotation permitted state Sp2 (N in S350) and the number of pulses P input to the stepping motor 66 reaches a reversal number Y (Y in S360), the electric valve control device 70 inputs the reversal number of pulses P to the stepping motor 66 in ascending order (S370). Thus, the rotor 41 rotates in the first direction and stops the rotation at the reference position Rx. The reversal number Y is the number of pulses P required for determining whether the rotor 41 can rotate in the second direction in the electric valve 5. The reversal number Y is 16, for example. The electric valve control device 70 finishes inputting pulses P to the stepping motor 66 and notifies the completion of the initialization operation (success of initialization) to the air conditioner control device 110 (S380).

When the number of pulses P input to the stepping motor 66 is smaller than the reversal number Y (N in S360), the electric valve control device 70 obtains the voltages VA and VB again (S330) and repeats the operation described above (S330 to S360).

When the initialization operation is completed (success of initialization), the rotor 41 is positioned at the reference position Rx. When the electric valve control device 70 rotates the rotor 41 at the reference position Rx in the second direction, the electric valve control device 70 inputs pulses P[1] to P[8] to the stepping motor 66 in descending order. At this time, the electric valve control device 70 starts inputting pulses P from pulse P of a pattern number identical to the starting pattern number Nx.

The electric valve device 2 includes the electric valve 5 and the electric valve control device 70. The electric valve 5 includes the valve body 10 including the valve seat 18, the rotor 41 rotatable with respect to the valve body 10, the stator 60 constituting the stepping motor 66 together with the rotor 41, the valve member 30 facing the valve seat 18 and moving toward the valve seat 18 when the rotor 41 rotates in the first direction, and the stopper mechanism 49 restricting the rotation of the rotor 41 in the first direction when the rotor 41 is at the reference position Rx. The electric valve control device 70 inputs pulses P to the stepping motor 66 to rotate the rotor 41 in the first direction. The electric valve control device 70 obtains the voltages (the voltages VA and VB) generated in the stator 60 by the rotation of the rotor 41. The electric valve control device 70 determines whether the electric valve 5 is in the first-rotation restricted state Sr1, where the rotation of the rotor 41 in the first direction is restricted, based on the degree of difference between the waveform of the voltage and the reference waveform of the voltage.

In this configuration, when the electric valve control device 70 determines that the electric valve 5 capable of normal operation is in the first-rotation restricted state Sr1, the rotor 41 is at the reference position Rx. As a result, the electric valve control device 70 stops the rotation of the rotor 41 in the first direction when the electric valve control device 70 determines that the electric valve 5 is in the first-rotation restricted state Sr1, which enables the duration of the initialization operation to be reduced. Additionally, the electric valve control device 70 can suppress a long-lasting noise after the rotor 41 is at the reference position Rx. The electric valve control device 70 determines the state of the electric valve 5 based on the degree of difference between the waveform of the voltage and the reference waveform of the voltage. As a result, the electric valve control device 70 can determine the state of the electric valve 5 more accurately than a configuration which determines the state of the electric valve 5 based on the areas or maximum amplitudes of the waveforms.

The electric valve control device 70 determines whether the electric valve 5 is in the first-rotation restricted state Sr1, based on the voltages (the voltages VA and VB) generated in the stator 60. Hence, a component, such as a rotational angle sensor, for determining the state of the electric valve 5 based on the rotation of the rotor 41 is not required in the electric valve control device 70, resulting in a simple configuration for either the electric valve control device 70 or the electric valve 5.

The reference waveform of the voltage VA includes the first-rotation permitted state waveform which is set based on the waveform of the voltage VA obtained when the electric valve 5 is in the first-rotation permitted state Sp1 and pulse P (the first-direction pulse) for rotating the rotor 41 in the first direction is input to the stepping motor 66. The first-rotation permitted state waveforms of the voltage VA are represented as the first-rotation permitted state tables C[3] and C[7]. The reference waveform of the voltage VB includes the first-rotation permitted state waveform which is set based on the waveform of the voltage VB obtained when the electric valve 5 is in the first-rotation permitted state Sp1 and the first-direction pulse is input to the stepping motor 66. The first-rotation permitted state waveforms of the voltage VB are represented as the first-rotation permitted state tables C[1] and C[5]. The electric valve control device 70 calculates the difference degree score svC (svC[3], svC[7]) indicating the degree of difference between the first-rotation permitted state waveform of the voltage VA and the waveform of the voltage VA obtained in response to inputting the first-direction pulse to the stepping motor 66. The electric valve control device 70 calculates the difference degree score svC (svC[1], svC[5]) indicating the degree of difference between the first-rotation permitted state waveform of the voltage VB and the waveform of the voltage VB obtained in response to inputting the first-direction pulse to the stepping motor 66. The electric valve control device 70 determines whether the electric valve 5 is in the first-rotation restricted state Sr1, based on the result of comparing the difference degree score svC with the difference degree score threshold HC (determining method 1). In this configuration, the electric valve control device 70 can determine the state of the electric valve 5 more accurately.

The reference waveform of the voltage VA includes the first-rotation restricted state waveform which is set based on the waveform of the voltage VA obtained when the electric valve 5 is in the first-rotation restricted state Sr1 and the first-direction pulse is input to the stepping motor 66. The first-rotation restricted state waveforms of the voltage VA are represented as the first-rotation restricted state tables E[3] and E[7]. The reference waveform of the voltage VB includes the first-rotation restricted state waveform which is set based on the waveform of the voltage VB obtained when the electric valve 5 is in the first-rotation restricted state Sr1 and the first-direction pulse is input to the stepping motor 66. The first-rotation restricted state waveforms of the voltage VB are represented as the first-rotation restricted state tables E[1] and E[5]. The electric valve control device 70 calculates the difference degree score svE (svE[3], svE[7]) indicating the degree of difference between the first-rotation restricted state waveform of the voltage VA and the waveform of the voltage VA obtained in response to inputting the first-direction pulse to the stepping motor 66. The electric valve control device 70 calculates the difference degree score svE (svE[1], svE[5]) indicating the degree of difference between the first-rotation restricted state waveform of the voltage VB and the waveform of the voltage VB obtained in response to inputting the first-direction pulse to the stepping motor 66. The electric valve control device 70 determines whether the electric valve 5 is in the first-rotation restricted state Sr1, based on the result of comparing the difference degree score svE with the difference degree score threshold HE (determining method 2). In this configuration, the electric valve control device 70 can determine the state of the electric valve 5 more accurately.

The reference waveform of the voltage VA includes the first-rotation permitted state waveform and the first-rotation restricted state waveform. The reference waveform of the voltage VB includes the first-rotation permitted state waveform and the first-rotation restricted state waveform. The electric valve control device 70 calculates the difference degree score svC (svC[3], svC[7], svC[1], svC[5]). The electric valve control device 70 calculates the difference degree score svE (svE[3], svE[7], svE[1], svE[5]). The electric valve control device 70 determines whether the electric valve 5 is in the first-rotation restricted state Sr1, based on the result of comparing the difference degree score svC with the difference degree score threshold HC and the result of comparing the difference degree score svE with the difference degree score threshold HE (determining method 3). In this configuration, the electric valve control device 70 can determine the state of the electric valve 5 more accurately.

The electric valve control device 70 stops inputting pulses P to the stepping motor 66 when the electric valve control device 70 determines that the electric valve 5 is in the first-rotation restricted state Sr1. The electric valve control device 70 can quickly stop the rotation of the rotor 41 in the first direction in a simple operation compared to a configuration, for example, in which the air conditioner control device 110 is notified of the electric valve 5 being in the rotation restricted state Sr1, a stopping command from the air conditioner control device 110 is received, and subsequently the initialization operation is stopped.

The reference waveform of the voltage VA includes the second-rotation permitted state waveform which is set based on the waveform of the voltage VA obtained when the electric valve 5 is in the second-rotation permitted state Sp2 and pulse P (the second-direction pulse) for rotating the rotor 41 in the second direction is input to the stepping motor 66. The second-rotation permitted state waveforms of the voltage VA are represented as the second-rotation permitted state tables D[3] and D[7]. The reference waveform of the voltage VB includes the second-rotation permitted state waveform which is set based on the waveform of the voltage VB obtained when the electric valve 5 is in the second-rotation permitted state Sp2 and the second-direction pulse is input to the stepping motor 66. The second-rotation permitted state waveforms of the voltage VB are represented as the second-rotation permitted state tables D[1] and D[5]. The electric valve control device 70 inputs pulses P to the stepping motor 66 to rotate the rotor 41 in the second direction when the electric valve 5 is determined to be in the first-rotation restricted state Sr1. The electric valve control device 70 calculates the difference degree score svD (svD[3], svD[7]) indicating the degree of difference between the second-rotation permitted state waveform of the voltage VA and the waveform of the voltage VA obtained in response to inputting the second-direction pulse to the stepping motor 66. The electric valve control device 70 calculates the difference degree score svD (svD[1], svD[5]) indicating the degree of difference between the second-rotation permitted state waveform of the voltage VB and the waveform of the voltage VB obtained in response to inputting the second-direction pulse to the stepping motor 66. The electric valve control device 70 determines whether the electric valve 5 is in the second-rotation restricted state Sr2, based on the result of comparing the difference degree score svD with the difference degree score threshold HD. The electric valve control device 70 stops inputting pulses P to the stepping motor 66 when the electric valve 5 is determined to be in the second-rotation restricted state Sr2. At this time, the electric valve 5 may be in a state (a defective state) where the rotor 41 is unable to rotate either in the first direction or the second direction. The electric valve control device 70 inputs the reversal number Y of pulses P to the stepping motor 66 to rotate the rotor 41 in the first direction when the number of pulses P input to the stepping motor 66 after the electric valve 5 is determined to be in the first-rotation restricted state Sr1 reaches the reversal number Y. In this configuration, the electric valve control device 70 can detect that the electric valve 5 is in the defective state.

The first-rotation permitted state waveform is represented as the data table (the first-rotation permitted state table C), which includes the time t and the reference voltage rv associated with the time t, provided for the first-direction pulse. The first-rotation restricted state waveform is represented as the data table (the first-rotation restricted state table E), which includes the time t and the reference voltage rv associated with the time t, provided for the first-direction pulse. The electric valve control device 70 sequentially obtains the voltages v (the voltages VA and VB) in response to inputting the first-direction pulse to the stepping motor 66. When the electric valve control device 70 obtains the voltage v at the obtaining time tv in response to inputting the first-direction pulse, the electric valve control device 70 calculates the squared value (a first intermediate value $dv2\_1$) of the difference value dv between the voltage v and the reference voltage rv associated with the time t corresponding to the obtaining time tv in the data table provided for the first-direction pulse input to the stepping motor 66. The electric valve control device 70 calculates the difference degree scores svC and svE by summing the first intermediate values $dv2\_1$ calculated by using the voltages v obtained in response to inputting the first-direction pulse. The difference degree scores svC and svE are calculated by using expression (1) described above. In this configuration, the difference degree scores svC and svE appropriately reflect the degree of difference in the shapes of the waveforms, which is distinct from the areas and maximum amplitudes of the waveforms. As a result, the electric valve control device 70 can determine the state of the electric valve 5 more accurately.

The second-rotation permitted state waveform is represented as the data table (the second-rotation permitted state table D), which includes the time t and the reference voltage rv associated with the time t, provided for the second-direction pulse. The electric valve control device 70 sequentially obtains the voltages v (the voltages VA and VB) in response to inputting the second-direction pulse to stepping motor 66. When the electric valve control device 70 obtains the voltage v at the obtaining time tv in response to inputting the second-direction pulse, the electric valve control device 70 calculates the squared value (a second intermediate value $dv2\_2$) of the difference value dv between the voltage v and the reference voltage rv associated with the time t corresponding to the obtaining time tv in the data table provided for the second-direction pulse input to the stepping motor 66. The electric valve control device 70 calculates the difference degree score svD by summing the second intermediate values $dv2\_2$ calculated by using the voltages v obtained in response to inputting the second-direction pulse.

The difference degree score svD is calculated by using expression (1) described above. In this configuration, the difference degree score svD appropriately reflects the degree of difference in the shapes of the waveforms, which is distinct from the areas and maximum amplitudes of the waveforms. As a result, the electric valve control device 70 can determine the state of the electric valve 5 more accurately.

The difference degree score (svC, svD, svE) is not limited to a score calculated by using expression (1) described above. The difference degree score may be, for example, a score concerning transition in the magnitude of the voltage v at respective obtaining times tv. Specifically, when the electric valve control device 70 obtains the voltage v at the obtaining time tv in response to inputting pulse P (the first-direction pulse, second-direction pulse), the electric valve control device 70 calculates the difference value dv between the voltage v and the reference voltage rv associated with the time t corresponding to the obtaining time tv in the data table provided for pulse P input to the stepping motor 66. The difference value dv is calculated as an absolute value. The electric valve control device 70 calculates the difference values dv by using the voltages v obtained in response to inputting pulse P and uses the number of difference values dv which are larger than or equal to a predetermined difference threshold as the difference degree score. This difference degree score also appropriately reflects the degree of difference in the shapes of the waveforms. Alternatively, the difference degree score may be, for example, a score concerning transition in the slope of the voltage v at respective obtaining times tv. The difference degree score preferably is a score that reflects time-series elements.

The electric valve control device 70 calculates the difference degree scores svC and svE by summing the first intermediate values $dv2\_1$ calculated by using the voltages v obtained during the second part p2, which is the part of the period from the start time to the end time of the first-direction pulse. Concerning the voltage v obtained during the second part p2, the magnitude of the first voltage component of the voltage v due to back electromotive force generated by inductance of the stator 60 is smaller than that of the second voltage component of the voltage v due to electromagnetic induction generated by the rotation of the rotor 41. In this configuration, the percentage of the magnitude of the second voltage component become relatively large in the voltage v, and the electric valve control device 70 can determine the state of the electric valve 5 more accurately.

The electric valve control device 70 calculates the difference degree score svD by summing the second intermediate values $dv2\_2$ calculated by using the voltages v obtained during the second part p2, which is the part of the period from the start time to the end time of the second-direction pulse. Concerning the voltage v obtained during the second part p2, the magnitude of the first voltage component of the voltage v due to back electromotive force generated by inductance of the stator 60 is smaller than that of the second voltage component of the voltage v due to electromagnetic induction generated by the rotation of the rotor 41. In this configuration, the percentage of the magnitude of the second voltage component become relatively large in the voltage v, and the electric valve control device 70 can determine the state of the electric valve 5 more accurately.

When the electric valve 5 is determined to be in the first-rotation restricted state Sr1, the electric valve control device 70 obtains the starting pattern number Nx based on the pattern number of the first-direction pulse corresponding to the waveforms of the voltages VA and VB used for the determination. When the electric valve control device 70 rotates the rotor 41 at the reference position Rx in the second direction, the electric valve control device 70 starts inputting pulses P from pulse P of a pattern number identical to the starting pattern number Nx in descending order. In this configuration, the electric valve control device 70 can control the position of the rotor 41 more accurately.

In the electric valve control device 70, the first-rotation restricted state waveform is provided for the first-direction pulse, based on the waveforms of the voltages (the waveforms of the voltages VA and VB) obtained in advance in the electric valve 5 that is combined with the electric valve control device 70. One first-rotation restricted state waveform is provided for one first-direction pulse. In this configuration, the electric valve control device 70 has the first-rotation restricted state waveform that is optimum for the electric valve 5 that is combined with the electric valve control device 70. As a result, the electric valve control device 70 can determine the state of the electric valve 5 more accurately.

In the electric valve control device 70, the first-rotation restricted state waveform is provided for the first-direction pulse, based on the waveforms of the voltages (the waveforms of the voltages VA and VB) obtained in advance in the electric valves 5. In this configuration, the first-rotation restricted state waveforms different from each other are provided for one first-direction pulse. The number of first-rotation restricted state waveforms provided for one first-direction pulse is identical to the number (8) of patterns of pulse P. The first-rotation restricted state waveforms provided for one first-direction pulse are set based on the waveforms of the voltage obtained in the electric valves 5 different from each other in pulse P corresponding to the timing when the stopper mechanism 49 restricts the rotation of the rotor 41 in the first direction. In this configuration, it is not required to obtain the waveform of the voltage in each electric valve 5 on shipment from the factory, which enables steps included in the manufacturing process of the electric valve device 1 to be reduced.

The stator 60 includes the A-phase stator 61 and the B-phase stator 62. The electric valve control device 70 obtains the voltage VB generated in the B-phase stator 62 when the driving current is supplied only to the A-phase stator 61 and obtains the voltage VA generated in the A-phase stator 61 when the driving current is supplied only to the B-phase stator 62. In this configuration, it is not required in the electric valve control device 70 to separate the voltage component due to electromagnetic induction from the voltages generated in the A-phase stator 61 and the B-phase stator 62. As a result, the electric valve control device 70 can obtain the voltages VA and VB in a relatively simple configuration.

The valve member 30 faces the valve seat 18 and is pushed toward the valve seat 18 via the valve closing spring 47 when the rotor 41 rotates in the first direction. The reference position Rx is reached by the rotor 41 when the rotor 41 further rotates in the first direction from the valve closing position Rc where the valve member 30 is in contact with the valve seat 18. In this configuration, the force of pushing the valve member 30 to the valve seat 18 by the valve closing spring 47 is reduced, suppressing the valve member 30 from being pushed to the valve seat 18 by an excessive force.

In the electric valve control device 70, the reference waveforms of the voltages VA and VB are provided in advance. The electric valve control device 70 may update the reference waveforms of the voltages based on the waveforms of the voltages (the waveforms of the voltages VA and VB) obtained in the electric valve 5 in operation.

The electric valve control device 70 determines whether the electric valve 5 is in the first-rotation restricted state Sr1, based on the voltage generated in the stator 60 by the rotation of the rotor 41. As current and voltage have a close relationship, the electric valve control device 70 may determine whether the electric valve 5 is in the first-rotation restricted state Sr1, based on a current generated in the stator 60 by the rotation of the rotor 41. In this configuration, the electric valve control device 70 includes, instead of a voltage obtainer, a current obtainer that obtains the current generated in the stator 60 by the rotation of the rotor 41 (current induced in the stator 60 due to electromagnetic induction). A state determiner determines whether the electric valve 5 is in the first-rotation restricted state Sr1, based on the degree of difference between the waveform of the current and the reference waveform of the current.

In this specification, the terms indicating shapes, such as "circular cylindrical" and "circular columnar", are also used for members and portions of the members substantially having the shapes indicated by the terms. For example, "circular cylindrical member" includes a circular cylindrical member and a substantially circular cylindrical member.

The embodiments of the present invention are described above. The present invention, however, is not limited to these embodiments. Embodiments obtained by a person skilled in the art appropriately adding, removing, or modifying components according to the embodiments described above, and an embodiment obtained by appropriately combining features of the embodiments are included in the scope of the present invention without departing from the spirit of the present invention.

REFERENCE SIGNS LIST

1—electric valve device, 5—electric valve, 10—valve body, 11—body member, 11a—fitting hole, 11b—through hole, 11d—planar part, 13—connection member, 14—valve chamber, 15—first conduit, 16—second conduit, 17—valve port, 18—valve seat, 20—can, 30—valve member, 31—first stem portion, 32—second stem portion, 33—valve portion, 34—step portion, 40—driving mechanism, 41—rotor, 41a—fitting hole, 42—valve stem holder, 42a—upper wall portion, 42b—stem hole, 42c—internal thread, 42s—movable stopper, 43—guide bush, 43a—base portion, 43b—support portion, 43c—external thread, 43d—planar part, 44—stopper member, 44a—stopper body, 44c—internal thread, 44s—fixed stopper, 45—fixed member, 45a—fixed portion, 45b—flange portion, 46—washer, 47—valve closing spring, 48—return spring, 49—stopper mechanism, 60—stator, 61—A-phase stator, 61a—pole tooth, 61b—pole tooth, 61c—coil, 62—B-phase stator, 62a—pole tooth, 62b—pole tooth, 62c—coil, 66—stepping motor, 70—electric valve control device, 71—circuit board, 75—non-volatile memory, 76—communication device, 77—motor driver, 80—computer, 81—rotation controller, 82—voltage obtainer, 83—state determiner, 100—air conditioning system, 101—compressor, 102—condenser, 103—evaporator, 110—air conditioning control device, 120—wired communication bus, A1—terminal, A2—terminal, B1—terminal, B2—terminal, L—axis, P—pulse, Rc—valve closing position, Ro—valve opening position, Rx—reference position, Sp—rotation permitted state, Sq—intermediate state, Sr—rotation restricted state, T—term, tc—time, tx—time, VA—voltage, VB—voltage, X—initialization number 2—electric valve device C—first-rotation permitted state table, D—second-rotation permitted state table, E—first-rotation restricted state table, H, HC, HD, HE—difference degree score threshold, sv, svC, svD, svE—difference degree score, Nx—starting pattern number, p1—first part, p2—second part, Sp1—first-rotation permitted state, Sp2—second-rotation permitted state, Sr1—first-rotation restricted state, Sr2—second-rotation restricted state, Y—reversal number

The invention claimed is:

1. An electric valve control device for controlling an electric valve that includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position, the electric valve control device comprising:
 a rotation controller configured to input a pulse to the stepping motor to rotate the rotor in the first direction;
 a voltage obtainer configured to obtain a voltage generated in the stator by the rotation of the rotor; and
 a state determiner configured to determine whether the electric valve is in a first-rotation restricted state where the rotation of the rotor in the first direction is restricted, based on a degree of difference between a waveform of the voltage and a reference waveform of the voltage.

2. The electric valve control device according to claim 1, wherein the reference waveform includes a first-rotation permitted state waveform which is set based on a waveform of the voltage obtained when the electric valve is in a state where the rotation of the rotor in the first direction is permitted and the pulse for rotating the rotor in the first direction, the pulse being a first-direction pulse, is input to the stepping motor, and
 wherein the state determiner calculates a difference degree score indicating a degree of difference between the first-rotation permitted state waveform and a waveform of the voltage obtained by the voltage obtainer in response to the first-direction pulse being input to the stepping motor, and the state determiner determines whether the electric valve is in the first-rotation restricted state, based on a result of comparing the difference degree score with a difference degree score threshold.

3. The electric valve control device according to claim 1, wherein the reference waveform includes a first-rotation restricted state waveform which is set based on a waveform of the voltage obtained when the electric valve is in a state where the rotation of the rotor in the first direction is restricted and the pulse for rotating the rotor in the first direction, the pulse being a first-direction pulse, is input to the stepping motor, and
 wherein the state determiner calculates a difference degree score indicating a degree of difference between the first-rotation restricted state waveform and a waveform of the voltage obtained by the voltage obtainer in response to the first-direction pulse being input to the stepping motor, and the state determiner determines whether the electric valve is in the first-rotation restricted state, based on a result of comparing the difference degree score with a difference degree score threshold.

4. The electric valve control device according to claim 1, wherein the reference waveform includes a first-rotation permitted state waveform which is set based on a waveform of the voltage obtained when the electric valve is in a state where the rotation of the rotor in the first direction is permitted and the pulse for rotating the rotor in the first direction, the pulse being a first-direction pulse, is input to the stepping motor, and a first-rotation restricted state waveform which is set based on a waveform of the voltage obtained when the electric valve is in a state where the rotation of the rotor in the first direction is restricted and the first-direction pulse is input to the stepping motor,
 wherein the state determiner calculates a difference degree score indicating a degree of difference between the first-rotation permitted state waveform and a waveform of the voltage obtained by the voltage obtainer in response to the first-direction pulse being input to the stepping motor, the difference degree score being a first-rotation permitted state difference degree score,
 wherein the state determiner calculates a difference degree score indicating a degree of difference between the first-rotation restricted state waveform and a waveform of the voltage obtained by the voltage obtainer in response to the first-direction pulse being input to the stepping motor, the difference degree score being a first-rotation restricted state difference degree score, and
 wherein the state determiner determines whether the electric valve is in the first-rotation restricted state, based on a result of comparing the first-rotation permitted state difference degree score with a first-rotation permitted state difference degree score threshold and a result of comparing the first-rotation restricted state difference degree score with a first-rotation restricted state difference degree score threshold.

5. The electric valve control device according to claim 1, wherein the rotation controller stops inputting the pulse to the stepping motor when the state determiner determines that the electric valve is in the first-rotation restricted state.

6. The electric valve control device according to claim 2, wherein the reference waveform includes a second-rotation permitted state waveform which is set based on a waveform of the voltage obtained when the electric valve is in a state where the rotation of the rotor in the second direction is permitted and the pulse for rotating the rotor in a second direction, the pulse being a second-direction pulse, is input to the stepping motor,
 wherein the rotation controller inputs the pulse to the stepping motor to rotate the rotor in the second direction when the state determiner determines that the electric valve is in the first-rotation restricted state,
 wherein the state determiner calculates a difference degree score indicating a degree of difference between the second-rotation permitted state waveform and a waveform of the voltage obtained by the voltage obtainer in response to the second direction pulse being input to the stepping motor, the difference degree score being a second-rotation permitted state difference degree score, and the state determiner determines whether the electric valve is in a second-rotation restricted state where the rotation of the rotor in the second direction is restricted, based on a result of comparing the second-rotation permitted state difference degree score with a second-rotation permitted state difference degree score threshold, wherein the rotation controller stops inputting the pulse to the stepping motor when the state determiner determines that the electric valve is in the second-rotation restricted state, and wherein when a number of pulses input to the stepping motor after the state determiner determines that the electric valve is in the first-rotation restricted state reaches a reversal number of pulses, the rotation controller inputs the reversal number of pulses to the stepping motor to rotate the rotor in the first direction.

7. The electric valve control device according to claim 2, wherein the reference waveform is represented as a data table provided for the first-direction pulse, the data table including a time and a reference voltage associated with the time, wherein the voltage obtainer sequentially obtains voltages each of which is the voltage obtained in response to the first-direction pulse being input to the stepping motor, wherein when the voltage obtainer obtains the voltage at an obtaining time in response to the first-direction pulse being input, the state determiner calculates a squared value of a difference value between the voltage obtained at the obtaining time and the reference voltage associated with the time corresponding to the obtaining time in the data table provided for the first-direction pulse input to the stepping motor, the squared value being a first intermediate value, and wherein the state determiner calculates the difference degree score by summing first intermediate values each of which is calculated by using the voltage obtained by the voltage obtainer in response to the first-direction pulse being input.

8. The electric valve control device according to claim 6, wherein the reference waveform is represented as a data table provided for the second-direction pulse, the data table including a time and a reference voltage associated with the time, wherein the voltage obtainer sequentially obtains voltages each of which is the voltage obtained in response to the second-direction pulse being input to the stepping motor, wherein when the voltage obtainer obtains the voltage at an obtaining time in response to the second-direction pulse being input, the state determiner calculates a squared value of a difference value between the voltage obtained at the obtaining time and the reference voltage associated with the time corresponding to the obtaining time in the data table provided for the second-direction pulse input to the stepping motor, the squared value being a second intermediate value, and wherein the state determiner calculates the difference degree score by summing second intermediate values each of which is calculated by using the voltage obtained by the voltage obtainer in response to the second-direction pulse being input.

9. The electric valve control device according to claim 7, wherein the state determiner calculates the difference degree score by summing the first intermediate values calculated by using the voltages obtained by the voltage obtainer in a part of a period from a start time of the first-direction pulse to an end time of the first-direction pulse, and wherein the voltage obtained in the part of the period includes a first voltage component due to back electromotive force generated by inductance of the stator and a second voltage component due to electromagnetic induction generated by the rotation of the rotor, the first voltage component being smaller than the second voltage component.

10. The electric valve control device according to claim 8, wherein the state determiner calculates the difference degree score by summing the second intermediate values calculated by using the voltages obtained by the voltage obtainer in a part of a period from a start time of the second-direction pulse to an end time the second-direction pulse, and wherein the voltage obtained in the part of the period includes a first voltage component due to back electromotive force generated by inductance of the stator and a second voltage component due to electromagnetic induction generated by the rotation of the rotor, the first voltage component being smaller than the second voltage component.

11. The electric valve control device according to claim 2, wherein when the state determiner determines that the electric valve is in the first-rotation restricted state, the state determiner obtains a starting pattern number based on a pattern number of the first-direction pulse that corresponds to the waveform of the voltage used for determining the first-rotation restricted state, and wherein when the rotation controller rotates the rotor at the reference position in a second direction, the rotation controller starts inputting pulses from the pulse of a pattern number identical to the starting pattern number.

12. The electric valve control device according to claim 3, wherein the first-rotation restricted state waveform is provided for the first-direction pulse and is set based on waveforms of the voltage obtained in advance in the electric valve that is combined with the electric valve control device, and wherein one first-rotation restricted state waveform is provided for one first-direction pulse.

13. The electric valve control device according to claim 3, wherein the first-rotation restricted state waveform is provided for the first-direction pulse and is set based on waveforms of the voltage obtained in advance in electric valves, wherein first-rotation restricted state waveforms different from each other are provided for one first-direction pulse, wherein a number of the first-rotation restricted state waveforms provided for one first-direction pulse is identical to a number of a pattern of the pulse, and wherein the first-rotation restricted state waveforms provided for one first-direction pulse are set based on the waveforms of the voltage obtained in the electric valves in which pulses corresponding to a timing when the stopper mechanism restricts the rotation of the rotor in the first direction are different from each other.

14. The electric valve control device according to claim 1, wherein the stator includes an A-phase stator and a B-phase stator, and wherein when the rotation controller supplies a driving current only to one of the A-phase and B-phase stators in response to inputting the pulse to the stepping motor, the voltage obtainer obtains the voltage generated in the other of the A-phase and B-phase stators.

15. The electric valve control device according to claim 1, wherein the valve member faces the valve seat and is pushed toward the valve seat via a coil spring when the rotor rotates in the first direction, and wherein the reference position is reached by the rotor when the rotor further rotates in the first direction from a valve closing position where the valve member is in contact with the valve seat.

16. An electric valve control device for controlling an electric valve that includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position, the electric valve control device comprising:
 a rotation controller configured to input a pulse to the stepping motor to rotate the rotor in the first direction;
 a current obtainer configured to obtain a current generated in the stator by the rotation of the rotor; and
 a state determiner configured to determine whether the electric valve is in a first-rotation restricted state where the rotation of the rotor in the first direction is restricted, based on a degree of difference between a waveform of the current and a reference waveform of the current.

17. An electric valve device comprising: the electric valve and the electric valve control device according to claim 1.

18. A method for controlling an electric valve that includes a valve body including a valve seat, a rotor rotatable with respect to the valve body, a stator constituting a stepping motor together with the rotor, a valve member facing the valve seat and moving toward the valve seat when the rotor rotates in a first direction, and a stopper mechanism restricting rotation of the rotor in the first direction when the rotor is at a reference position, the method comprising:
 inputting a pulse to the stepping motor to rotate the rotor in the first direction;
 obtaining a voltage generated in the stator by the rotation of the rotor; and
 determining whether the electric valve is in a first-rotation restricted state where the rotation of the rotor in the first direction is restricted, based on a degree of difference between a waveform of the voltage and a reference waveform of the voltage.

19. A method for controlling an electric valve that includes a valve body including a valve seat, a rotor rotatable with respect to the valve body, a stator constituting a stepping motor together with the rotor, a valve member facing the valve seat and moving toward the valve seat when the rotor rotates in a first direction, and
 a stopper mechanism restricting rotation of the rotor in the first direction when the rotor is at a reference position, the method comprising:
 inputting a pulse to the stepping motor to rotate the rotor in the first direction;
 obtaining a current generated in the stator by the rotation of the rotor; and
 determining whether the electric valve is in a first-rotation restricted state where the rotation of the rotor in the first direction is restricted, based on a degree of difference between a waveform of the current and a reference waveform of the current.

* * * * *